United States Patent [19]

Tsutsui et al.

[11] Patent Number: 5,795,838

[45] Date of Patent: Aug. 18, 1998

[54] OLEFIN POLYMERIZATION CATALYST AND PROCESS FOR OLEFIN POLYMERIZATION

[75] Inventors: Toshiyuki Tsutsui; Ken Yoshitsugu; Masaaki Ohgizawa; Tetsuhiro Matsumoto; Junichi Imuta, all of Waki-cho, Japan

[73] Assignee: Mitsui Petrochemical Industries, Ltd., Tokyo, Japan

[21] Appl. No.: 513,088

[22] Filed: Aug. 9, 1995

[30] Foreign Application Priority Data

| Aug. 9, 1994 | [JP] | Japan | 6-207965 |
| Dec. 28, 1994 | [JP] | Japan | 6-328737 |
| Feb. 15, 1995 | [JP] | Japan | 7-27031 |

[51] Int. Cl.$^6$ ............... B01J 31/00; B01J 37/00; C08F 4/02; C08F 4/60
[52] U.S. Cl. ............... 502/103; 502/104; 502/106; 502/111; 502/117
[58] Field of Search ............... 502/104, 106, 502/111

[56] References Cited

U.S. PATENT DOCUMENTS

| 5,023,222 | 6/1991 | Maezawa et al. | 502/103 |
| 5,145,819 | 9/1992 | Winter et al. | 556/53 |
| 5,374,752 | 12/1994 | Winter et al. | 556/53 |
| 5,411,925 | 5/1995 | Geerts et al. | 502/104 |
| 5,446,001 | 8/1995 | Gurtzgen | 502/151 |
| 5,455,366 | 10/1995 | Rohrmann et al. | 556/53 |
| 5,474,962 | 12/1995 | Takahashi et al. | 502/103 |
| 5,504,232 | 4/1996 | Winter et al. | 556/53 |

FOREIGN PATENT DOCUMENTS

| 0 485 823 | 5/1992 | European Pat. Off. | 556/53 |
| 0515132 | 11/1992 | European Pat. Off. | |
| 0589638 | 3/1994 | European Pat. Off. | |
| 0598543 | 5/1994 | European Pat. Off. | |
| 0650967 | 5/1995 | European Pat. Off. | |

*Primary Examiner*—Glenn Caldarola
*Assistant Examiner*—J. Pasterczyk
*Attorney, Agent, or Firm*—Sherman and Shalloway

[57] ABSTRACT

A solid olefin polymerization catalyst comprising: a fine particle carrier; (A) a transition metal compound of a Group IVB metal of the periodic table, containing a ligand having a cyclopentadienyl skeleton; (B) an organoaluminum oxy-compound; and optionally (C) an organoaluminum compound, wherein said organoaluminum oxy-compound has an alkyl to aluminum ratio of 1.3 to 2.1; said transition metal compound (A) and said organoaluminum oxy-compound (B) and said organoaluminum compound being supported on the fine particle carrier; and said solid catalyst having a bulk density of 0.3 g/cm$^3$ to 0.5 g/cm$^3$ and a fluidity index of 45 to 70 and an olefin polymerization process using the olefin polymerization catalyst; and an olefin prepolymerized catalyst obtained by prepolymerizing the catalyst, and an olefin polymerization process using the olefin prepolymerized catalyst. The olefin polymerization catalyst and the olefin prepolymerization catalyst when used to carry out the polymerization of olefins hardly produces a fine-powdery polymer and a polymer showing excellent particle properties can be obtained. Moreover, the resulting olefin polymer does not stick to the wall of the polymerization reactor.

23 Claims, 4 Drawing Sheets

5,795,838

1

OLEFIN POLYMERIZATION CATALYST AND PROCESS FOR OLEFIN POLYMERIZATION

FIELD OF THE INVENTION

The present invention relates to olefin polymerization catalysts by the use of which olefin polymers of excellent particle properties can be obtained and to processes for olefin polymerization using said catalysts.

BACKGROUND OF THE INVENTION

Olefin polymerization catalysts comprising transition metal compounds and organometallic compounds have been heretofore known as catalysts for preparing olefin (co) polymers such as ethylene polymer, propylene polymer and ethylene-α-olefin copolymer. Above all, olefin polymerization catalysts comprising transition metal compounds such as zirconocene and organoaluminum oxy-compounds (aluminoxane) are known as catalysts capable of preparing olefin (co)polymers with high polymerization activity. Processes for preparing olefin (co)polymers using such catalysts have been proposed in, for example, Japanese Patent Laid-Open Publications No. 19309/1983, No. 35005/1985, No. 35006/1985, No. 35007/1985 and No. 35008/1985.

Further, processes for polymerizing olefin in a suspension polymerization system or in a gas phase polymerization system using solid catalysts in which at least one component of a transition metal compound component and an organoaluminum oxy-compound component is supported on a porous inorganic oxide carrier such as silica, alumina or silica alumina have been proposed in, for example, Japanese Patent Laid-Open Publications No. 35006/1985, No. 35007/1985 and No. 35008/1985. Furthermore, processes for polymerizing olefin in the presence of solid catalysts in which a transition metal compound such as metallocene and aluminoxane are supported on a carrier such as inorganic oxide are described in Japanese Patent Laid-Open Publication No. 108610/1986 and No. 296008/1986.

Moreover, a process for prepolymerizing olefin in the presence of a zirconocene compound, aluminoxane, an organoaluminum compound and a carrier such as silica is described in Japanese Patent Laid-Open Publication No. 280703/1988.

By the way, in the case where olefin (co)polymers are prepared using the solid catalysts or prepolymerized catalysts comprising transition metal compounds, organoaluminum oxy-compounds and carriers mentioned above, there sometimes arises a problem that polymers having particle diameters of not more than 100 μm (fine-powdery polymers) are produced in large amounts or polymers of excellent particle properties are hardly obtained.

In the case where propylene (co)polymers are prepared using such the catalysts or prepolymerized catalysts comprising transition metal compounds, organoaluminum oxy-compounds and carriers mentioned above, particle properties of the resulting polymers are not always good, and the polymers sometimes stick to the wall of the polymerization reactor. Additionally, the resulting polymers sometimes show poor mechanical properties because a component having low molecular weight is contained in a large amount.

The present inventors have earnestly studied under such circumstances as mentioned above, and they have found that the properties of a solid catalyst or a prepolymerized catalyst have influence on the properties of the resulting polymer and that the molar ratio of the alkyl group to the aluminum atom

2 in the organoaluminum oxy-compound have influence on the activity of olefin polymerization and the properties of the resulting polymer.

In this connection, the present inventors have further studied and found that a solid catalyst or a prepolymerized catalyst, which has a specific bulk density and a specific fluidity index, and a solid catalyst or a prepolymerized catalyst, which comprises an organoaluminum oxy-compound having a specific molar ratio of the alkyl group to the aluminum atom, a fine particle carrier and a transition metal compound and has a specific bulk density and a specific fluidity index, hardly produce a fine-powdery polymer in the olefin polymerization procedure and can prepare an olefin polymer of excellent particle properties.

The present inventors have also found that a solid catalyst, which comprises an organoaluminum oxy-compound having a specific molar ratio of the alkyl group to the aluminum atom, a fine particle carrier and a specific transition metal compound, has high activity of propylene polymerization, hardly produces the component of low molecular weight and can prepare a polymer of excellent particle properties. Based on these findings, the present invention has been accomplished.

OBJECT OF THE INVENTION

It is an object of the present invention to provide an olefin polymerization catalyst by the use of which a fine-powdery polymer is hardly produced in the polymerization procedure and an olefin (co)polymer of excellent particle properties can be prepared, and to provide a process for olefin polymerization using said olefin polymerization catalyst.

It is another object of the present invention to provide a propylene polymerization catalyst which shows high activity of propylene polymerization and by the use of which a low-molecular component is hardly produced and a polymer of excellent particle properties can be prepared, and to provide a process for preparing a propylene polymer using said catalyst.

SUMMARY OF THE INVENTION

The olefin polymerization catalyst according to the present invention is a solid catalyst comprising:

a fine particle carrier;
 (A) a transition metal compound of Group IVB metal of the periodic table, containing a ligand having a cyclopentadienyl skeleton;
 (B) an organoaluminum oxy-compound; and
 (C) an organoaluminum compound, if necessary; said transition metal compound (A), said organoaluminum oxy-compound (B) and said organoaluminum compound (C) being supported on the fine particle carrier, and said solid catalyst having a bulk density of not less than 0.3 g/cm$^3$, preferably not less than 0.4 g/cm$^3$ and a fluidity index of not less than 45.

Further, the olefin polymerization catalyst according to the present invention is a prepolymerized catalyst comprising:

a fine particle carrier;
 (A) a transition metal compound of Group IVB metal of the periodic table, containing a ligand having a cyclopentadienyl skeleton;
 (B) an organoaluminum oxy-compound;
 (C) an organoaluminum compound, if necessary; and an olefin polymer produced by prepolymerization, said prepolymerized catalyst having a bulk density of not less than 0.3 g/cm³, preferably not less than 0.4 g/cm³ and a fluidity index of not less than 45.

By the use of the above olefin polymerization catalysts of the invention, a fine-powdery polymer is hardly produced in the polymerization procedure and a polymer of excellent particle properties can be obtained.

In the present invention, the organoaluminum oxy-compound (B) desirably has a molar ratio of the alkyl group to the aluminum atom (alkyl group/aluminum atom) (hereinafter sometimes referred to as "R/Al ratio") of not less than 1.3 and less than 1.7.

In the invention, further, the organoaluminum oxy-compound (B) is desirably an organoaluminum oxy-compound having been adjusted to have an R/Al ratio of 1.7 to 2.1 by bringing an organoaluminum oxy-compound into contact with water and/or an inorganic compound. Particularly, the organoaluminum oxy-compound (B) is desirably an organoaluminum oxy-compound having been adjusted to have an R/Al ratio of 1.7 to 2.1 by bringing an organoaluminum oxy-compound having an R/Al ratio of more than 2.1 into contact with water, preferably adsorbed water adsorbed on an inorganic compound, or the organoaluminum oxy-compound (B) is desirably an organoaluminum oxy-compound having been adjusted to have an R/Al ratio of 1.7 to 2.1 by bringing an organoaluminum oxy-compound having an R/Al ratio of less than 1.7 into contact with an inorganic compound substantially not containing water.

By the use of the solid catalyst or the prepolymerized catalyst which contains an organoaluminum oxy-compound having an R/Al ratio of not less than 1.3 and less than 1.7 or contains an organoaluminum oxy-compound having been adjusted to have an R/Al ratio of 1.7 to 2.1 and has the above-defined bulk density and fluidity index, a fine-powdery polymer is hardly produced in the polymerization procedure and a polymer of excellent particle properties can be obtained.

The process for olefin polymerization according to the present invention comprises polymerizing or copolymerizing an olefin in the presence of the olefin polymerization catalyst described above.

In the process for olefin polymerization according to the invention, a fine-powdery polymer is hardly produced in the polymerization procedure and a polymer of excellent particle properties can be obtained. Additionally, the polymer hardly sticks to the wall of the polymerization reactor or the stirrer in the polymerization procedure.

The propylene polymerization catalyst according to the present invention comprises:

a fine particle carrier;

(A') a transition metal compound represented by the following formula (I);

(B') an organoaluminum oxy-compound having a molar ratio of alkyl group to aluminum atom (alkyl group/aluminum atom) of not more than 1.8; and (C) an organoaluminum compound, said transition metal compound (A'), said organoaluminum oxy-compound (B') and said organoaluminum compound (C) being supported on the fine particle carrier;

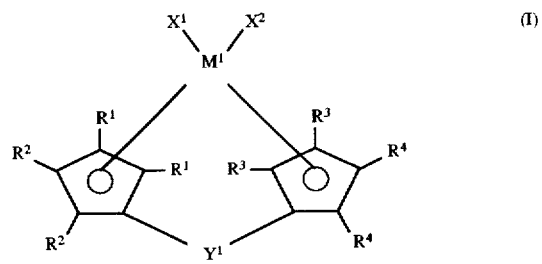

wherein $M^1$ is a transition metal atom of Groups IV–VIB of the periodic table, $R^1$, $R^2$, $R^3$ and $R^4$ may be the same as or different from each other, and are each a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group, a phosphorus-containing group, a hydrogen atom or a halogen atom, and adjacent groups of said groups $R^1$, $R^2$, $R^3$ and $R^4$ may be bonded with each other to form a ring together with carbon atoms to which the bonded groups are attached, $X^1$ and $X^2$ may be same as or different from each other and are each a hydrocarbon group, a halogenated hydrocarbon group, an oxygen-containing group, a sulfur-containing group, a silicon-containing group, a hydrogen atom or a halogen atom, $Y^1$ is a divalent hydrocarbon group, a divalent halogenated hydrocarbon group, a divalent silicon-containing group, a divalent germanium-containing group, a divalent tin-containing group, —O—, —CO—, —S—, —SO—, —SO$_2$—, —Ge—, —Sn—, —NR$^5$—, —P(R$^5$)—, —P(O) (R$^5$)—, —B(R$^5$)— or —AlR$^5$—, in which $R^5$ may be the same as or different from each other, and is a hydrogen atom, a halogen atom, a hydrocarbon group, a halogenated hydrocarbon group or alkoxy group.

Of the transition metal compounds represented by the formula (I), preferred are transition metal compounds represented by the following formulae (Ia), (Ib) and (Ic):

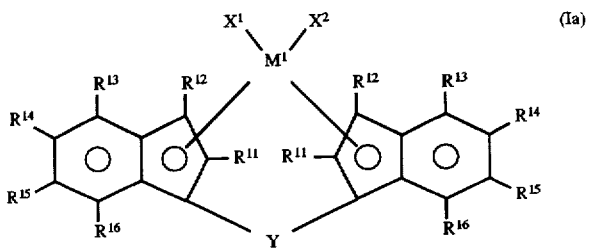

wherein $M^1$ is a transition metal atom of Group IVB of the periodic table, $R^{11}$ is a hydrocarbon group of 1 to 6 carbon atoms, $R^{12}$, $R^{14}$, $R^{15}$ and $R^{16}$ may be the same as or different from each other, and are each hydrogen, a halogen atom or a hydrocarbon group of 1 to 6 carbon atoms, $R^{13}$ is hydrogen or an aryl group of 6 to 16 carbon atoms, which may be substituted with a halogen atom, a hydrocarbon group of 1 to 20 carbon atoms or an organosilyl group, $X^1$ and $X^2$ are each hydrogen, a halogen atom, a hydrocarbon group of 1 to 20 carbon atoms, a halogenated hydrocarbon group of 1 to 20 carbon atoms, an oxygen-containing group or a sulfur-containing group.

Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO$_2$—, —NR$^{17}$—, —P(R$^{17}$)—, —P(O)(R$^{17}$)—, —BR$^{17}$— or —AlR$^{17}$— (wherein R$^{17}$ is hydrogen, a halogen atom, a hydrocarbon group of 1 to 20 carbon atoms or a halogenated hydrocarbon group of 1 to 20 carbon atoms);

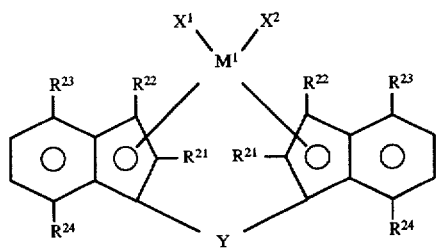
(Ib)

wherein M$^1$ is a transition metal atom of Group IVB of the periodic table,

R$^{21}$ and R$^{22}$ are each hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group, R$^{23}$ and R$^{24}$ may be the same as or different from each other, and are each an alkyl group of 1 to 20 carbon atoms, X$^1$ and X$^2$ may be the same as or different from each other, and have the same meanings as defined in the formula (Ia).

Y has the same meaning as defined in the formula (Ia);

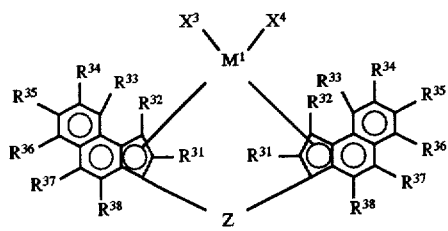
(Ic)

wherein M$^1$ is a transition metal atom of Group IVB of the periodic table, plural R$^{31}$ may be the same as or different from each other, and are each hydrogen, a halogen atom, an alkyl group of 1 to 10 carbon atoms, a halogenated alkyl group of 1 to 10 carbon atoms, an aryl group of 6 to 10 carbon atoms, —NR$^{30}_2$, —SR$^{30}$, —OSiR$^{30}_3$, —SiR$^{30}_3$ or —PR$^{30}_3$ (wherein R$^{30}$ is a halogen atom, an alkyl group of 1 to 10 carbon atoms or an aryl group of 6 to 10 carbon atoms), R$^{32}$ to R$^{38}$ are each the same as R$^{31}$, or at least two adjacent groups from among the groups represented by R$^{32}$ to R$^{38}$ may form an aromatic ring or an aliphatic ring together with atoms to which said two groups are bonded, X$^3$ and X$^4$ may be the same as or different from each other, and are each hydrogen, an alkyl group of 1 to 10 carbon atoms, an alkoxy group of 1 to 10 carbon atoms, an aryl group of 6 to 10 carbon atoms, an aryloxy group of 6 to 10 carbon atoms, an alkenyl group of 2 to 10 carbon atoms, an arylalkyl group of 7 to 40 carbon atoms, an alkylaryl group of 7 to 40 carbon atoms, an arylalkenyl group of 8 to 40 carbon atoms, OH group or a halogen atom, Z is

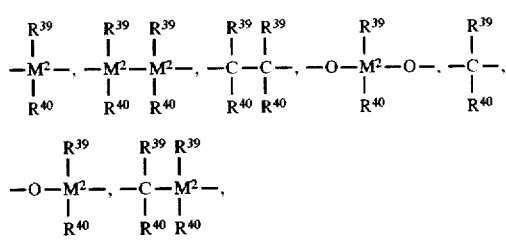

=BR$^{39}$, =AlR$^{39}$, —Ge—, —Sn—, —O—, —S—, =SO, =SO$_2$, =NR$^{39}$, =CO, =PR$^{39}$ or =P(O)R$^{39}$ (wherein R$^{39}$ and R$^{40}$ may be the same as or different from each other, and are each hydrogen, a halogen atom, an alkyl group of 1 to 10 carbon atoms, a fluoroalkyl group of 1 to 10 carbon atoms, an aryl group of 6 to 10 carbon atoms, a fluoroaryl group of 6 to 10 carbon atoms, an alkoxy group of 1 to 10 carbon atoms, an alkenyl group of 2 to 10 carbon atoms, an arylalkyl group of 7 to 40 carbon atoms, an arylalkenyl group of 8 to 40 carbon atoms or an alkylaryl group of 7 to 40 carbon atoms, or R$^{39}$ and R$^{40}$ may form a ring together with atoms to which R$^{39}$ and R$^{40}$ are bonded, and M$^2$ is silicon, germanium or tin).

Since the propylene polymerization catalyst of the invention is prepared by using the specific transition metal compound as the transition metal catalyst component and the organoaluminum oxy-compound having a specific R/Al ratio as the organoaluminum compound component, it shows high activity of propylene polymerization, and when it is used, a component of low-molecular weight is hardly produced and the resulting polymer has excellent particle properties.

The process for preparing a propylene polymer according to the present invention comprises homopolymerizing propylene or copolymerizing propylene as a major monomer and other olefin than propylene as a minor monomer in the presence of the propylene polymerization catalyst described above. In the invention, an organoaluminum compound may be used in combination with the propylene polymerization catalyst.

In the process for preparing a propylene polymer according to the invention, a fine-powdery polymer is hardly produced and a polymer having excellent particle properties can be obtained. Further, the polymer hardly sticks to the wall of the polymerization reactor or the stirrer.

DETAILED DESCRIPTION OF THE INVENTION

Figure 1:
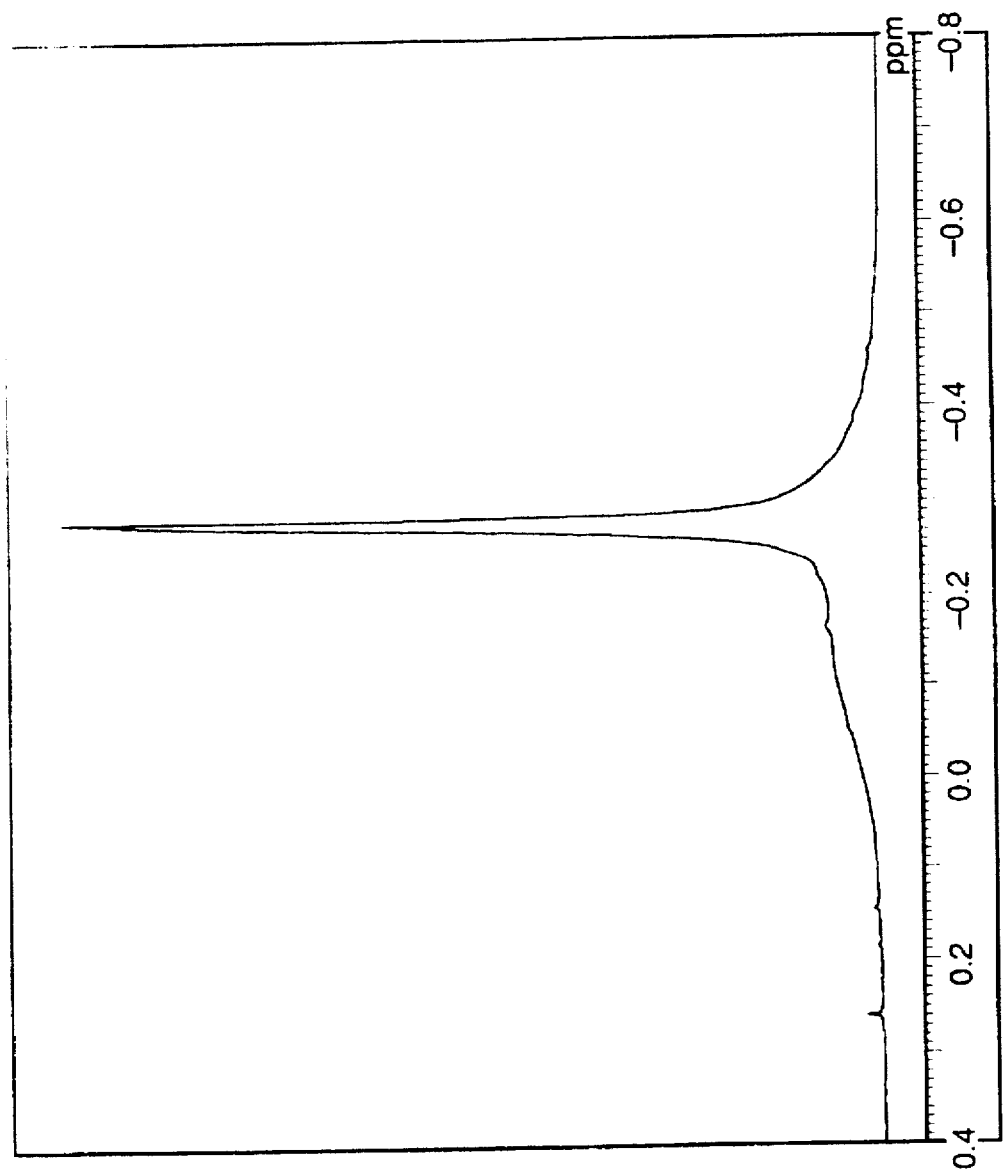
FIG. 1 is a chart showing one example of a $^1$H-NMR spectrum of an organoaluminum oxy-compound used in the present invention.

The olefin polymerization catalyst, the process for olefin polymerization, the propylene polymerization catalyst and the process for propylene polymerization, according to the present invention, will be described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

A preferred embodiment of the olefin polymerization catalyst according to the invention is a solid catalyst comprising:

a fine particle carrier;

(A) a transition metal compound of Group IVB metal of the periodic table, containing a ligand having a cyclopentadienyl skeleton;

(B) an organoaluminum oxy-compound; and (C) an organoaluminum compound, if necessary;

said transition metal compound (A), said organoaluminum oxy-compound (B) and said organoaluminum compound (C) being supported on the fine particle carrier, and said solid catalyst having a bulk density of not less than 0.3 g/cm$^3$, preferably not less than 0.4 g/cm$^3$ and a fluidity index of not less than 45.

Another preferred embodiment of the olefin polymerization catalyst according to the invention is an olefin polymerization catalyst which is a prepolymerized catalyst comprising:

a fine particle carrier;

(A) a transition metal compound of Group IVB metal of the periodic table, containing a ligand having a cyclopentadienyl skeleton;

(B) an organoaluminum oxy-compound;

(C) an organoaluminum compound, if necessary; and an olefin polymer produced by prepolymerization, said prepolymerized catalyst having a bulk density of not less than 0.3 g/cm$^3$, preferably not less than 0.4 g/cm$^3$, and a fluidity index of not less than 45.

First, the components for forming the olefin polymerization catalyst are described.

The fine particle carrier for forming the olefin polymerization catalyst of the invention is an inorganic or organic compound, and is a granular or particulate solid having a particle diameter of 10 to 300 μm, preferably 20 to 200 μm.

The inorganic compound is preferably a porous oxide, and examples thereof include $SiO_2$, $Al_2O_3$, MgO, $ZrO_2$, $TiO_2$, $B_2O_3$, CaO, ZnO, BaO, $ThO_2$ and mixtures thereof such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these, preferred is a compound containing as its major component at least one selected from the group consisting of $SiO_2$ and $Al_2O_3$.

The above-mentioned inorganic oxides may contain carbonates, sulfates, nitrates and oxides, e.g., $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$, in small amounts.

The properties of the fine particle carrier vary depending on the type thereof and the process for the preparation thereof, but preferably used in the invention is a fine particle carrier having a specific surface area of 50 to 1,000 m$^2$/g, preferably 100 to 700 m$^2$/g, and a pore volume of 0.3 to 2.5 cm$^3$/g. The fine particle carrier may be used after calcined at a temperature of 100° to 1,000° C., preferably 150° to 700° C., if desired.

The fine particle carrier desirably has an adsorbed water content of less than 1.0% by weight, preferably less than 0.5% by weight, and a surface hydroxyl group content of not less than 1.0% by weight, preferably 1.5 to 4.0% by weight, particularly preferably 2.0 to 3.5% by weight.

The adsorbed water content (% by weight) and the surface hydroxyl group content (% by weight) in the fine particle carrier are determined in the following manner.

(Adsorbed water content)

After a sample is dried at 200° C. under normal pressure in a stream of nitrogen for 4 hours, the sample is weighed, and a decrease in weight is obtained from the weights of the sample before and after dried. The obtained decrease in weight is expressed as a percentage to the weight of the sample before dried.

(Surface hydroxyl group content)

After a carrier (sample) is dried at 200° C. under normal pressure in a stream of nitrogen for 4 hours, the carrier is weighed, and the obtained weight is taken as X (g). Further, after the carrier is calcined at 1,000° C. for 20 hours to remove the surface hydroxyl group, the carrier is weighed, and the obtained weight is taken as Y (g). The surface hydroxyl group content is calculated from the following equation.

Surface hydroxyl group content (% by weight)={$(X-Y)/X$}×100

The transition metal compound of Group IVB metal of the periodic table containing a ligand having a cyclopentadienyl skeleton, which is used for forming the olefin polymerization catalyst of the invention, is a transition metal compound represented by the following formula (Io).

$$M^1L_x \qquad (Io)$$

In the above formula (Io), $M^1$ is a transition metal atom selected from Group VIB of the periodic table, for example, zirconium, titanium or hafnium, preferably zirconium.

x is a valence of the transition metal atom $M^1$ and indicates the number of ligands L coordinated to the transition metal atom $M^1$.

L is a ligand coordinated to the transition metal, and at least one of L is a ligand having a cyclopentadienyl skeleton. L other than the ligand having a cyclopentadienyl skeleton is a hydrocarbon group of 1 to 12 carbon atoms, an alkoxy group, an aryloxy group, a trialkylsilyl group, $SO_3R^1$ group (wherein $R^1$ is a hydrocarbon group of 1 to 8 carbon atoms which may have a substituent such as halogen), a halogen atom or hydrogen.

Examples of the ligands having a cyclopentadienyl skeleton include cyclopentadienyl group; alkyl-substituted cyclopentadienyl groups such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl and hexylcyclopentadienyl; indenyl group; 4,5,6,7-tetrahydroindenyl group; and fluorenyl group. These groups may be substituted with halogen atoms, trialkylsilyl group, etc.

When ethylene polymer which contains ethylene component as a major monomer component is prepared, the ligands coordinated to the transition metal atom are preferably alkyl-substituted cyclopentadienyl groups.

When the compound represented by the formula (Io) contains two or more groups having a cyclopentadienyl skeleton, two of them may be linked through an alkylene group, especially an alkylene group of 1 to 3 carbon atoms such as ethylene and propylene; a substituted alkylene group, especially a substituted alkylene group having a linkage moiety of 1 to 3 carbon atoms such as isopropylidene and diphenylmethylene; a silylene group; or a substituted silylene group such as dimethylsilylene, diphenylsilylene and methylsilylene. Of these linkage groups, preferred are the alkylene groups and the substituted alkylene groups. Particularly, when propylene polymer is prepared, two or more ligands having cyclopentadienyl skeletons are preferably linked through the linkage group.

The ligands L other the ligand having a cyclopentadienyl skeleton are as follows.

Examples of the hydrocarbon groups of 1 to 12 carbon atoms include an alkyl group, a cycloalkyl group, an aryl group and an aralkyl group.

More specifically, there can be mentioned:

alkyl groups, such as methyl, ethyl, propyl, isopropyl and butyl;

cycloalkyl groups, such as cyclopentyl and cyclohexyl;

aryl groups, such as phenyl and tolyl; and aralkyl groups, such as benzyl and neophyl.

Examples of the alkoxy groups include methoxy, ethoxy and butoxy.

Examples of the aryloxy groups include phenoxy.

Examples of the trialkylsilyl groups include trimethylsilyl.

Examples of the ligands represented by the $SO_3R^1$ group include p-toluenesulfonato, methanesulfonato, trifluoromethansulfonato.

Examples of the halogen atoms include fluorine, chlorine, bromine and iodine.

When the valence of the transition metal is for example 4, the transition metal compound containing the ligand having a cyclopentadienyl skeleton is represented by the following formula (Io):

$$R^2R^3R^4R^5M^1 \qquad \text{(Io)}$$

wherein $M^1$ is a transition metal atom selected from Group IVB of the periodic table similarly to the above, and is preferably zirconium.

$R^2$ is a group (ligand) having a cyclopentadienyl skeleton.

$R^3$, $R^4$ and $R^5$ are each a group (ligand) having a cyclopentadienyl skeleton, an alkyl group, a cycloalkyl group, an aryl group, an aralkyl group, an alkoxy group, an aryloxy group, a trialkylsilyl group, $SO_3R^1$ group, a halogen atom or hydrogen.

Of the transition metal compounds represented by the formula (Io), preferably used in the invention are those in which at least one of $R^3$, $R^4$ and $R^5$ is a group (ligand) having a cyclopentadienyl skeleton, for example, those in which $R^2$ and $R^3$ are each a group (ligand) having a cyclopentadienyl skeleton. When the compound represented by the above formula (Io) contains two or more groups (ligands) having a cyclopentadienyl group, two of them may be linked through the same (substituted) alkylene group or (substituted) silylene group as described above. When $R^2$ and $R^3$ are each a group (ligand) having a cyclopentadienyl skeleton, $R^4$ and $R^5$ are each a group (ligand) having a cyclopentadienyl skeleton, an alkyl group, a cycloalkyl group, an aryl group, an aralkyl group, an alkoxy group, an aryloxy group, a trialkylsilyl group, $SO_3R^1$ group, a halogen atom or hydrogen.

Listed below are examples of the transition metal compounds represented by the formula (Io) and containing zirconium as $M^1$.

Bis(indenyl)zirconium dichloride,
Bis(indenyl)zirconium dibromide,
Bis(indenyl)zirconiumbis(p-toluenesulfonato),
Bis(4,5,6,7-tetrahydroindenyl)zirconium dichloride,
Bis(fluorenyl)zirconium dichloride,
Ethylenebis(indenyl)zirconium dichloride,
Ethylenebis(indenyl)zirconium dibromide,
Ethylenebis(indenyl)dimethyl zirconium,
Ethylenebis(indenyl)diphenyl zirconium,
Ethylenebis(indenyl)methylzirconium monochloride,
Ethylenebis(indenyl)zirconiumbis(methanesulfonato),
Ethylenebis(indenyl)zirconiumbis(p-toluenesulfonato),
Ethylenebis(indenyl)zirconiumbis(trifluoromethanesulfonato),
Ethylenebis(4,5,6,7-tetrahydroindenyl)zirconium dichloride,
Isopropylidene(cyclopentadienyl-fluorenyl)zirconium dichloride,
Isopropylidene(cyclopentadienylmethylcyclopentadienyl)zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)zirconium dichloride,
Dimethylsilylenebis(trimethylcyclopentadienyl)zirconium dichloride,
Dimethylsilylenebis(indenyl)zirconium dichloride,
Dimethylsilylenebis(indenyl)zirconiumbis(trifluoromethanesulfonato),
Dimethylsilylenebis(4,5,6,7-tetrahydroindenyl)zirconium dichloride,
Dimethylsilylenebis(cyclopentadienylfluorenyl)zirconium dichloride,
Diphenylsilylenebis(indenyl)zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)ethylzirconium monochloride,
Bis(cyclopentadienyl)cyclohexylzirconium monochloride,
Bis(cyclopentadienyl)phenylzirconium monochloride,
Bis(cyclopentadienyl)benzylzirconium monochloride,
Bis(cyclopentadienyl)zirconium monochloride monohydride,
Bis(cyclopentadienyl)methylzirconium monohydride,
Bis(cyclopentadienyl)dimethyl zirconium,
Bis(cyclopentadienyl)diphenyl zirconium,
Bis(cyclopentadienyl)dibenzyl zirconium,
Bis(cyclopentadienyl)zirconium methoxychloride,
Bis(cyclopentadienyl)zirconium ethoxychloride,
Bis(cyclopentadienyl)zirconiumbis(methanesulfonato),
Bis(cyclopentadienyl)zirconiumbis(p-toluenesulfonato),
Bis(cyclopentadienyl)zirconiumbis(trifluoromethanesulfonato),
Bis(methylcyclopentadienyl)zirconium dichloride,
Bis(dimethylcyclopentadienyl)zirconium dichloride,
Bis(dimethylcyclopentadienyl)zirconium ethoxychloride,
Bis(dimethylcyclopentadienyl)zirconiumbis(trifluoromethanesulfonato),
Bis(ethylcyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcyclopentadienyl)zirconium dichloride,
Bis(methylbutylcyclopentadienyl)zirconium dichloride,
Bis(methylbutylcyclopentadienyl)zirconiumbis(methanesulfonato),
Bis(trimethylcyclopentadienyl)zirconium dichloride, Bis(tetramethylcyclopentadienyl)zirconium dichloride.
Bis(pentamethylcyclopentadienyl)zirconium dichloride.
Bis(hexylcyclopentadienyl)zirconium dichloride, and
Bis(trimethylsilylcyclopentadienyl)zirconium dichloride.

In the above examples, the di-substituents of the cyclopentadienyl ring include 1,2- and 1,3-substituents, and the tri-substituents thereof include 1,2,3- and 1,2,4-substituents. The alkyl groups such as propyl and butyl include isomers such as n-, i-, sec- and tert-alkyl groups.

Also employable are compounds in which zirconium of the above-mentioned compounds is replaced with titanium or hafnium.

Next, the organoaluminum oxy-compound (B) for forming the olefin polymerization catalyst of the invention is described.

The organoaluminum oxy-compound (B) may be either aluminoxane conventionally known or such a benzene-insoluble organoaluminum oxy-compound as exemplified in Japanese Patent Laid-Open Publication No. 78687/1990.

A preferred embodiment of the organoaluminum oxy-compound (B) used in the invention is an organoaluminum oxy-compound having a molar ratio of alkyl group to aluminum atom contained therein (R/Al ratio) of not less than 1.3 and less than 1.7, preferably not less than 1.4 and less than 1.7.

The R/Al ratio is now described in detail.

The organoaluminum oxy-compound presumably contains an alkylaluminum oxy-compound represented by the following formula (i) or (ii) as its major component and contains a small amount of an organoaluminum compound such as trialkylaluminum.

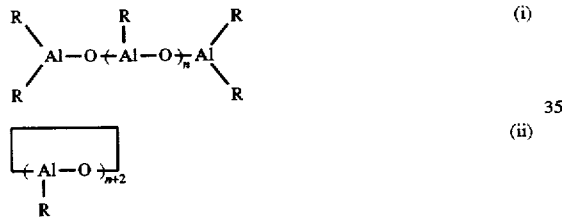

Accordingly, the alkyl group in the organoaluminum oxy-compound means the total of the alkyl group (R') in the alkylaluminum oxy-compound and the alkyl group (R") in the organoaluminum compound, and the aluminum atom in the organoaluminum oxy-compound means the total of the aluminum atom (Al') in the alkylaluminum oxy-compound and the aluminum atom (Al") in the organoaluminum compound. That is, the R/Al ratio in this specification means a ratio of the alkyl group (R'+R") to the aluminum atom (Al'+Al").

Next, how to determine the R/Al ratio is explained with reference to the case where R is methyl.

To a flask thoroughly purged with nitrogen, a solution containing 2 mmol (in terms of aluminum atom) of an organoaluminum oxy-compound is introduced. The solution is adjusted to be in the whole amount of 40 ml by adding toluene. After the system is cooled to 10° C., 10 ml of a 0.5N sulfuric acid aqueous solution is dropwise added to the system. Then, a methane gas generated in this operation is trapped by a gas burette. After it is confirmed that the generation of methane gas is completely stopped, the amount (a ml) of the gas generated and the gas temperature (t °C.) are measured, and the R/Al ratio is calculated from the following equation.

$$R/Al = (a \times 273)/\{22.4 \times (t+273) \times 2\}$$

The amount of the aluminum atom in the organoaluminum oxy-compound is measured in the following manner in accordance with plasma emission spectral analysis (ICP).

(1) A sample of 1 ml is pipetted into a 50 ml conical flask. The inside of the pipette is washed several times with toluene, and this washing liquid is introduced together into the flask.

(2) To the conical flask is added 20 ml of 6N—$H_2SO_4$. The content in the flask is stirred by a magnetic stirrer for not shorter than 15 minutes, and aluminum is extracted with the dilute sulfuric acid.

(3) One ml of the dilute sulfuric acid phase is separated, then 10 ml of 6N—$H_2SO_4$ is added to the separated dilute sulfuric acid phase, and distilled water is further added to make the whole amount 100 ml.

(4) The aluminum is quantitatively determined by ICP method. (aluminum standard solution: 20 ppm)

By the use of the olefin polymerization catalyst containing the organoaluminum oxy-compound having an R/Al ratio of not less than 1.3 and less than 1.7, a polymer having a particle diameter of not more than 100 μm (fine-powdery polymer) is hardly produced in the polymerization procedure, and a polymer of excellent particle properties can be obtained. Moreover, when the olefin polymerization catalyst containing the organoaluminum oxy-compound is prepolymerized, a polymerized catalyst having excellent particle-forming properties can be prepared.

As the organoaluminum oxy-compound having an R/Al ratio of not less than 1.3 and less than 1.7, a commercially available aluminoxane having the above-defined R/Al ratio is employable, or the organoaluminum oxy-compound can be prepared by a process similar to that for preparing the later-described organoaluminum oxy-compound having an R/Al ratio of 1.7 to 2.1. That is, the organoaluminum oxy-compound having an R/Al ratio of not less than 1.3 and less than 1.7 can be prepared by the following processes:

(a) a process comprising bringing a conventionally known organoaluminum oxy-compound such as commercially available aluminoxane into contact with water to adjust the R/Al ratio, (b) a process comprising bringing a conventionally known organoaluminum oxy-compound such as commercially available aluminoxane into contact with an inorganic compound substantially not containing water to adjust the R/Al ratio, and (c) a process comprising temporarily evaporating a solvent from a conventionally known organoaluminum oxy-compound such as commercially available aluminoxane to dry the organoaluminum oxy-compound, and redissolving it in a solvent to adjust the R/Al ratio.

The above processes may be used in combination.

When the organoaluminum oxy-compound having an R/Al ratio of not less than 1.3 and less than 1.7 is prepared by the above processes, the same conditions as those for preparing the later-described organoaluminum oxy-compound having an R/Al ratio of 1.7 to 2.1 can be adopted.

Another preferred embodiment of the organoaluminum oxy-compound (B) used in the invention is an organoaluminum oxy-compound having a molar ratio of alkyl group to aluminum atom contained therein (R/Al ratio) of 1.7 to 2.1, preferably 1.8 to 2.1, more preferably 1.9 to 2.1.

By the use of the olefin polymerization catalyst containing the organoaluminum oxy-compound having an R/Al ratio of 1.7 to 2.1, a polymer having a particle diameter of not more than 100 μm (fine-powdery polymer) is hardly produced in the polymerization procedure, and a polymer of excellent particle properties can be obtained. Moreover, when the olefin polymerization catalyst containing the organoaluminum oxy-compound is prepolymerized, a prepolymerized catalyst having excellent particle properties can be prepared.

The organoaluminum oxy-compound having an R/Al ratio of 1.7 to 2.1 can be prepared by, for example, the following processes:

(a) a process comprising bringing a conventionally known organoaluminum oxy-compound such as commercially available aluminoxane into contact with water to adjust the R/Al ratio, (b) a process comprising bringing a conventionally known organoaluminum oxy-compound such as commercially available aluminoxane into contact with an inorganic compound substantially not containing water to adjust the R/Al ratio, and (c) a process comprising temporarily evaporating a solvent from a conventionally known organoaluminum oxy-compound such as commercially available aluminoxane to dry the organoaluminum oxy-compound, and redissolving it in a solvent to adjust the R/Al ratio.

The aluminoxane is on the market generally in the form of a solution, and in this case the solution can be used as it is. The solution of aluminoxane may further contain other ingredients, with the proviso that no adverse effect is given to the reaction.

The organoaluminum oxy-compound before adjusted in the R/Al ratio is sometimes referred to as "starting organoaluminum oxy-compound" hereinafter.

In the above process (a), a starting organoaluminum oxy-compound is brought into contact with water, whereby an organoaluminum compound in the starting organoaluminum oxy-compound reacts with water thereby to adjust the R/Al ratio. In this case, a starting organoaluminum oxy-compound having an R/Al ratio of more than 2.1 can be brought into contact with water to prepare a starting organoaluminum oxy-compound having an R/Al ratio of 1.7 to 2.1, or a (starting) organoaluminum oxy-compound having been adjusted to have an R/Al ratio of 1.7 to 2.1 can be brought into contact with water to adjust the R/Al ratio to a specific value within the range of 1.7 to 2.1.

The water to be brought into contact with the starting organoaluminum oxy-compound may be in the form of either liquid, gas or solid.

More specifically, there can be used:

adsorbed water adsorbed on inorganic compounds such as silica, alumina and aluminum hydroxide or polymer;

water dissolved or dispersed in hydrocarbon solvents such as benzene, toluene and hexane, ether solvents such as tetrahydrofuran, and amine solvents such as triethylamine; and water of crystallization of salts such as magnesium chloride, magnesium sulfate, aluminum sulfate, copper sulfate, nickel sulfate, ferrous sulfate and cerous chloride.

Of these, the adsorbed water adsorbed on the inorganic compounds is preferably employed.

In the present invention, the adsorbed water on the aforementioned fine particle carrier can be also used as the water to be brought into contact with the starting organoaluminum oxy-compound.

When the adsorbed water or water of crystallization is used as the water to be brought into contact with the starting organoaluminum oxy-compound, the contact is carried out generally in an organic medium.

Examples of the organic media used herein include:

hydrocarbon solvents, such as aromatic hydrocarbons (e.g., benzene, toluene, xylene, cumene and cymene), aliphatic hydrocarbons (e.g., pentane, hexane, heptane, octane, decane, dodecane, hexadecane and octadecane), alicyclic hydrocarbons (e.g., cyclopentane, cyclohexane, cyclooctane and methylcyclohexane), and petroleum fractions (e.g., gasoline, kerosine and petroleum fraction);

halogenated hydrocarbons, such as halides of the above-mentioned aromatic hydrocarbons, aliphatic hydrocarbons and alicyclic hydrocarbons, particularly chlorides and bromides; and ethers, such as ethyl ether and tetrahydrofuran.

Of the above organic media, aromatic hydrocarbons are particularly preferred.

The water to be brought into contact with the starting organoaluminum oxy-compound is used in an amount of 0.01 to 0.3 mol, preferably 0.02 to 0.2 mol, more preferably 0.03 to 0.15 mol, based on 1 mol of the aluminum atom in the starting organoaluminum oxy-compound. It is desired that the concentration of the starting organoaluminum oxy-compound in the reaction system is in the range of usually $1 \times 10^{-3}$ to 5 g·atom/liter-solvent, preferably $1 \times 10^{-2}$ to 3 g·atom/liter-solvent, in terms of the aluminum atom in the starting organoaluminum oxy-compound; and the concentration of water in the reaction system is in the range of usually 0.01 to 1 mol/liter-solvent, preferably 0.02 to 0.5 mol/liter-solvent.

The contact of the starting organoaluminum oxy-compound with water is carried out at a temperature of usually −50° to 150° C., preferably 0° to 120° C., more preferably 20° to 100° C. The contact time is in the range of usually 0.5 to 300 hours, preferably 1 to 150 hours, though it greatly varies according to the contact temperature.

The contact of the starting organoaluminum oxy-compound with water is carried out in the following manner.

(1) The starting organoaluminum oxy-compound is mixed with a compound containing adsorbed water thereby to bring the starting organoaluminum oxy-compound into contact with the adsorbed water. (The compound containing adsorbed water may be the aforesaid fine particle carrier.)

(2) The starting organoaluminum oxy-compound is mixed with a compound containing water of crystallization thereby to bring the starting organoaluminum oxy-compound into contact with the water of crystallization.

(3) The starting organoaluminum oxy-compound is brought into contact with a hydrocarbon solvent containing (dissolving or dispersing) water.

(4) The starting organoaluminum oxy-compound is brought into contact with water vapor by, for example, blowing water vapor into a solution of the starting organoaluminum oxy-compound.

(5) The starting organoaluminum oxy-compound is directly brought into contact with water or ice.

In the above process (b), a starting organoaluminum oxy-compound having an R/Al ratio of less than 1.7 or more than 2.1 is brought into contact with an inorganic compound substantially not containing water thereby to prepare an organoaluminum oxy-compound having an R/Al ratio of 1.7 to 2.1. In the invention, the expression "substantially not containing water" means that the adsorbed water content in the inorganic compound is not more than 0.1% by weight.

It is presumed that when the inorganic compound substantially not containing water and the starting organoaluminum oxy-compound are contacted with each other, the specific component in the starting organoaluminum oxy-compound, e.g., an alkylaluminum oxy-compound having a specific R/Al ratio, is adsorbed on the inorganic compound and separated from the starting compound, whereby the R/Al ratio varies. Therefore, the inorganic compound used herein is an inorganic compound substantially not containing water. Of such inorganic compounds, a compound having a surface hydroxyl group can vary the R/Al ratio by the function of the hydroxyl group. Examples of the inorganic compounds to be brought into contact with the starting organoaluminum oxy-compound include silica, alumina and aluminum hydroxide. The inorganic compound desirably has a surface hydroxyl group content of not less than 1.0% by weight, preferably 1.5 to 4.0% by weight, particularly preferably 2.0 to 3.5% by weight, and has an adsorbed water content of not more than 0.1% by weight, preferably not more than 0.01% by weight.

The inorganic compound has a particle diameter of 10 to 300 μm, preferably 20 to 200 μm, and a specific surface area of 50 to 1,000 m$^2$/g, preferably 100 to 700 m$^2$/g.

The adsorbed water content (% by weight) and the surface hydroxyl group content (% by weight) can be determined in the same manner as described for the fine particle carrier.

The contact of the starting organoaluminum oxy-compound with the inorganic compound substantially not containing water is carried out generally in an organic medium. Examples of the organic media used herein include the aforesaid hydrocarbons, halogenated hydrocarbons and ethers. Of the organic media, aromatic hydrocarbons are particularly preferred.

The inorganic compound substantially not containing water, which is to be brought into contact with the starting organoaluminum oxy-compound, is used in an amount of 1 to 50% by mol, preferably 5 to 45% by mol, more preferably 10 to 40% by mol, based on the amount of the aluminum atom in the starting organoaluminum oxy-compound. It is desired that the concentration of the starting organoaluminum oxy-compound in the reaction system is in the range of usually 1×10$^{-3}$ to 5 g-atom/liter-solvent, preferably 1×10$^{-2}$ to 3 g-atom/liter-solvent, in terms of the aluminum atom in the starting organoaluminum oxy-compound.

The contact of the starting organoaluminum oxy-compound with the inorganic compound substantially not containing water is carried out at a temperature of usually −50° to 150° C., preferably 0° to 120° C., more preferably 20° to 100° C. The contact time is in the range of usually 0.5 to 300 hours, preferably 1 to 150 hours, though it greatly varies according to the contact temperature.

In the above process (c), a solvent is temporarily evaporated from a solution of the starting organoaluminum oxy-compound having an R/Al ratio of more than 2.1 to dry the organoaluminum oxy-compound, and the dried organoaluminum oxy-compound is redissolved in a solvent to prepare an organoaluminum oxy-compound having an R/Al ratio of 1.3 to 1.7. The temperature for evaporating the solvent is in the range of 10° to 100° C., preferably 20° to 50° C., and the pressure therefor is in the range of 2 to 100 mmHg, preferably 5 to 40 mmHg. Examples of the solvents for dissolving the dried organoaluminum oxy-compound include the aforesaid organic media used in the process (a). Of the organic media, aromatic hydrocarbons are preferred.

For preparing the organoaluminum oxy-compound having an R/Al ratio of 1.7 to 2.1, the processes (a), (b) and (c) may be used in combination.

For example, it is possible that the R/Al ratio of the (starting) organoaluminum oxy-compound is adjusted to 1.7 to 2.1 by the process (a) and then the R/Al ratio is adjusted to a specific value within the range of 1.7 to 2.1 by the process (b). Also possible is that the R/Al ratio of the (starting) organoaluminum oxy-compound is adjusted to 1.7 to 2.1 by the process (b) and then the R/Al ratio is adjusted to a specific value within the range of 1.7 to 2.1 by the process (a).

In the organoaluminum oxy-compound having an R/Al ratio of 1.7 to 2.1, a proportion of the organoaluminum compound contained therein is preferably in the specific range. For example, when the organoaluminum oxy-compound is methylaluminoxane containing trimethylaluminum, a ratio of the peak area derived from proton in the trimethylaluminum (TMA) to the total of the peak area derived from proton in the trimethylaluminum (TMA) and the peak area derived from proton in the methylaluminoxane, |i.e., TMA (Area)|, each of said peak areas being measured from $^1$H-NMR, is in the range of 0.25 to 0.40, preferably 0.27 to 0.40, more preferably 0.30 to 0.40.

Figure 2:
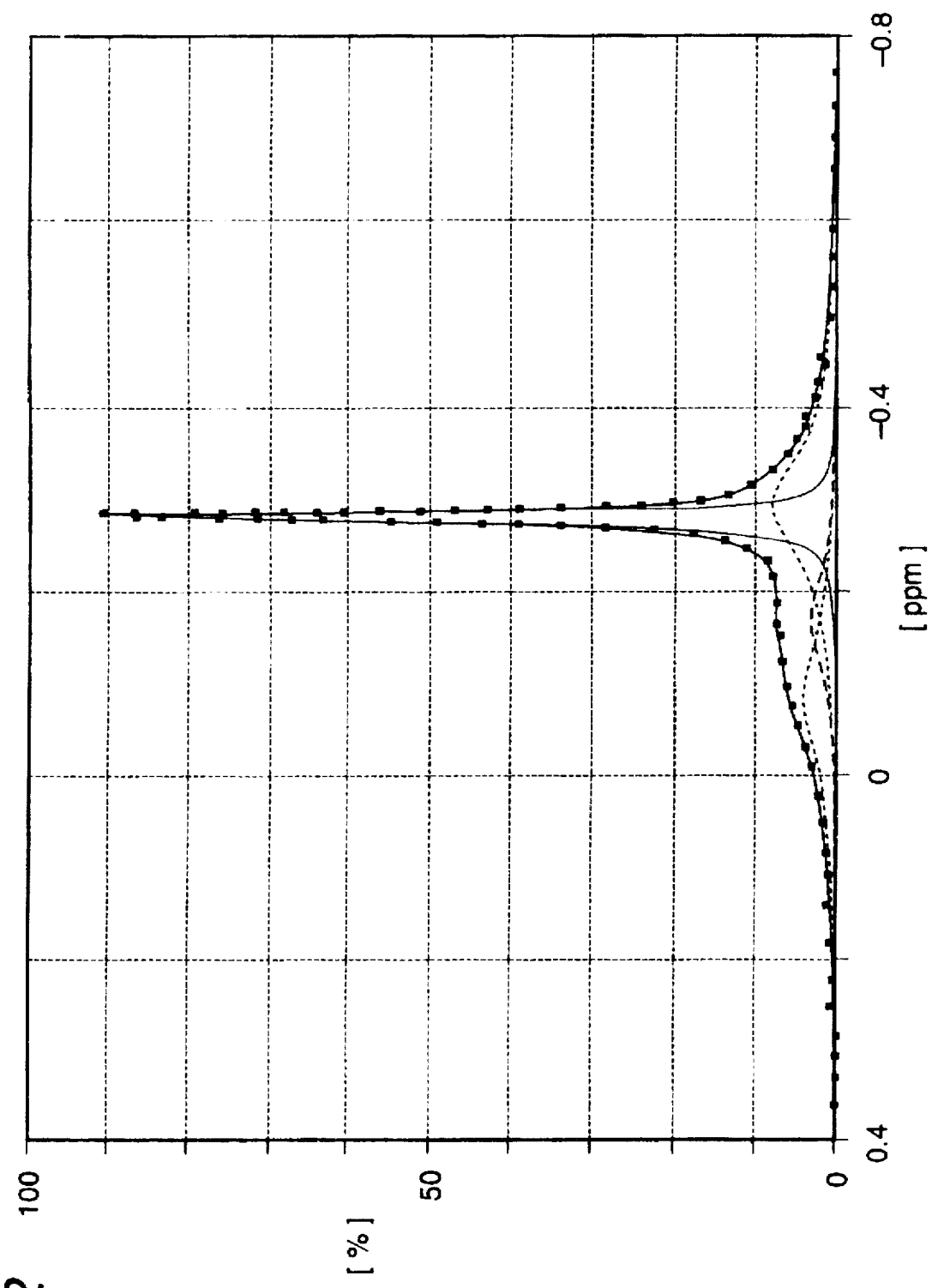
FIG. 2 is an explanatory chart of curve fitting by using Lorentz's function.

The peak area derived from proton in the methylaluminoxane and the peak area derived from proton in the trimethylaluminum (TMA) can be determined in the following manner. In a sample tube having an inner diameter of 5 mm, 0.5 ml of a toluene solution of an organoaluminum oxy-compound (0.5–1.5 mol/liter) is mixed with 0.1 ml of deuterated benzene to conduct sample adjustment, and the $^1$H-NMR of the sample is measured under the conditions of ordinary temperature, a measuring frequency of 500 MHz, a spectral width of 7507.5 Hz, a pulse repetition time of 6.2 seconds, a pulse width of 450°. A broad peak seen at about −0.6 ppm to 0.3 ppm is assigned to a peak derived from proton in the methylaluminoxane and a sharp peak seen at about −0.28 ppm is assigned to a peak derived from proton in the trimethylaluminum (TMA) (see: FIG. 1). The peak area is determined by curve fitting using Lorentz's function (see: FIG. 2).

The olefin polymerization catalyst of the invention contains the fine particle carrier, the transition metal compound (A) and the organoaluminum oxy-compound (B) as its essential components, but it may further contain an organoaluminum compound (C) described below, if necessary.

The organoaluminum compound (C) which may be used if necessary is, for example, an organoaluminum compound represented by the following formula (II):

wherein R$^a$ is a hydrocarbon group of 1 to 12 carbon atoms, X is a halogen atom or hydrogen, and n is 1 to 3.

In the above formula (II), R$^a$ is a hydrocarbon group of 1 to 12 carbon atoms, for example, an alkyl group, a cycloalkyl group or an aryl group. Particular examples thereof include alkyl groups, such as methyl, ethyl, n-propyl, isopropyl, n-butyl, isobutyl, pentyl, hexyl, isohexyl, heptyl, nonyl and octyl; cycloalkyl groups such as cyclopentyl and cyclohexyl; and aryl groups such as phenyl and tolyl.

Examples of such organoaluminum compounds (C) include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichoride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as dimethylaluminum hydride, diethylaluminum hydride, dihydrophenylaluminum, diisopropylaluminum hydride, di-n-butylaluminum hydride, diisobutylaluminum hydride, diisohexylaluminum hydride, diphenylalunimum hydride, dicylohexylaluminum hydride, di-sec-heptylaluminum hydride and di-sec-nonylaluminum hydride.

Also employable as the organoaluminum compound (C) is a compound represented by the following formula (III):

  (III)

wherein $R^a$ is the same as above; Y is —$OR^b$ group, —$OSiR^c_3$ group, —$OAlR^d_2$ group, —$NR^e_2$ group, —$SiR^f_3$ group or —$N(R^g)AlR^h_2$ group; n is 1 to 2; $R^b$, $R^c$, $R^d$ and $R^h$ are each methyl, ethyl, isopropyl, isobutyl, cyclohexyl, phenyl or the like, $R^e$ is hydrogen, methyl, ethyl, isopropyl, phenyl, trimethylsilyl or the like; and $R^f$ and $R^g$ are each methyl, ethyl or the like.

Examples of such organoaluminum compounds include:

(1) compounds of the formula $R^a_nAl(OR^b)_{3-n}$, e.g., dimethylaluminum methoxide, diethylaluminum ethoxide and diisobutylaluminum methoxide;

(2) compounds of the formula $R^a_nAl(OSiR^c)_{3-n}$, e.g., $Et_2Al(OSiMe_3)$, $(iso-Bu)_2Al(OSiMe_3)$ and $(iso-Bu)_2Al(OSiEt_3)$;

(3) compounds of the formula $R^a_nAl(OAlR^d_2)_{3-n}$, e.g., $Et_2AlOAlEt_2$ and $(iso-Bu)_2AlOAl(iso-Bu)_2$;

(4) compounds of the formula $R^a_nAl(NR^e_2)_{3-n}$, e.g., $Me_2AlNEt_2$, $Et_2AlNHMe$, $Me_2AlNHEt$, $Et_2AlN(SiMe_3)_2$ and $(iso-Bu)_2AlN(SiMe_3)_2$;

(5) compounds of the formula $R^a_nAl(SiR^f_2)_{3-n}$, e.g., $(iso-Bu)_2AlSiMe_3$; and (6) compounds of the formula $R^a_nAl(N(R^g)AlR^h_2)_{3-n}$, e.g., $Et_2AlN(Me)AlEt_2$ and $(iso-Bu)_2AlN(Et)Al(iso-Bu)_2$.

Of the organoaluminum compounds represented by the formulas (II) and (III), preferred are compounds of the formulas $R^a_3Al$, $R^a_nAl(OR^b)_{3-n}$ and $R^a_nAl(OAlR^d_2)_{3-n}$, and particularly preferred are compounds of said formulas in which $R^a$ is an isoalkyl group and n is 2.

The olefin polymerization catalyst of the invention may further contain other components useful for olefin polymerization in addition to the above-described components.

One preferred embodiment of the olefin polymerization catalyst of the invention is a solid catalyst (component) comprising the fine particle carrier, the transition metal compound (A) and the organoaluminum oxy-compound (B), and if necessary, the organoaluminum compound (C), said components (A), (B) and (C) being supported on the fine particle carrier.

Figure 3:
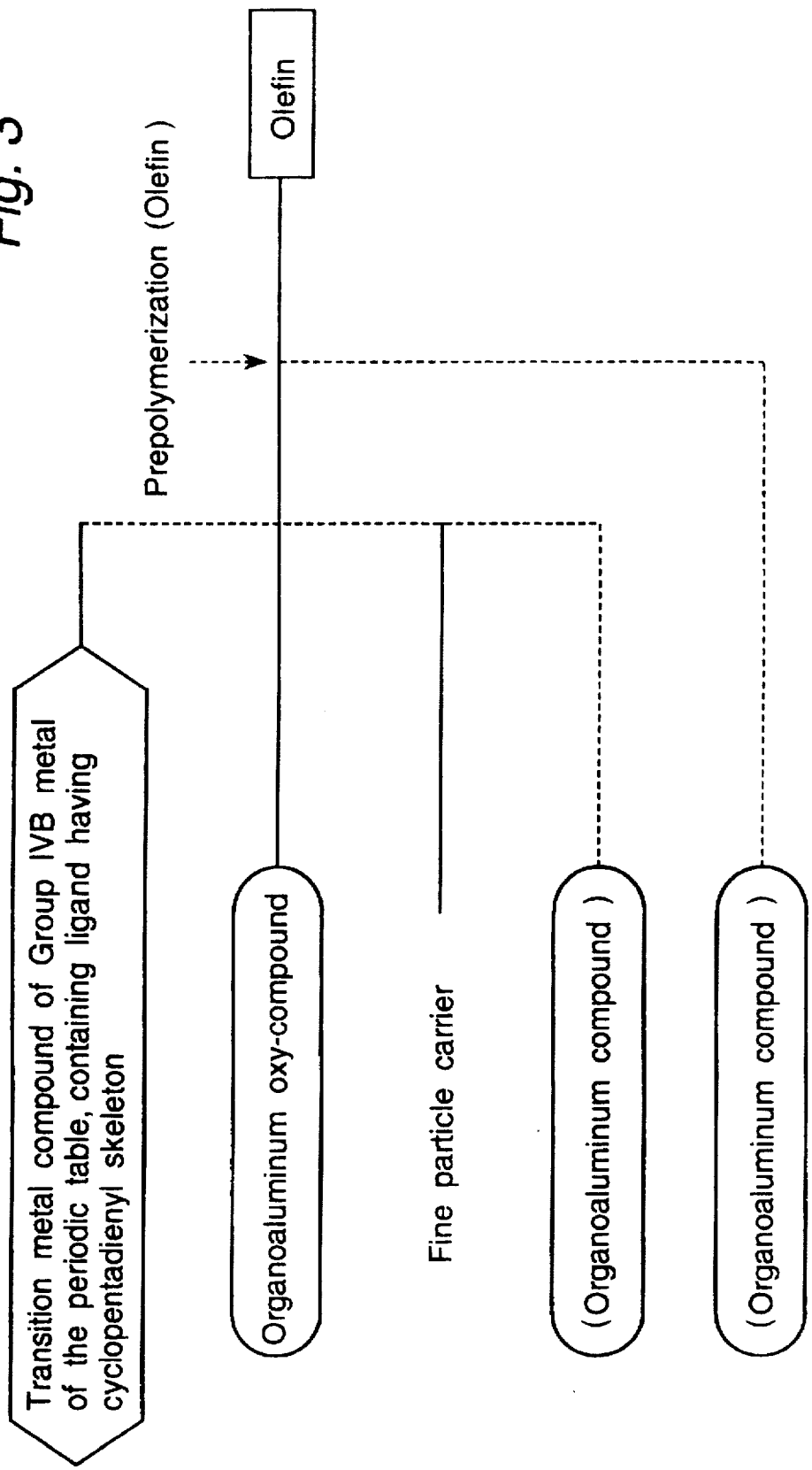
FIG. 3 is an explanatory view of a process for preparing an olefin polymerization catalyst according to the present invention.

Such olefin polymerization catalyst (solid catalyst) can be prepared by mixing and contacting the fine particle carrier, the transition metal compound (A) and the organoaluminum oxy-compound (B), and if necessary, the organoaluminum compound (C), with each other in an inert hydrocarbon solvent. FIG. 3 shows steps of a process for preparing the olefin polymerization catalyst of the invention.

The sequence of the mixing operations is arbitrarily determined. For example, it is possible that the fine particle carrier is contacted with the organoaluminum oxy-compound (B) and then the resultant product is contacted with the transition metal compound (A), but it is desired that a mixture of the organoaluminum oxy-compound (B) and the transition metal compound (A) is contacted with the fine particle carrier.

Examples of the inert hydrocarbon solvents used for preparing the olefin polymerization catalyst include:

aliphatic hydrocarbons, such as propane, butane, pentane, hexane, heptane, octane, decane, dodecane and kerosine;

alicyclic hydrocarbons, such as cyclopentane, cyclohexane and methylcyclopentane;

aromatic hydrocarbons, such as benzene, toluene and xylene;

halogenated hydrocarbons, such as ethylene chloride, chlorobenzene and dichloromethane; and mixtures of these hydrocarbons.

In mixing of the above components, the transition metal compound (A) is used in an amount of usually $5 \times 10^{-6}$ to $5 \times 10^{-4}$ mol, preferably $10^{-5}$ to $2 \times 10^{-4}$ mol, per 1 g of the fine particle carrier, and the concentration of the transition metal compound (A) is in the range of about $10^{-4}$ to $2 \times 10^{-2}$ mol/liter-solvent, preferably $2 \times 10^{-4}$ to $10^{-2}$ mol/liter-solvent. An atomic ratio of the aluminum atom (Al) in the organoaluminum oxy-compound (B) to the transition metal (M) in the transition metal compound (A), Al/M, is in the range of usually 10 to 500, preferably 20 to 200. The organoaluminum compound (C), which may be added if necessary, is desirably used in an amount of not more than 500 mol, preferably 5 to 200 mol, per 1 g-atom of the transition metal atom in the transition metal compound (A).

The temperature for mixing the components is in the range of usually –50° to 150° C., preferably –20° to 120° C., and the contact time is in the range of 1 to 1,000 minutes, preferably 5 to 600 minutes. The temperature may be varied in the mixing procedure.

The olefin polymerization catalyst (solid catalyst) of the invention has a bulk density of which lower limit is not less than 0.3 g/cm³, preferably not less than 0.4 g/cm³, and upper limit may be not more than 0.5 g/cm³, preferably not more than 0.45 g/cm³, and has a fluidity index of not less than 45, preferably 50 to 70.

The fluidity index is obtained by using the solid catalyst which is prepared by removing a supernatant liquid from the resulting mixture of the contact in an inert medium of the components (A) and (B), and the optional component (C) to separate a catalyst, washing the separated catalyst with hexane two times, separating the solid by a glass filter (G3) and drying the separated solid under reduced pressure at an ordinary temperature for two hours.

In the present specification, the fluidity index is calculated by adding indices of a degree of compaction, an angle of repose and an angle of spatula. The three properties are selected from the degree of compaction, the angle of repose, the angle of spatula and the degree of cohesion which are made indices in order to calculate the fluidity index in the fluidity evaluation method of Carr, R. L. et al. (Chem. Eng., 72, (2) 163, (3) 69, 1965). Regarding the evaluation method, the description of "Practical method for measuring dynamical and mechanical properties of powders" in Chemical Engineering Handbook (pp. 253–255, Chemical Engineering Association, 5th Edition, Maruzen K. K. in Japan (1988)) can be also referred.

These properties are measured by Multi-Tester MT-1000 (multi-performance type instrument for physical properties: manufactured by Kabushiki Kaisha Senshinkigyo) under nitrogen atmosphere.

Hereafter, the degree of compaction, the angle of repose and the angle of spatula to be made indices are concretely described.

Degree of Compaction (Cp)

The degree of compaction is calculated from a loose density ($\rho_p$) and a compacted density ($\rho_a$) by the following formula.

$$Cp=100\times(\rho_p\rho_a)/\rho_p$$

The loose density ($\rho_a$) is a ratio of the weight ($W_1$) to the volume (V) of a powder in a vessel into which the powder is gently introduced followed by removing the heaping portions from the top of the vessel.

$$\rho a=W_1/V$$

whereas the compacted density ($\rho_p$) is a ratio of the weight ($W_2$) to the volume (V) of a powder in the vessel into which the powder is introduced followed by tapping the vessel under the predetermined conditions (tapping stroke of 18 mm, tapping times of 180) and then removing the heaping portion from the top of the vessel.

$$\rho_p=W_2/V$$

Angle of Repose (θr)

The angle of Repose (θr) is measured by the Multi-Tester in accordance with the changing angle method.

In charging angle method, the powder is dropped from an upper funnel on a table for measuring the angle of repose to heap up the powder thereon and the angle of the heaped-up powder on the table is measured as the angle of repose (θr).

Angle of Spatula (θs)

A spatula (plate) is embedded in a powder followed by rising the spatula upward and the angle of the heaped-up powder on the spatula is measured as the angle of spatula (θs).

Provided that the angle of spatula is an average of an angle (θs1) when the spatula is gently risen and an angle (θs2) when the spatula is risen followed by giving a shock to remove a loose portion of the heaped-up powder.

$$\theta s=(\theta s1+\theta s2)/2$$

These measurements of the angle θs1 and θs2 are each repeated three times and the average values thereof are used for obtaining the angle of spatula (θs).

The degree of compaction, the angle of repose and the angle of spatula as described above are made indices in accordance with the Carr's Index Table as follows:

As shown in the table, the fluidity index in the present specification is 75 at most.

Carr's Index Table

| Angle of Repose | | Degree of compaction | | Angle of spatula | | Fluidity Index |
|---|---|---|---|---|---|---|
| Measurement | Index | Measurement | Index | Measurement | Index | |
| <25 | 25 | <5 | 25 | <25 | 25 | |
| 26–29 | 24 | 6–9 | 23 | 26–30 | 24 | 67.5–75 |
| 30 | 22.5 | 10 | 22.5 | 31 | 22.5 | |
| 31 | 22 | 11 | 22 | 32 | 22 | |
| 32–34 | 21 | 12–14 | 21 | 33–37 | 21 | 60–67 |
| 35 | 20 | 15 | 20 | 38 | 20 | |
| 36 | 19.5 | 16 | 19.5 | 39 | 19.5 | |
| 37–39 | 18 | 17–19 | 18 | 40–44 | 18 | 52.5–59 |
| 40 | 17.5 | 20 | 17.5 | 45 | 17.5 | |
| 41 | 17 | 21 | 17 | 46 | 17 | |
| 42–44 | 16 | 22–24 | 16 | 47–59 | 16 | 45–52 |
| 45 | 15 | 25 | 15 | 60 | 15 | |
| 46 | 14.5 | 26 | 14.5 | 61 | 14.5 | |
| 47–54 | 12 | 27–30 | 12 | 62–74 | 12 | 30–44 |
| 55 | 10 | 31 | 10 | 75 | 10 | |
| 56 | 9.5 | 32 | 9.5 | 76 | 9.5 | |
| 57–64 | 7 | 33–36 | 7 | 77–89 | 7 | 15–29 |
| 65 | 5 | 37 | 5 | 90 | 5 | |
| 66 | 4.5 | 38 | 4.5 | 91 | 4.5 | |
| 67–89 | 2 | 39–45 | 2 | 92–99 | 2 | 0–14 |
| 90 | 0 | >45 | 0 | >99 | 0 | |

The olefin polymerization catalyst (solid catalyst) of the invention hardly produces a fine-powdery polymer having a particle diameter of not more than 100 μm and can prepare an olefin polymer of excellent particle properties. Further, the olefin polymerization catalyst (solid catalyst), which contains an organoaluminum oxy-compound having an R/Al ratio of not less than 1.3 and less than 1.7 or an organoaluminum oxy-compound having been adjusted to an R/Al ratio of 1.7 to 2.1 and which has the above-defined bulk density and fluidity index, hardly produces a fine-powdery polymer and can prepare a polymer of excellent particle properties.

Another preferred embodiment of the olefin polymerization catalyst of the invention is a prepolymerized catalyst formed from the fine particle carrier, the transition metal compound (A), the organoaluminum oxy-compound (B), the organoaluminum compound (C) used optionally and an olefin polymer produced by prepolymerization.

Such olefin polymerization catalyst can be prepared by introducing an olefin into an inert hydrocarbon solvent in the presence of the fine particle carrier, the transition metal compound (A) and the organoaluminum oxy-compound (B), and if necessary, the organoaluminum compound (C). It is preferred that the fine particle carrier, the transition metal compound (A) and the organoaluminum oxy-compound (B) together form a solid catalyst (component). In this case, the organoaluminum oxy-compound (B) may be further added in addition to the solid catalyst (component).

Examples of the olefins used for the prepolymerization include α-olefins of 2 to 20 carbon atoms, such as ethylene, propylene, 1-butene, 1-pentene, 4-methyl-1-pentene, 1-hexene, 1-octene, 1-decene, 1-dodecene and 1-tetradecene. Of these, preferred is ethylene or a combination of ethylene and the same α-olefin as used in the polymerization.

Examples of the inert hydrocarbon solvents used for the prepolymerization are identical with those used for preparing the aforesaid solid catalyst.

In the prepolymerization, the transition metal compound (A) is used in an amount of usually $10^{-6}$ to $2\times10^{-2}$ mol/liter-solvent, preferably $5\times10^{-5}$ to $10^{-2}$ mol/liter, in terms of the transition metal atom in the transition metal compound (A), and this compound (A) is used in an amount of usually $5\times10^{-6}$ to $5\times10^{-4}$ mol, preferably $10^{-5}$ to $2\times10^{-4}$ mol, per 1 g of the fine particle carrier. An atomic ratio of the aluminum atom (Al) in the organoaluminum oxy-compound (B) to the transition metal (M) in the transition metal compound (A), Al/M, is in the range of usually 10 to 500, preferably 20 to 200. A ratio of the aluminum atom (Al—C) in the organoaluminum compound (C) to the aluminum atom (Al—B) in the organoaluminum oxy-compound (B), Al—C/Al—B, is in the range of usually 0.02 to 3, preferably 0.05 to 1.5. The prepolymerization temperature is in the range of −20° to 80° C., preferably 0° to 50° C., and the prepolymerization time is in the range of 0.5 to 100 hours, preferably 1 to 50 hours.

The amount of the polymer produced in the prepolymerization is desirably in the range of about 0.1 to 500 g, preferably 0.3 to 300 g, particularly preferably 1 to 100 g, per 1 g of the fine particle carrier. In the prepolymerized catalyst, it is desired that the transition metal atom is supported in an amount of about $5 \times 10^{-6}$ to $5 \times 10^{-4}$ g·atom, preferably $10^{-5}$ to $2 \times 10^{-4}$ g·atom, per 1 g of the fine particle carrier, and the aluminum atom derived from both the organoaluminum oxy-compound (B) and the organoaluminum compound (C) is supported in an amount of about $10^{-3}$ to $5 \times 10^{-2}$ g·atom, preferably $2 \times 10^{-3}$ to $2 \times 10^{-2}$ g·atom, per 1 g of the fine particle carrier.

The olefin polymerization catalyst (prepolymerized catalyst) of the invention has a bulk density of which lower limit is not less than 0.3 g/cm$^3$, preferably not less than 0.4 g/cm$^3$, and upper limit may be not more than 0.5 g/cm$^3$, preferably not more than 0.45 g/cm$^3$, and has a fluidity index of not less than 45, preferably 50 to 70.

The fluidity index of the prepolymerized catalyst is measured in the same manner as in the case of the fluidity index of the solid catalyst.

The olefin polymerization catalyst (prepolymerized catalyst) of the invention is excellent in particle-forming properties. If an olefin is polymerized using such catalyst, a fine-powdery polymer having a particle diameter of not more than 100 μm is hardly produced, and an olefin polymer of excellent particle properties can be prepared. Further, the olefin polymerization catalyst (prepolymerized catalyst), which contains an organoaluminum oxy-compound having an R/Al ratio of not less than 1.3 and less than 1.7 or an organoaluminum oxy-compound having been adjusted to have an R/Al ratio of 1.7 to 2.1 and which has the above-defined bulk density and fluidity index, hardly produces a fine-powdery polymer and can prepare a polymer of excellent particle properties.

The olefin polymerization catalyst of the invention may further contain other components useful for olefin polymerization in addition to the above-described components.

Next, the process for olefin polymerization according to the invention is described.

In the invention, polymerization of an olefin or copolymerization of two or more olefins is carried out in the presence of the above-described olefin polymerization catalyst. The polymerization can be conducted by any of a liquid phase polymerization process such as a suspension polymerization process and a gas phase polymerization process.

In the liquid phase polymerization process, the same inert hydrocarbon solvent as used for preparing the catalyst is employable, or the olefin itself is also employable as the solvent.

In the olefin polymerization using the olefin polymerization catalyst of the invention, the catalyst is desirably used in such an amount that the concentration of the transition metal atom of the transition metal compound (A) in the polymerization system is in the range of usually $10^{-8}$ to $10^{-3}$ g·atom/liter, preferably $10^{-7}$ to $10^{-4}$ g·atom/liter. In addition to the organoaluminum oxy-compound (B) and the organoaluminum compound (C) both supported on the carrier, an organoaluminum oxy-compound and/or an organoaluminum compound which is not supported may be further added.

In the slurry polymerization process, the temperature for olefin polymerization is in the range of usually −50° to 100° C., preferably 0° to 90° C.; in the liquid phase polymerization process, it is in the range of usually 0° to 250° C., preferably 20° to 200° C.; and in the gas phase polymerization process, it is in the range of usually 0° to 120° C., preferably 20° to 100° C. The polymerization pressure is in the range of usually atmospheric pressure to 100 kg/cm$^2$, preferably atmospheric pressure to 50 kg/cm$^2$. The polymerization reaction can be carried out either batchwise, semicontinuously or continuously. Further, the polymerization may be carried out in two or more stages different in the reaction conditions.

The molecular weight of the resulting olefin polymer can be regulated by allowing hydrogen to exist in the polymerization system or varying the polymerization temperature.

Examples of the olefins which can be polymerized using the olefin polymerization catalyst of the invention include:

α-olefins of 2 to 20 carbon atoms, such as ethylene, propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene; and cycloolefins of 5 to 20 carbon atoms, such as cyclopentene, cycloheptene, norbornene, 5-methyl-2-norbornene, tetracyclododecene, 2-methyl-1,4,5,8-dimethano-1,2,3,4,4a,5,8,8a-octahydronaphthalene. Also employable are styrene, vinylcyclohexane and diene.

When propylene is polymerized using the olefin polymerization catalyst, the transition metal compound (A) is specifically the below-described transition metal compound, and the organoaluminum oxy-compound (B) is an organoaluminum oxy-compound having a molar ratio of alkyl group to aluminum atom (alkyl group/aluminum atom) of not more than 1.8.

That is, the propylene polymerization catalyst is a solid catalyst comprising:

a fine particle carrier, (A') a transition metal compound represented by the following formula (I), preferably at least one transition metal compound selected from the compounds represented by the following formulae (Ia), (Ib) and (Ic), and (B') an organoaluminum oxy-compound having a molar ratio of alkyl group to aluminum atom (alkyl group/aluminum atom) of not more than 1.8, said transition metal compound (A') and said organoaluminum oxy-compound (B') being supported on the fine particle carrier.

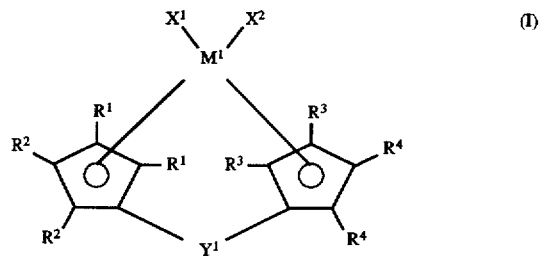

(I)

In the above formula (I), $M^1$ is a transition metal atom of Groups IV–VIB of the periodic table, and includes zirconium, titanium, hafnium, vandium, niobium, tantalum, chromium, molybdenum and tungsten. $M^1$ is preferably zirconium, titanium or hafnium.

$R^1$, $R^2$, $R^3$ and $R^4$ may be the same as or different from each other, and are each a hydrocarbon group of 1 to 20 carbon atoms, a halogenated hydrocarbon group of 1 to 20 carbon atoms, a silicon-containing group, a oxygen-containing group, a sulfur-containing group, a nitrogen-containing group, a phosphorus-containing compound, a hydrogen atom or a halogen atom. Among the groups $R^1$, $R^2$, $R^3$ and $R^4$, a part of adjacent groups may be bonded with each other to form a ring together with carbon atoms to which the bonded groups are attached. In the formula (I), $R^1$, $R^2$, $R^3$ and $R^4$ are each presents two times and the two groups, for example $R^1$ and $R^1$ are the same as or different from each other. Moreover, groups represented by R having the same suffix are those which makes a preferable combination for being bonded with each other to form the ring.

The hydrocarbon group of 1 to 20 carbon atoms includes, alkyl groups such as methyl, ethyl, propyl, butyl, hexyl, octyl, nonyl, dodecyl and icosyl; cycloalkyl groups such as cyclopentyl, cyclohexyl, norbornyl and adamantyl; alkyl groups such as vinyl, propenyl and cyclohexenyl; arylalkyl groups such as benzyl, phenylethyl and phenylpropyl and aryl groups such as phenyl, tolyl, dimethylphenyl, trimethylphenyl, ethylphenyl, propylphenyl, biphenyl, naphthyl, methylnaphthyl, anthracenyl and phenanthryl.

The ring formed by bonding the hydrocarbon groups with each other includes condensed rings such as benzene ring, naphthalene ring, acenaphthene ring and indene ring; and groups in which hydrogen of the condensed rings (e.g. benzene ring, naphthalene ring, acenaphthene ring and indene ring) is replaced with an alkyl group such as methyl, ethyl, propyl and butyl.

Examples of the halogenated hydrocarbon group are halogenated hydrocarbon groups in which a hydrogen of the above-mentioned hydrocarbon is substituted with a halogen.

Examples of the silicon-containing group include such as monohydrocarbon-substituted silyl (e.g. methylsilyl and phenylsilyl); dihydrocarbon-substituted silyl (e.g. dimethylsilyl and diphenylsilyl); trihydrocarbon-substituted silyl (e.g. trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl); silyl ether of hydrocarbon-substituted silyl (e.g. trimethyl silyl ether); silicon-substituted alkyl (e.g. trimethylsilylmethyl); and silicon-substituted aryl (e.g. trimethylsilylphenyl).

The silicon-containing group includes —$SiR_3$ (wherein R is halogen atom, alkyl of 1 to 10 carbon atoms or aryl of 6 to 10 carbon atoms) other than those described above.

Examples of the oxygen-containing group include hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

The oxygen-containing group includes —OR (wherein R is halogen atom, alkyl of 1 to 10 carbon atoms or aryl of 6 to 10 carbon atoms) other than those described above.

Examples of the sulfur-containing groups include substituents obtained by replacing oxygen with sulfur in the above-mentioned oxygen-containing groups.

The sulfur-containing groups includes —SR (wherein R is halogen atom, alkyl of 1 to 10 carbon atoms or aryl of 6 to 10 carbon atoms) other than those described above.

Examples of the nitrogen-containing groups include amino groups; alkylamino groups such as methylamino, dimetylamino, diethylamino, dipropylamino, dibutylamino and dicyclohexylamino; and arylamino groups or alkylaryl groups such as phenylamino, diphenylamino, ditolylamino, dinaphthylamino and methylphenylamino.

The nitrogen-containing group includes —$NR_2$ (wherein R is halogene atom, alkyl of 1 to 10 carbon atoms or aryl of 6 to 10 carbon atoms) other than those described above.

Examples of the phosphorus-containing groups include phosphino groups such as dimethylphosphino and diphenylphosphino.

The phosphorus-containing group includes —$PR_2$ (wherein R is halogene atom, alkyl of 1 to 10 carbon atoms or aryl of 6 to 10 carbon atoms) other than those described above.

Examples of the halogen include fluorine, chlorine, bromine and iodine.

Of these groups and halogen atoms, preferred are hydrocarbon groups, especially hydrocarbon groups of 1 to 4 carbon atoms such as methyl, ethyl, propyl and butyl; benzene ring formed by bonding hydrocarbon groups; and groups in which hydrogen of benzene ring formed by bonding hydrocarbon groups is substituted with a alkyl group such as methyl, ethyl, n-propyl, iso-propyl, n-butyl, iso-butyl and tert-butyl.

$X^1$ and $X^2$ are the same as or different from each other, and are each hydrocarbon group, a halogenated hydrocarbon group, an oxygen-containing group, a sulfur-containing group, a silicone-containing compound, hydrogen and halogen atom.

The hydrocarbon groups are preferably hydrocarbon groups of 1 to 20 carbon atoms and are identical with those described above for $R^1$, $R^2$, $R^3$ and $R^4$. The halogenated hydrocarbon groups are preferably hydrocarbon groups of 1 to 20 carbon atoms and are identical with those described for $R^1$, $R^2$, $R^3$ and $R^4$.

The oxygen-containing groups and the halogen atoms are identical with those described for $R^1$, $R^2$, $R^3$ and $R^4$.

Examples of the sulfur-containing groups include those identical with $R^1$, $R^2$, $R^3$ and $R^4$; sulfonato groups such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups such as methylsulfinato, phenylsulfinato, benzenesulfinato, p-toluenesulfinato, trimethylbenzenesulfinato and pentafluorobenzenesulfinato.

The silicon-containing group includes those identical with the aforementioned silicone-substituted alkyl groups and silicon-substituted aryl groups.

Of these, preferred are halogen atoms hydrocarbon groups of 1 to 20 carbon atoms.

Y is a divalent hydrocarbon group, a divalent halogenated hydrocarbon, a divalent silicon-containing group, a divalent germanium-containing group, a divalent tin-containing group —O—, —CO—, —S—, —SO—, —$SO_2$—, —Ge—, —Sn—, —$NR^5$—, —$P(R^5)$—, —$P(O) (R^5)$—, —$BR^5$— or —$AlR^5$— (wherein $R^5$ is hydrogen, a halogen atom, a hydrocarbon group, a halogenated hydrocarbon group or an alkoxy group).

The divalent hydrocarbon group is preferably divalent hydrocarbon groups of 1 to 20 carbon atoms which include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene.

The divalent halogenated hydrocarbon groups is preferably divalent halogenated hydrocarbon groups of 1 to 20 carbon atoms which include those obtained by halogenating the above-mentioned divalent hydrocarbon groups of 1 to 20 carbon atoms, such as chloromethylene.

Examples of the divalent silicon-containing groups include alkylsilylene groups such as methylsilylene, dimethylsilylene, diethylsilylene, di(n-propyl)silylene, di(i- propyl)silylene, di(cyclohexyl)silylene, methylphenylsilylene, diphenylsilylene, di(p-tolyl)silylene and di(p-chlorophenyl)silylene; alkyldisilyl groups such as alkylarylsilylene group; arylsilylene groups, tetramethyl-1, 2-disilyl and tetraphenyl-1,2-disilyl groups; and alkylaryldisilyl aryldisilyl groups.

Examples of the divalent germanium-containing groups include those obtained by replacing silicon with germanium in the above-mentioned divalent silicon-containing groups.

Of these divalent groups, especially preferred are the substituted sylylene groups such as dimethylsilylene, diphenylsilylene and methylphenylsilylene.

Listed below are examples of the transition metal compounds represented by the formula (I).

rac-Dimethylsilylene-bis(2,3,5-trimethylcyclopentadienyl)zirconium dichloride, rac-Dimethylsilylene-bis(2,4-dimethylcyclopentadienyl) zirconium dichloride, rac-Dimethylsilylene-bis(2-methyl-4-tert-butylcyclopentadienyl)zirconium dichloride, Isopropylidene-(4-methylcyclopentadienyl)(3-methylindenyl)zirconium dichloride, rac-Dimethylsilylene-bis(isopropylidene-(4-tert-butylcyclopentadienyl)(3-tert-butylindenyl)zirconium dichloride, Isopropylidene-(4-tert-butylcyclopentadienyl)(3-tert-butylindenyl)zirconium dichloride, Dimethylsilylene-(4-methylcyclopentadienyl)(3-methylindenyl)zirconium dichloride, Dimethylsilylene-(4-tert-butylcyclopentadienyl)(3-methylindenyl)zirconium dichloride, Dimethylsilylene-(4-tert-butylcyclopentadienyl)(3-tert-butylindenyl)zirconium dichloride, Dimethylsilylene-(3-tert-butylcyclopentadienyl) (fluorenyl)zirconium dichloride, Dimethylsilylene-(3-tert-butylcyclopentadienyl) (fluorenyl)zirconium dichloride, Also employable are components obtained by replacing zirconium with titanium, hafnium, vanadium, niobium, tantalum, chromium, moibdenum or tungsten in the above-mentioned zirconium compounds.

In the present invention, Example of the transition compounds represented by the formula (I) is at least one of the transition compounds represented by the formulae (Ia), (Ib) and (Ic).

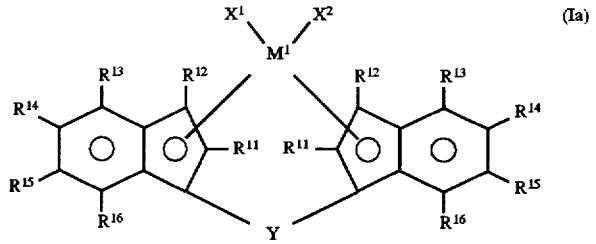

wherein $M^1$ is a transition metal atom of Group IVB of the periodic table, for example, titanium, zirconium or hafnium, preferably zirconium.

$R^{11}$ is a hydrocarbon group of 1 to 6 carbon atoms, and examples thereof include alkyl groups such as methyl, ethyl, n-propyl, isopropyl, n-butyl, isobutyl, sec-butyl, tert-butyl, n-pentyl, neopentyl, n-hexyl and cyclohexyl, and alkenyl groups such as vinyl and propenyl. Of these, preferred are alkyl groups whose carbon atoms bonded to the indenyl group are primary carbon atoms, more preferred are alkyl groups of 1 to 4 carbon atoms, and particularly preferred are methyl and ethyl.

$R^{12}$, $R^{14}$, $R^{15}$ and $R^{16}$ may be the same as or different from each other, and are each hydrogen, a halogen atom or a hydrocarbon group of 1 to 6 carbon atoms.

$R^{13}$ is hydrogen or an aryl group of 6 to 16 carbon atoms. Examples of the aryl groups of 6 to 16 carbon atoms include phenyl, α-naphthyl, β-naphthyl, anthracenyl, phenanthryl, pyrenyl, acenaphthyl, phenalenyl, aceanthrylenyl, tetrahydronaphthyl, indanyl and biphenylyl. Of these, preferred are phenyl, naphthyl, anthracenyl and phenanthryl.

These aryl groups may be substituted with:
halogen atoms, such as fluorine, chlorine, bromine and iodine;

hydrocarbon groups of 1 to 20 carbon atoms, such as alkyl groups (e.g., methyl, ethyl, propyl, butyl, hexyl, cyclohexyl, octyl, nonyl, dodecyl, icosyl, norbornyl and adamantyl), alkenyl groups (e.g., vinyl, propenyl and cyclohexenyl), arylalkyl groups (e.g., benzyl, phenylethyl and phenylpropyl) and aryl groups (e.g., phenyl, tolyl, 15 dimethylphenyl, trimethylphenyl, ethylphenyl, propylphenyl, biphenyl, α- or β-naphthyl, methylnaphthyl, anthracenyl, phenanthryl, benzylphenyl, pyrenyl, acenaphthyl, phenalenyl, aceanthrylenyl, tetrahydronaphthyl, indanyl and biphenylyl); and organosilyl groups such as trimethylsilyl, triethylsilyl and triphenylsilyl.

$X^1$ and $X^2$ are each hydrogen, a halogen atom, a hydrocarbon group of 1 to 20 carbon atoms, a halogenated hydrocarbon group of 1 to 20 carbon atoms, an oxygen-containing group or a sulfur-containing group.

Examples of the halogen atoms and the hydrocarbon groups of 1 to 20 carbon atoms are identical with those described above. Examples of the halogenated hydrocarbon groups of 1 to 20 carbon atoms include those obtained by substituting the aforementioned hydrocarbon groups of 1 to 20 carbon atoms with halogen atoms.

Examples of the oxygen-containing groups include hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituents obtained by replacing oxygen with sulfur in the above-mentioned oxygen-containing groups; sulfonato groups such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups such as methylsulfinato, phenylsulfinato, benzenesulfinato, p-toluenesulfinato, trimethylbenzenesulfinato and pentafluorobenzenesulfinato.

Of these, preferred are halogen atoms and hydrocarbon groups of 1 to 20 carbon atoms.

Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO$_2$—, NR$^{17}$—, —P(R$^{17}$)—, —P(O) (R$^{17}$)—, —BR$^{17}$— or —AlR$^{17}$— (wherein R$^{17}$ is hydrogen, a halogen atom, a hydrocarbon group of 1 to 20 carbon atoms or a halogenated hydrocarbon group of 1 to 20 carbon atoms).

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene.

Examples of the divalent halogenated hydrocarbon groups include those obtained by halogenating the above-mentioned divalent hydrocarbon groups of 1 to 20 carbon atoms, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene; and alkyldisilyl, alkylaryldisilyl and aryldisilyl groups, such as tetramethyl-1,2-disilyl and tetraphenyl-1,2-disilyl.

Examples of the divalent germanium-containing groups include those obtained by replacing silicon with germanium in the above-mentioned divalent silicon-containing groups.

$R^{17}$ is hydrogen, or the same halogen atom, hydrocarbon group of 1 to 20 carbon atoms or halogenated hydrocarbon group of 1 to 20 carbon atoms as described above.

Of these, preferred as Y are divalent silicon-containing groups and divalent germanium-containing groups, more preferred are divalent silicon-containing groups, and particularly preferred are alkylsilylene, alkylarylsilylene and arylsilylene.

Listed below are examples of the transition metal compounds represented by the formula (Ia).

rac-Dimethylsilylene-bis{1-(2-methyl-4-phenylindenyl)}zirconium dichloride,
rac-Dimethylsilylene-bis{1-(2-methyl-4-(α-naphthyl)indenyl)}zirconium dichloride,
rac-Dimethylsilylene-bis{1-(2-methyl-4-(β-naphthyl)indenyl)}zirconium dichloride,
rac-Dimethylsilylene-bis{1-(2-methyl-4-(1-anthracenyl)indenyl)}zirconium dichloride,
rac-Dimethylsilylene-bis{1-(2-methyl-4-(2-anthracenyl)indenyl)}zirconium dichloride,
rac-Dimethylsilylene-bis{1-(2-methyl-4-(9-anthracenyl)indenyl)}zirconium dichloride,
rac-Dimethylsilylene-bis{1-(2-methyl-4-(9-phenanthryl)indenyl)}zirconium dichloride,
rac-Dimethylsilylene-bis{1-(2-methyl-4-(p-fluorophenyl)indenyl)}zirconium dichloride,
rac-Dimethylsilylene-bis{1-(2-methyl-4-(pentafluorophenyl)indenyl)}zirconium dichloride,
rac-Dimethylsilylene-bis{1-(2-methyl-4-(p-chlorophenyl)indenyl)}zirconium dichloride,
rac-Dimethylsilylene-bis{1-(2-methyl-4-(m-chlorophenyl)indenyl)}zirconium dichloride,
rac-Dimethylsilylene-bis{1-(2-methyl-4-(o-chlorophenyl)indenyl)}zirconium dichloride,
rac-Dimethylsilylene-bis{1-(2-methyl-4-(o,p-dichlorophenyl)phenyl-1-indenyl)}zirconium dichloride,
rac-Dimethylsilylene-bis{1-(2-methyl-4-(p-bromophenyl)indenyl)}zirconium dichloride,
rac-Dimethylsilylene-bis{1-(2-methyl-4-(p-tolyl)indenyl)}zirconium dichloride,
rac-Dimethylsilylene-bis{1-(2-methyl-4-(m-tolyl)indenyl)}zirconium dichloride,
rac-Dimethylsilylene-bis{1-(2-methyl-4-(o-tolyl)indenyl)}zirconium dichloride,
rac-Dimethylsilylene-bis{1-(2-methyl-4-(o,o'-dimethylphenyl)-1-indenyl)}zirconium dichloride,
rac-Dimethylsilylene-bis{1-(2-methyl-4-(p-ethylphenyl)indenyl)}zirconium dichloride,
rac-Dimethylsilylene-bis{1-(2-methyl-4-(p-i-propylphenyl)indenyl)}zirconium dichloride,
rac-Dimethylsilylene-bis{1-(2-methyl-4-(p-benzylphenyl)indenyl)}zirconium dichloride,
rac-Dimethylsilylene-bis{1-(2-methyl-4-(p-biphenyl)indenyl)}zirconium dichloride,
rac-Dimethylsilylene-bis{1-(2-methyl-4-(m-biphenyl)indenyl)}zirconium dichloride,
rac-Dimethylsilylene-bis{1-(2-methyl-4-(p-trimethylsilylenephenyl)indenyl)}zirconium dichloride,
rac-Dimethylsilylene-bis{1-(2-methyl-4-(m-trimethylsilylenephenyl)indenyl)}zirconium dichloride,
rac-Dimethylsilylene-bis{1-(2-phenyl-4-phenylindenyl)}zirconium dichloride,
rac-Diethylsilylene-bis{1-(2-methyl-4-phenylindenyl)}zirconium dichloride,
rac-Di(i-propyl)silylene-bis{1-(2-methyl-4-phenylindenyl)}zirconium dichloride,
rac-Di(n-butyl)silylene-bis{1-(2-methyl-4-phenylindenyl)}zirconium dichloride,
rac-Dicyclohexylsilylene-bis{1-(2-methyl-4-phenylindenyl)}zirconium dichloride,
rac-Methylphenylsilylene-bis{1-(2-methyl-4-phenylindenyl)}zirconium dichloride,
rac-Diphenylsilylene-bis{1-(2-methyl-4-phenylindenyl)}zirconium dichloride,
rac-Di(p-tolyl)silylene-bis{1-(2-methyl-4-phenylindenyl)}zirconium dichloride,
rac-Di(p-chlorophenyl)silylene-bis{1-(2-methyl-4-phenylindenyl)}zirconium dichloride,
rac-Methylene-bis{1-(2-methyl-4-phenylindenyl)}zirconium dichloride,
rac-Ethylene-bis{1-(2-methyl-4-phenylindenyl)}zirconium dichloride,
rac-Dimethylgermylene-bis{1-(2-methyl-4-phenylindenyl)}zirconium dichloride,
rac-Dimethylstannylene-bis{1-(2-methyl-4-phenylindenyl)}zirconium dichloride,
rac-Dimethylsilylene-bis{1-(2-methyl-4-phenylindenyl)}zirconium dibromide,
rac-Dimethylsilylene-bis{1-(2-methyl-4-phenylindenyl)}zirconium dimethyl,
rac-Dimethylsilylene-bis{1-(2-methyl-4-phenylindenyl)}zirconium methylchloride,
rac-Dimethylsilylene-bis{1-(2-methyl-4-phenylindenyl)}zirconium chloride $SO_2Me$,
rac-Dimethylsilylene-bis{1-(2-methyl-4-phenylindenyl)}zirconium chloride $OSO_2Me$,
rac-Dimethylsilylene-bis{1-(2-ethyl-4-phenylindenyl)}zirconium dichloride,
rac-Dimethylsilylene-bis{1-(2-ethyl-4-(α-naphthyl)indenyl)}zirconium dichloride,
rac-Dimethylsilylene-bis{1-(2-ethyl-4-(β-naphthyl)indenyl zirconium dichloride,
rac-Dimethylsilylene-bis{1-(2-ethyl-4-(2-methyl-1-naphthyl)indenyl)}zirconium dichloride,
rac-Dimethylsilylene-bis{1-(2-ethyl-4-(5-acenaphthyl)indenyl)}zirconium dichloride,
rac-Dimethylsilylene-bis{1-(2-ethyl-4-(9-anthracenyl)indenyl)}zirconium dichloride,
rac-Dimethylsilylene-bis{1-(2-ethyl-4-(9-phenanthryl)indenyl)}zirconium dichloride,
rac-Dimethylsilylene-bis{1-(2-ethyl-4-(o-methylphenyl)indenyl)}zirconium dichloride,
rac-Dimethylsilylene-bis{1-(2-ethyl-4-(m-methylphenyl)indenyl)}zirconium dichloride,
rac-Dimethylsilylene-bis{1-(2-ethyl-4-(p-methylphenyl)indenyl)}zirconium dichloride,
rac-Dimethylsilylene-bis{1-(2-ethyl-4-(2,3-dimethylphenyl)indenyl)}zirconium dichloride, rac-Dimethylsilylene-bis{1-(2-ethyl-4-(2,4-dimethylphenyl)indenyl)}zirconium dichloride.
rac-Dimethylsilylene-bis{1-(2-ethyl-4-(2,5-dimethylphenyl)indenyl)}zirconium dichloride.
rac-Dimethylsilylene-bis{1-(2-ethyl-4-(2,4,6-trimethylphenyl)indenyl)}zirconium dichloride.
rac-Dimethylsilylene-bis{1-(2-ethyl-4-(o-chlorophenyl)indenyl)}zirconium dichloride.
rac-Dimethylsilylene-bis{1-(2-ethyl-4-(m-chlorophenyl)indenyl)}zirconium dichloride.
rac-Dimethylsilylene-bis{1-(2-ethyl-4-(p-chlorophenyl)indenyl)}zirconium dichloride.
rac-Dimethylsilylene-bis{1-(2-ethyl-4-(2,3-dichlorophenyl)indenyl)}zirconium dichloride.
rac-Dimethylsilylene-bis{1-(2-ethyl-4-(2,6-dichlorophenyl)indenyl)}zirconium dichloride.
rac-Dimethylsilylene-bis{1-(2-ethyl-4-(3,5-dichlorophenyl)indenyl)}zirconium dichloride.
rac-Dimethylsilylene-bis{1-(2-ethyl-4-(2-bromophenyl)indenyl)}zirconium dichloride.
rac-Dimethylsilylene-bis{1-(2-ethyl-4-(3-bromophenyl)indenyl)}zirconium dichloride.
rac-Dimethylsilylene-bis{1-(2-ethyl-4-(4-bromophenyl)indenyl)}zirconium dichloride.
rac-Dimethylsilylene-bis{1-(2-ethyl-4-(2-biphenylyl)indenyl)}zirconium dichloride.
rac-Dimethylsilylene-bis{1-(2-ethyl-4-(4-trimethylsilylphenyl)indenyl)}zirconium dichloride.
rac-Dimethylsilylene-bis{1-(2-n-propyl-4-phenylindenyl)}zirconium dichloride.
rac-Dimethylsilylene-bis{1-(2-n-propyl-4-(α-naphthyl)indenyl)}zirconium dichloride.
rac-Dimethylsilylene-bis{1-(2-n-propyl-4-(β-naphthyl)indenyl)}zirconium dichloride.
rac-Dimethylsilylene-bis{1-(2-n-propyl-4-(2-methyl-1-naphthyl)indenyl)}zirconium dichloride.
rac-Dimethylsilylene-bis{1-(2-n-propyl-4-(5-acenaphthyl)indenyl)}zirconium dichloride.
rac-Dimethylsilylene-bis{1-(2-n-propyl-4-(9-anthracenyl)indenyl)}zirconium dichloride.
rac-Dimethylsilylene-bis{1-(2-n-propyl-4-(9-phenanthryl)indenyl)}zirconium dichloride.
rac-Dimethylsilylene-bis{1-(2-i-propyl-4-phenylindenyl)}zirconium dichloride.
rac-Dimethylsilylene-bis{1-(2-i-propyl-4-(α-naphthyl)indenyl)}zirconium dichloride.
rac-Dimethylsilylene-bis{1-(2-i-propyl-4-(β-naphthyl)indenyl)}zirconium dichloride.
rac-Dimethylsilylene-bis{1-(2-i-propyl-4-(8-methyl-9-naphthyl)indenyl)}zirconium dichloride.
rac-Dimethylsilylene-bis{1-(2-i-propyl-4-(5-acenaphthyl)indenyl)}zirconium dichloride.
rac-Dimethylsilylene-bis{1-(2-i-propyl-4-(9-anthracenyl)indenyl)}zirconium dichloride.
rac-Dimethylsilylene-bis{1-(2-i-propyl-4-(9-phenanthryl)indenyl)}zirconium dichloride.
rac-Dimethylsilylene-bis{1-(2-s-butyl-4-phenylindenyl)}zirconium dichloride.
rac-Dimethylsilylene-bis{1-(2-s-butyl-4-(α-naphthyl)indenyl)}zirconium dichloride.
rac-Dimethylsilylene-bis{1-(2-s-butyl-4-(β-naphthyl)indenyl)}zirconium dichloride.
rac-Dimethylsilylene-bis{1-(2-s-butyl-4-(2-methyl-1-naphthyl)indenyl)}zirconium dichloride.
rac-Dimethylsilylene-bis{1-(2-s-butyl-4-(5-acenaphthyl)indenyl)}zirconium dichloride.
rac-Dimethylsilylene-bis{1-(2-s-butyl-4-(9-anthracenyl)indenyl)}zirconium dichloride.
rac-Dimethylsilylene-bis{1-(2-s-butyl-4-(9-phenanthryl)indenyl)}zirconium dichloride.
rac-Dimethylsilylene-bis{1-(2-n-pentyl-4-phenylindenyl)}zirconium dichloride.
rac-Dimethylsilylene-bis{1-(2-n-pentyl-4-(α-naphthyl)indenyl)}zirconium dichloride.
rac-Dimethylsilylene-bis{1-(2-n-butyl-4-phenylindenyl)}zirconium dichloride.
rac-Dimethylsilylene-bis{1-(2-n-butyl-4-(α-naphthyl)indenyl)}zirconium dichloride.
rac-Dimethylsilylene-bis{1-(2-n-butyl-4-(β-naphthyl)indenyl}zirconium dichloride.
rac-Dimethylsilylene-bis{1-(2-n-butyl-4-(2-methyl-1-naphthyl)indenyl)}zirconium dichloride.
rac-Dimethylsilylene-bis{1-(2-n-butyl-4-(5-acenaphthyl)indenyl)}zirconium dichloride.
rac-Dimethylsilylene-bis{1-(2-n-butyl-4-(9-anthracenyl)indenyl)}zirconium dichloride.
rac-Dimethylsilylene-bis{1-(2-n-butyl-4-(9-phenanthryl)indenyl)}zirconium dichloride.
rac-Dimethylsilylene-bis{1-(2-i-butyl-4-phenylindenyl)}zirconium dichloride.
rac-Dimethylsilylene-bis{(1-(2-i-butyl-4-(α-naphthyl)indenyl)}zirconium dichloride.
rac-Dimethylsilylene-bis{1-(2-i-butyl-4-(β-naphthyl)indenyl}zirconium dichloride.
rac-Dimethylsilylene-bis{1-(2-i-butyl-4-(2-methyl-1-naphthyl)indenyl)}zirconium dichloride.
rac-Dimethylsilylene-bis{1-(2-i-butyl-4-(5-acenaphthyl)indenyl)}zirconium dichloride.
rac-Dimethylsilylene-bis{1-(2-i-butyl-4-(9-anthracenyl)indenyl)}zirconium dichloride.
rac-Dimethylsilylene-bis{1-(2-i-butyl-4-(9-phenanthryl)indenyl)}zirconium dichloride.
rac-Dimethylsilylene-bis{1-(2-neopentyl-4-phenylindenyl)}zirconium dichloride.
rac-Dimethylsilylene-bis{1-(2-neopentyl-4-(α-naphthyl)indenyl)}zirconium dichloride.
rac-Dimethylsilylene-bis{1-(2-n-hexyl-4-phenylindenyl)}zirconium dichloride.
rac-Dimethylsilylene-bis{1-(2-n-hexyl-4-(α-naphthyl)indenyl)}zirconium dichloride.
rac-Methylphenylsilylene-bis{1-(2-ethyl-4-phenylindenyl)}zirconium dichloride.
rac-Methylphenylsilylene-bis{1-(2-ethyl-4-(α-naphthyl)indenyl)}zirconium dichloride.
rac-Methylphenylsilylene-bis{1-(2-ethyl-4-(9-anthracenyl)indenyl)}zirconium dichloride.
rac-Methylphenylsilylene-bis{1-(2-ethyl-4-(9-phenanthryl)indenyl)}zirconium dichloride.
rac-Diphenylsilylene-bis{1-(2-ethyl-4-phenylindenyl)}zirconium dichloride.
rac-Diphenylsilylene-bis{1-(2-ethyl-4-(α-naphthyl)indenyl)}zirconium dichloride.
rac-Diphenylsilylene-bis{1-(2-ethyl-4-(9-anthracenyl)indenyl)}zirconium dichloride.
rac-Diphenylsilylene-bis{1-(2-ethyl-4-(9-phenanthryl)indenyl)}zirconium dichloride.
rac-Diphenylsilylene-bis{1-(2-ethyl-4-(4-biphenylyl)indenyl)}zirconium dichloride.
rac-Methylene-bis{1-(2-ethyl-4-phenylindenyl)}zirconium dichloride.
rac-Methylene-bis{1-(2-ethyl-4-(α-naphthyl)indenyl)}zirconium dichloride.
rac-Ethylene-bis{1-(2-ethyl-4-phenylindenyl)}zirconium dichloride.
rac-Ethylene-bis{1-(2-ethyl-4-(α-naphthyl)indenyl)}zirconium dichloride.

rac-Ethylene-bis{1-(2-n-propyl-4-(α-naphthyl)indenyl)}zirconium dichloride.
rac-Dimethylgermyl-bis{1-(2-ethyl-4-phenylindenyl)}zirconium dichloride.
rac-Dimethylgermyl-bis{1-(2-ethyl-4-(α-naphthyl)indenyl)}zirconium dichloride, and
rac-Dimethylgermyl-bis{1-(2-n-propyl-4-phenylindenyl)}zirconium dichloride.

Also employable are compounds obtained by replacing zirconium with titanium or hafnium in the above-mentioned zirconium compounds.

In the invention, the transition metal compounds represented by the formula (Ia) are generally used in the form of racemic modification, but they can be also used in the form of R type or S type.

These transition metal compounds can be prepared in accordance with "Journal of Organic Chem." 288(1985), pp. 63–67, and European Patent Publication No. 0,320,762 (specification and examples).

Next, the transition metal compound represented by the formula (Ib) is described.

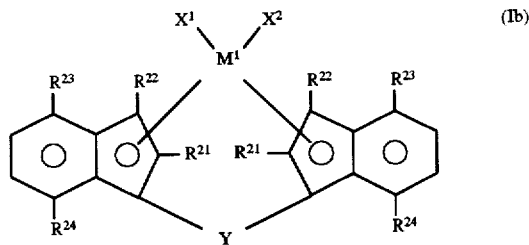

(Ib)

wherein $M^1$ is a transition metal atom of Group IVB of the periodic table, for example, titanium, zirconium or hafnium, preferably zirconium.

$R^{21}$ and $R^{22}$ may be the same as or different from each other, and are each hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group. Examples of the halogen atoms, the hydrocarbon groups of 1 to 20 carbon atoms, the halogenated hydrocarbon groups of 1 to 20 carbon atoms, the silicon-containing groups, the oxygen-containing groups and the sulfur-containing groups include those described for the formula (Ia).

Examples of the nitrogen-containing groups include amino group; alkylamino groups such as methylamino, dimethylamino, diethylamino, dipropylamino, dibutylamino and dicyclohexylamino; and arylamino groups such as phenylamino, diphenylamino, ditolylamino, dinaphthylamino and methylphenylamino.

Examples of the phosphorus-containing groups include dimethylphosphino and diphenylphosphino.

Of these, $R^{21}$ is preferably a hydrocarbon group, particularly preferably a hydrocarbon group of 1 to 3 carbon atoms, e.g., methyl, ethyl or propyl.

$R^{22}$ is preferably hydrogen or a hydrocarbon group, particularly preferably hydrogen or a hydrocarbon group of 1 to 3 carbon atoms, e.g., methyl, ethyl or propyl.

$R^{23}$ and $R^{24}$ may be the same as or different from each other, and are each an alkyl group of 1 to 20 carbon atoms. Examples thereof include those described for the formula (Ia).

Of these, $R^{23}$ is preferably a secondary or tertiary alkyl group.

$R^{24}$ may contain a double bond or a triple bond.

$X^1$ and $X^2$ may be the same as or different from each other, and have the same meanings as defined in the formula (Ia).

Y has the same meaning as defined in the formula (Ia).

Listed below are examples of the transition metal compounds represented by the formula (Ib).

rac-Dimethylsilylene-bis{1-(2,7-dimethyl-4-ethylindenyl)}zirconium dichloride,
rac-Dimethylsilylene-bis{1-(2,7-dimethyl-4-n-propylindenyl)}zirconium dichloride,
rac-Dimethylsilylene-bis{1-(2,7-dimethyl-4-i-propylindenyl)}zirconium dichloride,
rac-Dimethylsilylene-bis{1-(2,7-dimethyl-4-n-butylindenyl)}zirconium dichloride,
rac-Dimethylsilylene-bis{1-(2,7-dimethyl-4-sec-butylindenyl)}zirconium dichloride,
rac-Dimethylsilylene-bis{1-(2,7-dimethyl-4-t-butylindenyl)}zirconium dichloride,
rac-Dimethylsilylene-bis{1-(2,7-dimethyl-4-n-pentylindenyl)}zirconium dichloride,
rac-Dimethylsilylene-bis{1-(2,7-dimethyl-4-n-hexylindenyl)}zirconium dichloride,
rac-Dimethylsilylene-bis{1-(2,7-dimethyl-4-cyclohexylindenyl)}zirconium dichloride,
rac-Dimethylsilylene-bis{1-(2,7-dimethyl-4-methylcyclohexylindenyl)}zirconium dichloride,
rac-Dimethylsilylene-bis{1-(2,7-dimethyl-4-phenylethylindenyl)}zirconium dichloride,
rac-Dimethylsilylene-bis{1-(2,7-dimethyl-4-phenyldichloromethylindenyl)}zirconium dichloride,
rac-Dimethylsilylene-bis{1-(2,7-dimethyl-4-chloromethylindenyl)}zirconium dichloride,
rac-Dimethylsilylene-bis{1-(2,7-dimethyl-4-trimethylsilylmethylindenyl)}zirconium dichloride,
rac-Dimethylsilylene-bis{1-(2,7-dimethyl-4-trimethylsiloxymethylindenyl)}zirconium dichloride,
rac-Diethylsilylene-bis{1-(2,7-dimethyl-4-i-propylindenyl)}zirconium dichloride,
rac-Di(i-propyl)silylene-bis{1-(2,7-dimethyl-4-i-propylindenyl)}zirconium dichloride,
rac-Di(n-butyl)silylene-bis{1-(2,7-dimethyl-4-i-propylindenyl)}zirconium dichloride,
rac-Di(cyclohexyl)silylene-bis{1-(2,7-dimethyl-4-i-propylindenyl)}zirconium dichloride,
rac-Methylphenylsilylene-bis{1-(2,7-dimethyl-4-i-propylindenyl)}zirconium dichloride,
rac-Methylphenylsilylene-bis{1-(2,7-dimethyl-4-t-butylindenyl)}zirconium dichloride,
rac-Diphenylsilylene-bis{1-(2,7-dimethyl-4-t-butylindenyl)}zirconium dichloride,
rac-Diphenylsilylene-bis{1-(2,7-dimethyl-4-i-propylindenyl)}zirconium dichloride,
rac-Diphenylsilylene-bis{1-(2,7-dimethyl-4-ethylindenyl)}zirconium dichloride,
rac-Di(p-tolyl)silylene-bis{1-(2,7-dimethyl-4-i-propylindenyl)}zirconium dichloride,
rac-Di(p-chlorophenyl)silylene-bis{1-(2,7-dimethyl-4-i-propylindenyl)}zirconium dichloride,
rac-Dimethylsilylene-bis{1-(2-methyl-4-i-propyl-7-ethylindenyl)}zirconium dibromide,
rac-Dimethylsilylene-bis{1-(2,3,7-trimethyl-4-ethylindenyl)}zirconium dichloride,
rac-Dimethylsilylene-bis{1-(2,3,7-trimethyl-4-n-propylindenyl)}zirconium dichloride,
rac-Dimethylsilylene-bis{1-(2,3,7-trimethyl-4-i-propylindenyl)}zirconium dichloride,
rac-Dimethylsilylene-bis{1-(2,3,7-trimethyl-4-n-butylindenyl)}zirconium dichloride, rac-Dimethylsilylene-bis{1-(2,3,7-trimethyl-4-sec-butylindenyl)}zirconium dichloride, rac-Dimethylsilylene-bis{1-(2,3,7-trimethyl-4-t-butylindenyl)}zirconium dichloride, rac-Dimethylsilylene-bis{1-(2,3,7-trimethyl-4-n-pentylindenyl)}zirconium dichloride, rac-Dimethylsilylene-bis{1-(2,3,7-trimethyl-4-n-hexylindenyl)}zirconium dichloride, rac-Dimethylsilylene-bis{1-(2,3,7-trimethyl-4-cyclohexylindenyl)}zirconium dichloride, rac-Dimethylsilylene-bis{1-(2,3,7-trimethyl-4-methylcyclohexylindenyl)}zirconium dichloride, rac-Dimethylsilylene-bis{1-(2,3,7-trimethyl-4-trimethylsilylmethylindenyl)}zirconium dichloride, rac-Dimethylsilylene-bis{1-(2,3,7-trimethyl-4-trimethylsiloxymethylindenyl)}zirconium dichloride, rac-Dimethylsilylene-bis{1-(2,3,7-trimethyl-4-phenylethylindenyl)}zirconium dichloride, rac-Dimethylsilylene-bis{1-(2,3,7-trimethyl-4-phenyldichloromethylindenyl)}zirconium dichloride, rac-Dimethylsilylene-bis{1-(2,3,7-trimethyl-4-chloromethylindenyl)}zirconium dichloride, rac-Diethylsilylene-bis{1-(2,3,7-trimethyl-4-i-propylindenyl)}zirconium dichloride, rac-Di(i-propyl)silylene-bis{1-(2,3,7-trimethyl-4-i-propylindenyl)}zirconium dichloride, rac-Di(n-butyl)silylene-bis{1-(2,3,7-trimethyl-4-i-propylindenyl)}zirconium dichloride, rac-Di(cyclohexyl)silylene-bis{1-(2,3,7-trimethyl-4-i-propylindenyl)}zirconium dichloride, rac-Methylphenylsilylene-bis{1-(2,3,7-trimethyl-4-i-propylindenyl)}zirconium dichloride, rac-Methylphenylsilylene-bis{1-(2,3,7-trimethyl-4-t-butylindenyl)}zirconium dichloride, rac-Diphenylsilylene-bis{1-(2,3,7-trimethyl-4-t-butylindenyl)}zirconium dichloride, rac-Diphenylsilylene-bis{1-(2,3,7-trimethyl-4-i-propylindenyl)}zirconium dichloride, rac-Diphenylsilylene-bis{1-(2,3,7-trimethyl-4-ethylindenyl)}zirconium dichloride, rac-Di(p-tolyl)silylene-bis{1-(2,3,7-trimethyl-4-i-propylindenyl)}zirconium dichloride, rac-Di(p-chlorophenyl)silylene-bis{1-(2,3,7-trimethyl-4-i-propylindenyl)}zirconium dichloride, rac-Dimethylsilylene-bis{1-(2-methyl-4-i-propyl-7-methylindenyl)}zirconium dimethyl, rac-Dimethylsilylene-bis{1-(2-methyl-4-i-propyl-7-methylindenyl)}zirconium methylchloride, rac-Dimethylsilylene-bis{1-(2-methyl-4-i-propyl-7-methylindenyl)}zirconium-bis(methanesulfonato), rac-Dimethylsilylene-bis{1-(2-methyl-4-i-propyl-7-methylindenyl)}zirconium-bis(p-phenylsulfinato), rac-Dimethylsilylene-bis{1-(2-methyl-3-methyl-4-i-propyl-7-methylindenyl)}zirconium dichloride, rac-Dimethylsilylene-bis{1-(2-methyl-4,6-di-i-propylindenyl)}zirconium dichloride, rac-Dimethylsilylene-bis{1-(2-ethyl-4-i-propyl-7-methylindenyl)}zirconium dichloride, rac-Dimethylsilylene-bis{1-(2-phenyl-4-i-propyl-7-methylindenyl)}zirconium dichloride, rac-Dimethylsilylene-bis{1-(2-methylindenyl)}zirconium dichloride, rac-Dimethylsilylene-bis{1-(2-methyl-4-i-propyl-7-methylindenyl)}titanium dichloride, and rac-Dimethylsilylene-bis{1-(2-methyl-4-i-propyl-7-methylindenyl)}hafnium dichloride.

Of these, particularly preferred are compounds having branched alkyl groups such as i-propyl, sec-butyl and tert-butyl at the fourth position.

In the invention, the transition metal compounds represented by the formula (Ib) are generally used in the form of racemic modification, but they can be also used in the form of R type or S type.

The transition metal compounds represented by the formula (Ib) can be synthesized from indene derivatives by known processes, for example, a process described in Japanese Patent Laid-Open Publication No. 268307/1992.

Next, the transition metal compound represented by the formula (Ic) is described.

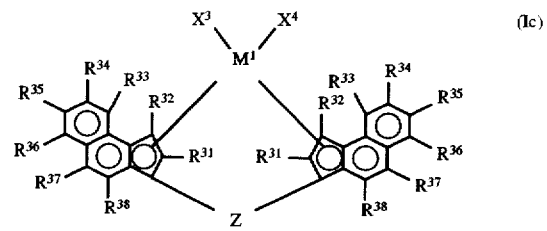

(Ic)

wherein $M^1$ is a transition metal atom of Group IVB of the periodic table, for example, titanium, zirconium or hafnium, preferably zirconium.

Plural $R^{31}$ may be the same as or different from each other, and are each hydrogen, a halogen atom (preferably chlorine or bromine), an alkyl group of 1 to 10 carbon atoms (preferably that of 1 to 4 carbon atoms), a halogenated alkyl group of 1 to 10 carbon atoms, an aryl group of 6 to 10 carbon atoms (preferably that of 6 to 8 carbon atoms), $-NR^{30}{}_2$, $-SR^{30}$, $-OSiR^{30}{}_3$, $-SiR^{30}{}_3$ or $-PR^{30}{}_3$ (wherein $R^{30}$ is a halogen atom (preferably chlorine), an alkyl group of 1 to 10 carbon atoms (preferably that of 1 to 3 carbon atoms), or an aryl group of 6 to 10 carbon atoms (preferably that of 6 to 8 carbon atoms)).

$R^{32}$ to $R^{38}$ may be the same as or different from each other, and are each the same atom or group as that of $R^{31}$, or at least two adjacent groups from among the groups represented by $R^{32}$ to $R^{38}$ may form an aromatic ring or an aliphatic ring together with atoms to which said two groups are bonded.

$X^3$ and $X^4$ may be the same as or different from each other, and are each hydrogen, an alkyl group of 1 to 10 carbon atoms (preferably that of 1 to 3 carbon atoms), an alkoxy group of 1 to 10 carbon atoms (preferably that of 1 to 3 carbon atoms), an aryl group of 6 to 10 carbon atoms (preferably that of 6 to 8 carbon atoms), an aryloxy group of 6 to 10 carbon atoms (preferably that of 6 to 8 carbon atoms), an alkenyl group of 2 to 10 carbon atoms (preferably that of 2 to 4 carbon atoms), an arylalkyl group of 7 to 40 carbon atoms (preferably that of 7 to 10 carbon atoms), an alkylaryl group of 7 to 40 carbon atoms (preferably that of 7 to 12 carbon atoms), an arylalkenyl group of 8 to 40 carbon atoms (preferably that of 8 to 12 carbon atoms), OH group or a halogen atom.

Z is

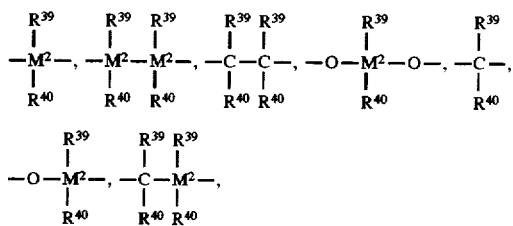

$=BR^{39}$, $=AlR^{39}$, $-Ge-$, $-Sn-$, $-O-$, $-S-$, $=SO_2$, $=SO_2$, $=NR^{39}$, $=CO$, $=PR^{39}$ or $=P(O)R^{39}$.

$R^{39}$ and $R^{40}$ may be the same as or different from each other, and are each hydrogen, a halogen atom, an alkyl group of 1 to 10 carbon atoms (preferably that of 1 to 4 carbon atoms, particularly preferably methyl), a fluoroalkyl group of 1 to 10 carbon atoms (preferably $CF_3$ group), an aryl group of 6 to 10 carbon atoms (preferably that of 6 to 8 carbon atoms), a fluoroaryl group of 6 to 10 carbon atoms (preferably pentafluorophenyl), an alkoxy group of 1 to 10 carbon atoms (preferably that of 1 to 4 carbon atoms, particularly preferably methoxy), an alkenyl group of 2 to 10 carbon atoms (preferably that of 2 to 4 carbon atoms), an arylalkyl group of 7 to 40 carbon atoms (preferably that of 7 to 10 carbon atoms), an arylalkenyl group of 8 to 40 carbon atoms (preferably that of 8 to 12 carbon atoms), or an alkylaryl group of 7 to 40 carbon atoms (preferably that of 7 to 12 carbon atoms).

$R^{39}$ and $R^{40}$ may form a ring together with atoms to which $R^{39}$ and $R^{40}$ are bonded.

$M^2$ is silicon, germanium or tin, and is preferably silicon or germanium.

The alkyl group mentioned above is a straight chain or branched alkyl group; and the halogen (halogenating atom) is fluorine, chlorine, bromine or iodine, particularly fluorine or chlorine.

Of the compounds represented by the formula (Ic), preferred are compounds of said formula wherein:

$M^1$ is zirconium or hafnium, plural $R^{31}$ are the same as each other, and are each an alkyl group of 1 to 4 carbon atoms, $R^{32}$ to $R^{38}$ may be the same as or different from each other, and are each hydrogen or an alkyl group of 1 to 4 carbon atoms, $X^3$ and $X^4$ may be the same as or different from each other, and are each an alkyl group of 1 to 3 carbon atoms or a halogen atom, and Z is

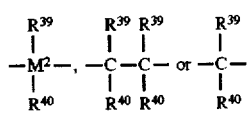

(wherein $M^2$ is silicon, and $R^{39}$ and $R^{40}$ may be the same as or different from each other and are each an alkyl group of 1 to 4 carbon atoms or an aryl group of 6 to 10 carbon atoms).

Of such compounds, more preferred are compounds in which the substituents $R^{32}$ and $R^{38}$ are each hydrogen, and $R^{33}$ to $R^{37}$ are each an alkyl group of 1 to 4 carbon atoms or hydrogen.

Of the compounds represented by the formula (Ic), more preferred are compounds of said formula wherein:

$M^1$ is zirconium, plural $R^{31}$ are the same as each other, and are each an alkyl group of 1 to 4 carbon atoms, $R^{32}$ and $R^{38}$ are each hydrogen, $R^{33}$ to $R^{37}$ may be the same as or different from each other, and are each an alkyl group of 1 to 4 carbon atoms or hydrogen, $X^3$ and $X^4$ are each chlorine, and Z is

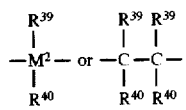

(wherein $M^2$ is silicon, and $R^{39}$ and $R^{40}$ may be the same as or different from each other and are each an alkyl group of 1 to 4 carbon atoms or an aryl group of 6 to 10 carbon atoms).

Of the compounds represented by the formula (Ic), particularly preferred are compounds of said formula wherein:

$M^1$ is zirconium, plural $R^{31}$ are each methyl, $R^{32}$ to $R^{38}$ are each hydrogen, $X^3$ and $X^4$ are each chlorine, and Z is

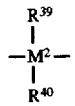

(wherein $M^2$ is silicon, and $R^{39}$ and $R^{40}$ may be the same as or different from each other and are each methyl or phenyl).

Listed below are examples of the transition metal compounds represented by the formula (Ic).

rac-Dimethylsilylene-bis{1-(2-methyl-4,5-benzoindenyl)}zirconium dichloride, rac-Dimethylsilylene-bis{1-(2-methyl-(α-acenaphthoindenyl)}zirconium dichloride, rac-Methylphenylsilylene-bis{1-(2-methyl-4,5-benzoindenyl)}zirconium dichloride, rac-Diphenylsilylene-bis{1-(2-methyl-4,5-benzoindenyl)}zirconium dichloride, rac-Diphenylsilylene-bis{1-(2-methyl-α-acenaphthoindenyl)}zirconium dichloride, rac-Methylphenylsilylene-bis{1-(2-methyl-α-acenaphthoindenyl)}zirconium dichloride, rac-1,2-Ethanediyl-bis{1-(2-methyl-4,5-benzoindenyl)}zirconium dichloride, rac-1,2-Butanediyl-bis{1-(2-methyl-4,5-benzoindenyl)}zirconium dichloride, and rac-Dimethylsilylene-bis{1-(4,5-benzoindenyl)}zirconium dichloride.

Also employable are compounds obtained by replacing zirconium with titanium or hafnium in the above-mentioned zirconium compounds.

In the present invention, the transition metal compounds (A') may be used in combination of two or more kinds.

Next, the organoaluminum oxy-compound (B') used in the invention is described.

The organoaluminum oxy-compound (B') has a molar ratio of alkyl group to aluminum atom contained therein, R/Al ratio, of not more than 1.8, preferably 1.8 to 1.2, more preferably 1.7 to 1.4.

As the organoaluminum oxy-compound having an R/Al ratio of not more than 1.8, a commercially available aluminoxane having the above-defined R/Al ratio is employable, or the organoaluminum oxy-compound can be prepared by a process similar to that for preparing the aforesaid organoaluminum oxy-compound having an R/Al ratio of 1.7 to 2.1. That is, the organoaluminum oxy-compound (B') can be prepared by the following processes:

(a) a process comprising bringing a conventionally known organoaluminum oxy-compound such as commercially available aluminoxane into contact with water to adjust the R/Al ratio, (b) a process comprising bringing a conventionally known organoaluminum oxy-compound such as commercially available aluminoxane into contact with an inorganic compound substantially not containing water to adjust the R/Al ratio, and (c) a process comprising temporarily evaporating a solvent from a conventionally known organoaluminum oxy-compound such as commercially available aluminoxane to dry the organoaluminum oxy-compound, and redissolving it in a solvent to adjust the R/Al ratio.

The above processes may be used in combination.

When the organoaluminum oxy-compound having an R/Al ratio of not more than 1.8 is prepared by the above processes, the same conditions as described above in the preparation of the organoaluminum oxy-compound having an R/Al ratio of 1.7 to 2.1 can be adopted.

The propylene polymerization catalyst of the invention is formed from the fine particle carrier, the transition metal compound (A') and the organoaluminum oxy-compound (B'), but it may further contain the organoaluminum compound (C) if necessary.

In the invention, the propylene polymerization catalyst may further contain other components useful for propylene polymerization in addition to the above-described components.

As described above, the propylene polymerization catalyst according to the invention comprises:

the fine particle carrier, at least one transition metal compound (A') selected from the compounds represented by the above formulas (I), (Ia), (Ib) and (Ic), and the organoaluminum oxy-compound (B') having a molar ratio of alkyl group to aluminum atom, (alkyl group/aluminum atom), of not more than 1.8, said transition metal compound (A') and said organoaluminum oxy-compound (B') being supported on the fine particle carrier.

In the preparation of the propylene polymerization catalyst (solid catalyst), the same processes and conditions as described above in the preparation of the olefin polymerization catalyst (solid catalyst) can be adopted. In this case, the organoaluminum compound (C) may be added if necessary.

The propylene polymerization catalyst of the invention may be a prepolymerized catalyst obtained by prepolymerizing the solid catalyst (component) with an olefin.

In the preparation of such propylene polymerization catalyst (prepolymerized catalyst), the same processes and conditions as described above in the preparation of the olefin polymerization catalyst, (prepolymerized catalyst) can be adopted. In this case, the organoaluminum compound (C) may be added if necessary.

Examples of the olefins used for the prepolymerization include α-olefins of 2 to 30 carbon atoms, such as ethylene, propylene, 1-butene, 1-pentene, 4-methyl-1-pentene, 1-hexene, 1-octene, 1-decene, 1-dodecene and 1-tetradecene. Of these, particularly preferred is propylene or a combination of propylene and the same α-olefin as used in the polymerization.

The propylene polymerization catalyst of the invention is a catalyst containing the transition metal compound and the organoaluminum oxy-compound both supported on the fine particle carrier, and uses the specific transition metal compound (A') and the organoaluminum oxy-compound (B') having an R/Al ratio of not more than 1.8 in combination. Such propylene polymerization catalyst shows high polymerization activity and hardly produces a low-molecular component. Further, the propylene polymer obtained by the use of such catalyst shows excellent particle properties and does not stick to the wall of the polymerization reactor.

Next, the process for preparing a propylene polymer according to the invention is described.

In the present invention, homopolymerization of propylene or copolymerization of propylene and other olefin than propylene is carried out in the presence of the above-mentioned propylene polymerization catalyst so as to prepare a propylene polymer.

In the invention, the propylene polymer means a (co)polymer having a ratio of the propylene units to the whole monomer units in the (co) polymer of not less than 50% by mol, and includes a homopolymer of propylene and a random or block copolymer of propylene and other olefin than propylene.

Examples of the olefins to be copolymerized with propylene include α-olefins of 2 to 20 carbon atoms other than propylene and cycloolefins of 5 to 20 carbon atoms. Also employable are styrene, vinylcyclohexane and diene.

The polymerization can be carried out by any of a liquid phase polymerization process and a gas phase polymerization process. In the liquid phase polymerization process, the same inert hydrocarbon solvent as used for preparing the catalyst is employable, or the olefin itself can be also used as the solvent.

In the (co)polymerization of propylene using the propylene polymerization catalyst of the invention, the same conditions as described above in the (co)polymerization of an olefin using the olefin polymerization catalyst can be adopted. Further an organoaluminum compound identical with the organoaluminum compound (C) may be used in the polymerization, and in this case, the organoaluminum compound is used in an amount of not more than 500 mol, preferably 5 to 200 mol, per 1 g-atom of the transition metal atom in the transition metal compound (Al).

EFFECT OF THE INVENTION

By the use of the olefin polymerization catalyst of the invention, a fine-powdery polymer is hardly produced in the polymerization procedure, and a polymer showing excellent particle properties can be obtained.

In the process for olefin polymerization according to the invention, a fine-powdery polymer is hardly produced in the polymerization procedure, and a polymer showing excellent particle properties can be obtained. Moreover, the resulting olefin polymer does not stick to the wall of the polymerization reactor.

The propylene polymerization catalyst of the invention has high polymerization activity and hardly produces a low-molecular component. Moreover, the resulting propylene polymer shows excellent particle properties, and the propylene polymer does not stick to the wall of the polymerization reactor.

In the process for preparing a propylene polymer according to the invention, a propylene polymer showing excellent particle properties can be prepared with high polymerization activity, and a low-molecular component is hardly produced. Moreover, the resulting propylene polymer does not stick to the wall of the polymerization reactor.

EXAMPLE

The present invention will be further described with reference to the following examples, but it should be construed that the invention is in no way limited to those examples.

Example 1

Adjustment of CH$_3$/Al molar ratio of methylaluminoxane

To a glass flask thoroughly purged with nitrogen was introduced 100 ml of a toluene solution of methylaluminoxane (CH$_3$/Al molar ratio: 2.23, TMA (Area): 0.42) (Al: 1.44 mol/liter).

The system was cooled to 0° C., and 1.8 g of silica containing 0.26 g of water was dropwise added over a period of 30 minutes, while keeping the temperature of the system at 0° to 2° C. After the dropwise addition was completed, the reaction was carried out at 0° C. for 30 minutes.

Subsequently, the temperature of the system was raised to 40° C. over a period of 30 minutes, and the reaction was carried out at the same temperature for 6 hours. Then, the system was cooled to room temperature, and the supernatant liquid was recovered. The toluene solution of methylaluminoxane thus obtained was a colorless transparent homogeneous solution, and the methylaluminoxane had a CH$_3$/Al molar ratio of 2.00 and TMA (Area) of 0.32.

Preparation of solid catalyst

To a glass flask thoroughly purged with nitrogen were introduced 6.9 g of silica (specific surface area: 357 m$^2$/g, mean particle diameter: 47 μm) having been dried at 250° C. for 10 hours and 100 ml of toluene, and the system was cooled to 0° C. Then, 64 ml of the toluene solution (Al: 0.830 mol/liter) of methylaluminoxane as prepared above was dropwise added over a period of 30 minutes, while keeping the temperature of the system at 0° to 3° C. Subsequently, the reaction was carried out at 0° C. for 20 minutes. Then, the temperature was raised up to 95° C. over a period of 1 hour, and the reaction was further carried out at the same temperature for 4 hours. Thereafter, the system was cooled to 60° C., and the supernatant was removed by decantation.

After the solid component thus obtained was washed twice with toluene, it was resuspended in toluene to give a whole volume of 125 ml. Then, 50 ml of the suspension was transferred into another glass flask, to which was added 6.4 ml of a toluene solution of bis(1,3-n-butylmethylcyclopentadienyl)zirconium dichloride (Zr: 23.8 mmol/liter) at room temperature so as to give Al/Zr molar ratio of 130 in the reaction system, and the reaction was carried out at 80° C. for 2 hours. Then, the supernatant was removed and the remainder was washed twice with hexane, to obtain a solid catalyst (a-1) containing 3.5 mg of zirconium and 138 mg of aluminum per 1 g of the solid catalyst.

Preparation of prepolymerized catalyst

To 130 ml of hexane containing 7.7 mmol of triisobutylaluminum were added 3.9 g of the solid catalyst (a-1) as obtained above and 0.53 ml of 1-hexene, and then ethylene was introduced to perform prepolymerization at 35° C. for 2 hours. The supernatant was removed, the remainder was washed twice with hexane, and then filtered with a glass filter (G3) to separate a solid component which was dried with a vacuum pump at room temperature for 2 hours. Thus, a prepolymerized catalyst (b-1) containing 3.3 mg of zirconium and 3 g of a polymer per 1 g of the solid catalyst (a-1) was obtained.

Figure 4:
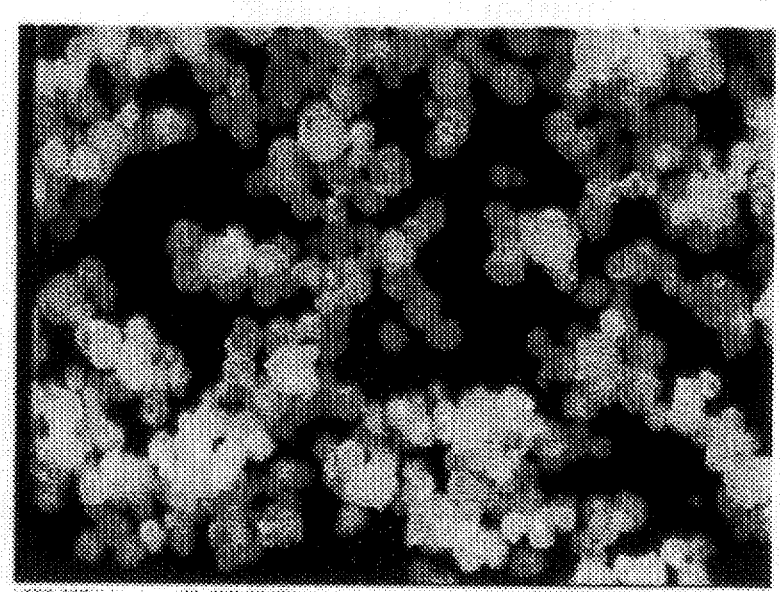
FIG. 4 is a photomicrograph of a particle structure of a prepolymerized catalyst prepared in Example 1.

In the above procedure, it was found that the prepolymerized catalyst (b-1) did not stick to the reactor or the stirring blade. The prepolymerized catalyst (b-1) had a favorable shape, a bulk density of 0.40 g/cm$^3$ and a fluidity index of 55. An electron photomicrograph of the particle structure of the prepolymerized catalyst (b-1) is shown in FIG. 4.

Polymerization

To a 2-liter stainless steel autoclave thoroughly purged with nitrogen was introduced 1 liter of hexane, and the system was purged with ethylene. Then, 40 ml of 1-hexene was added and the temperature of the system was raised to 70° C. Subsequently, 0.75 mmol of triisobutylaluminum and 0.005 mmol (in terms of zirconium) of the prepolymerized catalyst (b-1) as prepared above were pressed with ethylene into the system to initiate polymerization.

Thereafter, the polymerization was carried out at 80° C. and 8 kg/cm$^2$-G for 1.5 hours with continuously feeding ethylene.

The polymer produced was recovered by filtration and dried overnight at 80° C., to obtain 346 g of an ethylene-1-hexene copolymer having a melt flow rate (MFR), as measured at 190° C. under a load of 2.16 kg, of 0.15 g/10 min, a density of 0.924 g/cm$^3$, a bulk density of 0.45 g/cm$^3$ and a mean particle diameter of 600 μm.

In the above procedure, it was found that no polymer stuck to the wall of the polymerization reactor or the stirring blade.

Comparative Example 1

Preparation of solid catalyst

A solid catalyst (a-2) was prepared in the same manner as in Example 1 except that methylaluminoxane having a CH$_3$/Al molar ratio of 2.23 and TMA (Area) of 0.42 was used in place of the methylaluminoxane having a CH$_3$/Al molar ratio of 2.00. In 1 g of the solid catalyst (a-2), 115 mg of aluminum and 3.0 mg of zirconium were contained.

Preparation of prepolymerized catalyst

To 130 ml of hexane containing 6.4 mmol of triisobutylaluminum were added 3.9 g of the solid catalyst (a-2) as obtained above and 0.53 ml of 1-hexene, and then ethylene was introduced to perform prepolymerization at 35° C. for 2 hours. The supernatant was removed, the remainder was washed twice with hexane, and then filtered with a glass filter (G3) to separate a solid component which was dried with a vacuum pump at room temperature for 2 hours. Thus, a prepolymerized catalyst (b-2) containing 2.7 mg of zirconium and 3 g of a polymer per 1 g of the solid catalyst (a-2) was obtained.

Figure 5:
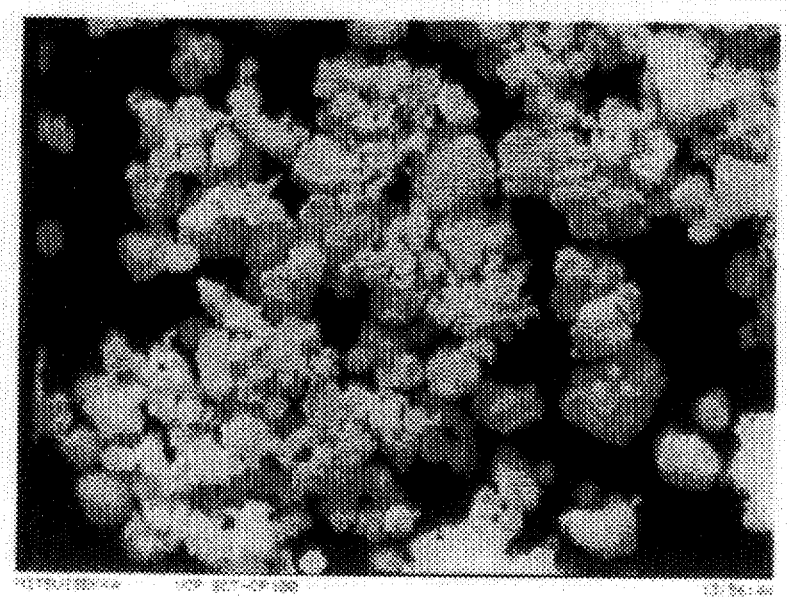
FIG. 5 is a photomicrograph of a particle structure of a prepolymerized catalyst prepared in Comparative Example 1.

In the above procedure, it was found that the prepolymerized catalyst (b-2) stuck to the reactor and the stirring blade, and on the surface of the prepolymerized catalyst (b-2) was found a cotton-like polymer. This prepolymerized catalyst (b-2) had a bulk density of 0.33 g/cm$^3$ and a fluidity index of 41. An electron photomicrograph of the particle structure of the prepolymerized catalyst (b-2) is shown in FIG. 5.

Polymerization

Polymerization of ethylene and 1-hexene was carried out in the same manner as in Example 1 except that 0.005 mmol (in terms of zirconium) of the prepolymerized catalyst (b-2) was used in place of the prepolymerized catalyst (b-1), to obtain 304 g of an ethylene-1-hexene copolymer having MFR of 0.17 g/10 min, a density of 0.925 g/cm$^3$, a bulk density of 0.44 g/cm$^3$ and a mean particle diameter of 540 μm.

It was found that the polymer stuck to the wall of the polymerization reactor and the stirring blade.

Comparative Example 2

Adjustment of CH$_3$/Al molar ratio of methylaluminoxane

To a glass flask thoroughly purged with nitrogen was introduced 100 ml of a toluene solution of methylaluminoxane (CH$_3$/Al molar ratio: 2.23, TMA (Area) 0.42) (Al: 1.44 mol/liter).

The system was cooled to 0° C., and 3.0 g of silica containing 0.65 g of water was dropwise added over a period of 45 minutes, while keeping the temperature of the system at 0° to 2° C. After the dropwise addition was completed, the reaction was carried out at 0° C. for 30 minutes.

Subsequently, the temperature of the system was raised to 40° C. over a period of 30 minutes, and the reaction was carried out at the same temperature for 6 hours. Then, the system was cooled to room temperature, and the supernatant was recovered. The toluene solution of methylaluminoxane thus obtained was a colorless transparent homogeneous solution, and the methylaluminoxane had a $CH_3/Al$ molar ratio of 1.69 and TMA (Area) of 0.24.

Preparation of solid catalyst

A solid catalyst (a-3) was prepared in the same manner as in Example 1 except that the methylaluminoxane having a $CH_3/Al$ molar ratio of 1.69 as obtained above was used in place of the methylaluminoxane having a $CH_3/Al$ molar ratio of 2.00 as prepared in Example 1. In 1 g of the solid catalyst (a-3), 143 mg of aluminum and 3.6 mg of zirconium were contained.

Preparation of prepolymerized catalyst

To 130 ml of hexane containing 7.6 mmol of triisobutylaluminum were added 3.8 g of the solid catalyst (a-3) as obtained above and 0.50 ml of 1-hexene, and ethylene was introduced to perform prepolymerization at 35° C. for 1.7 hours. The supernatant was removed, the remainder was washed twice with hexane, and then filtered with a glass filter (G3) to separate a solid component which was dried with a vacuum pump at room temperature for 2 hours. Thus, a prepolymerized catalyst (b-3) containing 3.5 mg of zirconium and 3 g of a polymer per 1 g of the solid catalyst (a-3) was obtained.

In the above procedure, it was found that the prepolymerized catalyst (b-3) did not stick to the reactor or the stirring blade. However, the prepolymerized catalyst (b-3) had an unfavorable shape, a bulk density of 0.31 g/cm$^3$ and a fluidity index of 44.

Polymerization

Polymerization of ethylene and 1-hexene was carried out in the same manner as in Example 1 except that 0.005 mmol (in terms of zirconium) of the prepolymerized catalyst (b-3) was used in place of the prepolymerized catalyst (b-1), to obtain 272 g of an ethylene-1-hexene copolymer having MFR of 0.14 g/10 min, a density of 0.924 g/cm$^3$, a bulk density of 0.40 g/cm$^3$ and a mean particle diameter of 470 μm.

It was found that no polymer stuck to the wall of the polymerization reactor and the stirring blade, but powdering of the polymer was observed (the amount of the fine-powdery polymer having particle diameters of not more than 100 μm was 0.01% by weight in Example 1, while the amount thereof in this comparative example was 0.23% by weight).

Example 2

Adjustment of $CH_3/Al$ molar ratio of methylaluminoxane

To a glass flask thoroughly purged with nitrogen was introduced 100 ml of a toluene solution of methylaluminoxane ($CH_3/Al$ molar ratio: 2.13, TMA (Area): 0.42) (Al: 1.56 mol/liter).

The system was cooled to 0° C., and 1.7 g of silica containing 0.15 g of water was dropwise added over a period of 30 minutes, while keeping the temperature of the system at 0° to 2° C. After the dropwise addition was completed, the reaction was carried out at 0° C. for 30 minutes.

Subsequently, the temperature of the system was raised to 40° C. over a period of 30 minutes, and the reaction was carried out at the same temperature for 6 hours. Then, the system was cooled to room temperature, and the supernatant was recovered. The toluene solution of methylaluminoxane thus obtained was a colorless transparent homogeneous solution, and the methylaluminoxane had a $CH_3/Al$ molar ratio of 2.03 and TMA (Area) of 0.37.

Preparation of solid catalyst

A solid catalyst (a-4) was prepared in the same manner as in Example 1 except that the methylaluminoxane having a $CH_3/Al$ molar ratio of 2.03 as obtained above was used in place of the methylaluminoxane having a $CH_3/Al$ molar ratio of 2.00 as prepared in Example 1. In 1 g of the solid catalyst (a-4), 140 mg of aluminum and 3.5 mg of zirconium were contained.

Preparation of prepolymerized catalyst

To 130 ml of hexane containing 7.6 mmol of triisobutylaluminum were added 3.9 g of the solid catalyst (a-4) as obtained above and 0.53 ml of 1-hexene, and ethylene was introduced to perform prepolymerization at 35° C. for 1.7 hours. The supernatant was removed, the remainder was washed twice with hexane, and then filtered with a glass filter (G3) to separate a solid component which was dried with a vacuum pump at room temperature for 2 hours. Thus, a prepolymerized catalyst (b-4) containing 3.4 mg of zirconium and 3 g of a polymer per 1 g of the solid catalyst (a-4) was obtained.

In the above procedure, it was found that the prepolymerized catalyst (b-4) did not stick to the reactor or the stirring blade. The prepolymerized catalyst (b-4) had a favorable shape, a bulk density of 0.39 g/cm$^3$ and a fluidity index of 53.

Polymerization

Polymerization of ethylene and 1-hexene was carried out in the same manner as in Example 1 except that 0.005 mmol (in terms of zirconium) of the prepolymerized catalyst (b-4) was used in place of the prepolymerized catalyst (b-1), to obtain 362 g of an ethylene-1-hexene copolymer having MFR of 0.13 g/10 min, a density of 0.925 g/cm$^3$, a bulk density of 0.44 g/cm$^3$ and a mean particle diameter of 640 μm.

It was found that no polymer stuck to the wall of the polymerization reactor or the stirring blade.

Example 3

Adjustment of $CH_3/Al$ molar ratio of methylaluminoxane

To a glass flask thoroughly purged with nitrogen was introduced 100 ml of a toluene solution of methylaluminoxane ($CH_3/Al$ molar ratio: 2.11, TMA (Area): 0.41) (Al: 1.77 mol/liter).

The system was cooled to 0° C., and 1.7 g of silica containing 0.16 g of water was dropwise added over a period of 30 minutes, while keeping the temperature of the system at 0° to 2° C. After the dropwise addition was completed, the reaction was carried out at 0° C. for 30 minutes.

Subsequently, the temperature of the system was raised to 40° C. over a period of 30 minutes, and the reaction was carried out at the same temperature for 6 hours. Then, the system was cooled to room temperature, and the supernatant was recovered. The toluene solution of methylaluminoxane thus obtained was a colorless transparent homogeneous solution, and the methylaluminoxane had a $CH_3/Al$ molar ratio of 1.97 and TMA (Area) of 0.35.

Preparation of solid catalyst

A solid catalyst (a-5) was prepared in the same manner as in Example 1 except that the methylaluminoxane having a $CH_3/Al$ molar ratio of 1.97 as obtained above was used in place of the methylaluminoxane having a $CH_3/Al$ molar ratio of 2.00 as prepared in Example 1. In 1 g of the solid catalyst (a-5), 137 mg of aluminum and 3.6 mg of zirconium were contained.

Preparation of prepolymerized catalyst

To 130 ml of hexane containing 7.6 mmol of triisobutylaluminum were added 3.9 g of the solid catalyst (a-5) as obtained above and 0.53 ml of 1-hexene, and ethylene was introduced to perform prepolymerization at 35° C. for 1.8 hours. The supernatant was removed, the remainder was washed twice with hexane, and then filtered with a glass filter (G3) to separate a solid component which was dried with a vacuum pump at room temperature for 2 hours. Thus, a prepolymerized catalyst (b-5) containing 3.5 mg of zirconium and 3 g of a polymer per 1 g of the solid catalyst (a-5) was obtained.

In the above procedure, it was found that the prepolymerized catalyst (b-5) did not stick to the reactor or the stirring blade. The prepolymerized catalyst (b-5) had a favorable shape, a bulk density of 0.39 g/cm$^3$ and a fluidity index of 53.

Polymerization

Polymerization of ethylene and 1-hexene was carried out in the same manner as in Example 1 except that 0.005 mmol (in terms of zirconium) of the prepolymerized catalyst (b-5) was used in place of the prepolymerized catalyst (b-1), to obtain 346 g of an ethylene-1-hexene copolymer having MFR of 0.16 g/10 min, a density of 0.924 g/cm$^3$, a bulk density of 0.44 g/cm$^3$ and a mean particle diameter of 610 μm.

It was found that no polymer stuck to the wall of the polymerization reactor or the stirring blade.

Example 4

Adjustment of CH$_3$/Al molar ratio of methylaluminoxane

To a glass flask thoroughly purged with nitrogen was introduced 100 ml of a toluene solution of methylaluminoxane (CH$_3$/Al molar ratio: 1.68, TMA (Area): 0.24) (Al: 1.56 mol/liter).

The system was cooled to 0° C. Then, 2.4 g of silica having an adsorbed water content of 0.005% by weight and a surface hydroxyl group content of 3.0% by weight was dropwise added over a period of 30 minutes, while keeping the temperature of the system at 0° to 2° C. After the dropwise addition was completed, the reaction was carried out at 0° C. for 30 minutes.

Subsequently, the temperature of the system was raised to 40° C. over a period of 30 minutes, and the reaction was carried out for 6 hours at the same temperature. Then, the system was cooled to room temperature, and the supernatant was recovered. The toluene solution of methylaluminoxane thus obtained was a colorless transparent homogeneous solution, and the methylaluminoxane had a CH$_3$/Al molar ratio of 1.72 and TMA (Area) of 0.32.

Preparation of solid catalyst

A solid catalyst (a-6) was prepared in the same manner as in Example 1 except that the methylaluminoxane having a CH$_3$/Al molar ratio of 1.72 as obtained above was used in place of the methylaluminoxane having a CH$_3$/Al molar ratio of 2.00 as prepared in Example 1. In 1 g of the solid catalyst (a-6), 138 mg of aluminum and 3.4 mg of zirconium were contained.

Preparation of prepolymerized catalyst

To 130 ml of hexane containing 7.5 mmol of triisobutylaluminum were added 3.9 g of the solid catalyst (a-6) as obtained above and 0.53 ml of 1-hexene, and ethylene was introduced to perform prepolymerization at 35° C. for 1.7 hours. The supernatant was removed, the remainder was washed twice with hexane, and then filtered with a glass filter (G3) to separate a solid component which was dried with a vacuum pump at room temperature for 2 hours. Thus, a prepolymerized catalyst (b-6) containing 3.3 mg of zirconium and 3 g of a polymer per 1 g of the solid catalyst (a-6) was obtained.

In the above procedure, it was found that the prepolymerized catalyst (b-6) did not stick to the reactor or the stirring blade. The prepolymerized catalyst (b-6) had a favorable shape, a bulk density of 0.39 g/cm$^3$ and a fluidity index of 53.

Polymerization

Polymerization of ethylene and 1-hexene was carried out in the same manner as in Example 1 except that 0.005 mmol (in terms of zirconium) of the prepolymerized catalyst (b-6) was used in place of the prepolymerized catalyst (b-1), to obtain 357 g of an ethylene-1-hexene copolymer having MFR of 0.15 g/10 min, a density of 0.925 g/cm$^3$, a bulk density of 0.44 g/cm$^3$ and a mean particle diameter of 620 μm.

It was found that no polymer stuck to the wall of the polymerization reactor or the stirring blade.

Example 5

Preparation of prepolymerized catalyst

A prepolymerized catalyst (bb-7) was prepared in the same manner as in Example 1 except that bis(1,3-n-propylmethylcyclopentadienyl)zirconium dichloride was used in place of bis(1,3-n-butylmethylcyclopentadienyl) zirconium dichloride for obtaining a solid catalyst (aa-7). The prepolymerized catalyst (bb-7) contained 3.2 mg of zirconium and 3 g of a polymer per 1 g of the solid catalyst (aa-7), and had a bulk density of 0.39 g/cm$^3$ and a fluidity index of 51.

Polymerization

Polymerization of ethylene and 1-hexene was carried out in the same manner as in Example 1 except for using the prepolymerized catalyst (bb-7), to obtain 363 g of an ethylene-1-hexene copolymer having MFR of 0.17 g/10 min, a density of 0.926 g/cm$^3$, a bulk density of 0.43 g/cm$^3$ and a mean particle diameter of 650 μm.

Example 6

Preparation of prepolymerized catalyst

A prepolymerized catalyst (bb-8) was prepared in the same manner as in Example 5 except for using bis(1,3-dimethylcyclopentadienyl)zirconium dichloride for obtaining a solid catalyst (aa-8). The propolymerized catalyst (bb-8) contained 3.1 mg of zirconium and 3 g of a polymer per 1 g of the solid catalyst (aa-8), and had a bulk density of 0.37 g/cm$^3$ and a fluidity index of 47.

Polymerization

Polymerization of ethylene and 1-hexene was carried out in the same manner as in Example 1 except for using the prepolymerized catalyst (bb-8), to obtain 313 g of an ethylene-1-hexene copolymer having MFR of 0.01 g/10 min or less, a density of 0.923 g/cm$^3$, a bulk density of 0.40 g/cm$^3$ and a mean particle diameter of 650 μm.

The results obtained in the above examples are set forth in Table 1.

TABLE 1

| | Organoaluminum Oxy-compound | | Prepolymerized Catalyst | | Yield of |
|---|---|---|---|---|---|
| | CH₃/Al (molar ratio) | TMA (area) | Bulk density (g/cm³) | Fludidity Index | Polymer (g) |
| Ex. 1 | 2.00 | 0.32 | 0.40 | 55 | 346 |
| Comp. Ex. 1 | 2.23 | 0.42 | 0.33 | 41 | 304 |
| Comp. Ex. 2 | 1.69 | 0.24 | 0.31 | 44 | 272 |
| Ex. 2 | 2.03 | 0.37 | 0.39 | 54 | 362 |
| Ex. 3 | 1.97 | 0.35 | 0.39 | 53 | 346 |
| Ex. 4 | 1.72 | 0.32 | 0.39 | 53 | 357 |
| Ex. 5 | 2.00 | 0.32 | 0.39 | 51 | 363 |
| Ex. 6 | 2.00 | 0.32 | 0.37 | 47 | 313 |

| | MFR (g/10 min) | Density (g/10 min) | Bulk Density (g/cm³) | Mean Particle Diameter (μm) | Amount of Fine Powder (%) |
|---|---|---|---|---|---|
| Ex. 1 | 0.15 | 0.924 | 0.45 | 600 | <0.01 |
| Comp. Ex. 1 | 0.17 | 0.925 | 0.44 | 540 | — |
| Comp. Ex. 2 | 0.14 | 0.924 | 0.40 | 470 | 0.23 |
| Ex. 2 | 0.13 | 0.925 | 0.44 | 640 | — |
| Ex. 3 | 0.16 | 0.924 | 0.44 | 610 | — |
| Ex. 4 | 0.15 | 0.925 | 0.44 | 620 | — |
| Ex. 5 | 0.17 | 0.926 | 0.43 | 650 | — |
| Ex. 6 | <0.01 | 0.923 | 0.40 | 600 | — |

Example 7

Adjustment of CH₃/Al molar ratio of methylaluminoxane

To a stainless steel reactor thoroughly purged with nitrogen was introduced 47.8 kg (77.5 mol in terms of Al) of a toluene solution of methylaluminoxane (CH₃/Al molar ratio: 2.23, TMA (Area): 0.42) (Al: 1.44 mol/liter).

The system was cooled to 0° C., and 775 g of silica containing 140 g of water was dropwise added over a period of 65 minutes, while keeping the temperature of the system at 0° to 5° C. After the dropwise addition was completed, the reaction was carried out at 0° C. for 30 minutes.

Subsequently, the temperature of the system was raised to 40° C. over a period of 1 hour, and the reaction was carried out at the same temperature for 6 hours. Then, the system was cooled to room temperature, and the supernatant was recovered. The toluene solution of methylaluminoxane thus obtained was a colorless transparent homogeneous solution, and the methylaluminoxane had a CH₃/Al molar ratio of 2.00 and TMA (Area) of 0.32.

Preparation of solid catalyst

In 80 liters of toluene, 4.4 kg of silica (specific surface area: 307 m²/g, mean particle diameter: 45 μm) having been dried at 250° C. for 10 hours was suspended, and the suspension was cooled to 0° C. Then, 24.7 liters of the toluene solution of methylaluminoxane having a CH₃/Al molar ratio of 2.00 (Al: 1.36 mol/liter) as prepared above was dropwise added over a period of 1 hour, while keeping the temperature of the system at 0° to 5° C. Subsequently, the reaction was carried out at 0° C. for 30 minutes. Then, the temperature was raised up to 95° C. over a period of 1.5 hours, and the reaction was further carried out at the same temperature for 4 hours. Thereafter, the system was cooled to 60° C., and the supernatant was removed by decantation.

The solid component thus obtained was washed twice with toluene and resuspended in 80 liters of toluene. To the system was dropwise added 8.6 liters of a toluene solution of bis(1,3-n-butylmethylcyclopentadienyl)zirconium dichloride (Zr: 29.9 mmol/liter) at 80° C. over a period of 30 minutes, and the reaction was carried out at 80° C. for 2 hours. Then, the supernatant was removed and the remainder was washed twice with hexane, to obtain a solid catalyst (a-7) containing 3.6 mg of zirconium per 1 g of the solid catalyst.

Preparation of prepolymerized catalyst

To 80 liters of hexane containing 2.9 mol of triisobutylaluminum were added 1.47 kg of the solid catalyst (a-7) as obtained above and 132 g of 1-hexene, and ethylene was introduced to perform prepolymerization at 35° C. for 4 hours. Thus, a prepolymerized catalyst (b-7) containing 3 g of a polymer per 1 g of the solid catalyst (a-7) was obtained. This prepolymerized catalyst (b-7) had a bulk density of 0.39 g/cm³ and a fluidity index of 50.

Polymerization

In a continuous fluidized bed gas phase polymerization reactor, copolymerization of ethylene and 1-hexene was carried out at a polymerization temperature of 80° C. under the total pressure of 20 kg/cm²-G. That is, to the reactor were continuously fed the prepolymerized catalyst (b-7) as prepared above at a feed rate of 0.11 mmol/hr (in terms of zirconium atom) and triisobutylaluminum at a feed rate of 5 mmol/hr, while ethylene, 1-hexene, hydrogen and nitrogen were contiguously fed to keep a constant gas composition (gas composition: 1-hexene/ethylene=0.024 (mol/mol), hydrogen/ethylene=2.5×10⁻⁴ (mol/mol), concentration of ethylene=47%). Thus, an ethylene-1-hexene copolymer was obtained in an yield of 8.3 kg/hr, and had MFR of 1.10 g/10 min and a density of 0.918 g/cm³.

Further, the polymerization conditions were varied as shown in Table 2 to synthesize ethylene-1-hexene copolymers different in MFR and density. In each process, the polymerization proceeded very stably, and it was found that no polymer stuck to the wall of the reactor even after one-week continuous operation.

TABLE 2

| | Organoaluminum Oxy-compound | | Prepolymerized Catalyst | | Temperature (°C.) |
|---|---|---|---|---|---|
| | CH₃/Al (molar ratio) | TMA (area) | Bulk density (g/cm³) | Fludidity Index | |
| Ex. 7 | 2.00 | 0.32 | 0.39 | 50 | 70 |
| | 2.00 | " | " | " | 70 |
| | 2.00 | " | " | " | 70 |

| | 1-Hexene/ Ethylene (mol/mol) | Hydrogen/ Ethylene (mol/mol) | Concentration of Ethylene (%) | MFR (g/10 min) | Density (g/cm³) |
|---|---|---|---|---|---|
| Ex. 7 | 0.022 | 2.8 × 10⁻⁴ | 48 | 1.10 | 0.918 |
| | 0.025 | 1.6 × 10⁻⁴ | 25 | 0.62 | 0.915 |
| | 0.019 | 0.6 × 10⁻⁴ | 27 | 0.58 | 0.927 |

Example 8

Preparation of catalyst

To a glass flask thoroughly purged with nitrogen were introduced 107 ml of toluene, 32 ml of a toluene solution of methylaluminoxane (CH₃/Al molar ratio: 1.69) (Al: 1.33 mol/liter) and 15 ml of a toluene solution of bis(1,3-n-butylmethylcyclopentadienyl)zirconium dichloride (Zr: 22 mmol/liter). Then, the temperature of the system was raised to 40° C., and the reaction was carried out at the same temperature for 1 hour.

Thereafter, 6.4 g of silica (specific surface area: 321 m²/g, mean particle diameter: 54 μm) having been dried at 250° C. for 10 hours was added, and the temperature was raised to 60° C. to perform reaction for 2 hours. Then, the supernatant was removed, and the remainder was washed twice with hexane to obtain a solid catalyst (a-8) containing 3.2 mg of zirconium per 1 g of the solid catalyst.

To 130 ml of hexane containing 1.1 mmol of triisobutylaluminum were added 3.0 g of the solid catalyst (a-8) as obtained above and 0.8 ml of 1-hexene, and ethylene was introduced to perform prepolymerization at 35° C. for 2 hours. Thus, a prepolymerized catalyst (b-8) containing 2.8 mg of zirconium and 3 g of a polymer per 1 g of the solid catalyst (a-8) was obtained.

In the above procedure, it was found that the prepolymerized catalyst (b-8) did not stick to the reactor or the stirring blade. The prepolymerized catalyst (b-8) had a favorable shape, a bulk density of 0.37 g/cm$^3$ and a fluidity index of 46.

Polymerization

To a 2-liter stainless steel autoclave thoroughly purged with nitrogen was introduced 1 liter of hexane, and the system was purged with ethylene. Thereafter, 40 ml of 1-hexene was added and the temperature of the system was raised to 70° C. Subsequently, 0.75 mmol of triisobutylaluminum and 0.005 mmol (in terms of zirconium) of the prepolymerized catalyst (b-8) as prepared above were pressed with ethylene into the system to initiate polymerization. Then, the polymerization was carried out at 80° C. and 8 kg/cm$^2$-G for 1.5 hours with continuously feeding ethylene.

The polymer produced was recovered by filtration and dried overnight at 80° C., to obtain 387 g of an ethylene-1-hexene copolymer. In this procedure, it was found that no polymer stuck to the wall of the polymerization reactor or the stirring blade.

The ethylene-1-hexene copolymer thus obtained had an MFR, as measured at 190° C. under a load of 2.16 kg, of 0.16 g/10 min, a density of 0.925 g/cm$^3$, a bulk density of 0.35 g/cm$^3$ and a mean particle diameter of 740 μm.

Example 9

Preparation of catalyst

A prepolymerized catalyst (b-9) was prepared in the same manner as in the procedure of "preparation of catalyst" in Example 8 except that a methylaluminoxane having a CH$_3$/Al molar ratio of 1.63 was used in place of the methylaluminoxane having a CH$_3$/Al molar ratio of 1.69.

In the above procedure, it was found that the prepolymerized catalyst (b-9) did not stick to the reactor or the stirring blade. The prepolymerized catalyst (b-9) had a favorable shape, a bulk density of 0.36 g/cm$^3$ and a fluidity index of 45.

Polymerization

An ethylene-1-hexene copolymer was prepared in the same manner as in the procedure of "polymerization" in Example 8 except that the prepolymerized catalyst (b-9) was used in place of the prepolymerized catalyst (b-8). In this procedure, it was found that no polymer stuck to the wall of the polymerization reactor or the stirring blade.

Example 10

Preparation of catalyst

A prepolymerized catalyst (b-10) was prepared in the same manner as in the procedure of "preparation of catalyst" in Example 8 except that a methylaluminoxane having a CH$_3$/Al molar ratio of 1.57 was used in place of the methylaluminoxane having a CH$_3$/Al molar ratio of 1.69.

In the above procedure, it was found that the prepolymerized catalyst (b-10) did not stick to the reactor or the stirring blade. The prepolymerized catalyst (b-10) had a favorable shape, a bulk density of 0.36 g/cm$^3$ and a fluidity index of 46.

Polymerization

An ethylene-1-hexene copolymer was prepared in the same manner as in the procedure of "polymerization" in Example 8 except that the prepolymerized catalyst (b-10) was used in place of the prepolymerized catalyst (b-8). In this procedure, it was found that no polymer stuck to the wall of the polymerization reactor or the stirring blade.

The results obtained in the above examples are set forth in Table 3.

TABLE 3

| | Prepolymerized Catalyst | | | |
|---|---|---|---|---|
| | MAO CH$_3$/Al (molar ratio) | Bulk density (g/cm$^3$) | Fluidity Index | Yield of Polymer (g) |
| Ex. 8 | 1.69 | 0.37 | 46 | 387 |
| Ex. 9 | 1.63 | 0.36 | 45 | 380 |
| Ex. 10 | 1.57 | 0.36 | 46 | 399 |

| | MFR (g/10 min) | Density (g/cm$^3$) | Bulk Density (g/cm$^3$) | Mean Particle Diameter (μm) | Fine Powder (%) |
|---|---|---|---|---|---|
| Ex. 8 | 0.16 | 0.925 | 0.35 | 740 | 0.03 |
| Ex. 9 | 0.15 | 0.924 | 0.34 | 700 | 0.04 |
| Ex. 10 | 0.16 | 0.925 | 0.34 | 760 | 0.02 |

Example 11

Adjustment of CH$_3$/Al molar ratio of methylaluminoxane

To a glass flask thoroughly purged with nitrogen was introduced 800 ml of a toluene solution of methylaluminoxane (CH$_3$/Al molar ratio: 2.12) (Al: 1.52 mol/liter).

Liquid components in the flask were completely distilled off under the conditions of a temperature in the flask of 37° to 40° C., a constant distillate temperature of 27° to 28.5° C., a pressure of 30 mmHg and a period of 4 hours, remaining 53.6 g of a dried white methylaluminoxane in the flask, to which 650 ml of toluene was added to redissolve the methylaluminoxane. The toluene solution of methylaluminoxane thus obtained was a colorless transparent homogeneous solution having an Al concentration of 1.32 mol/liter, and the methylaluminoxane had a CH$_3$/Al molar ratio of 1.54.

Preparation of solid component

To a 400-ml reactor thoroughly purged with nitrogen were introduced 10 g of silica (F-948, available from Fuji Divison Co.) having been dried at 200° C. for 10 hours and 150 ml of toluene, and the system was cooled to 0° C. with stirring. To the system was dropwise added 67 mmol (in terms of aluminum atom) of the toluene solution of methylaluminoxane (CH$_3$/Al molar ratio: 1.54) as prepared above over a period of 60 minutes in a nitrogen atmosphere. Then, the reaction was carried out at the same temperature for 30 minutes and then at 95° C. for 4 hours. The reaction system was allowed to stand for cooling. When the temperature of the system became 65° C., the supernatant was removed by decantation. After the remainder was washed three times with 150 ml of toluene at room temperature, it was resuspended in toluene to give a whole volume of 150 ml. Thus, a solid component (c-1) containing 5.5 mmol of Al per 1 g of the solid component was obtained.

Preparation of prepolymerized catalyst

To a 200-ml reactor thoroughly purged with nitrogen were introduced 9 mmol (in terms of Al atom) of the solid component (c-1) as obtained above and 0.03 mmol (in terms of Zr atom) of rac-dimethylsilylenebis{1-(2-methyl-4-phenylindenyl)}zirconium dichloride dissolved in toluene, followed by stirring for 5 minutes. Then, to the reactor was added 100 ml of n-hexane and was then added 1.5 mmol of triisobutylaluminum, followed by stirring for further 5 minutes. Thereafter, a propylene gas (1.6 l/hr) was passed through the reactor at 20° C. for 2 hours to perform prepolymerization of propylene. The supernatant was removed by decantation, and the remainder was washed three times with 150 ml of hexane and resuspended in n-decane. Thus, a prepolymerized catalyst (b-11) containing 3 g of polypropylene, 0.0096 mmol of zirconium and 4.78 mmol of aluminum per 1 g of the solid component (c-1) was obtained. In this procedure, it was found that the prepolymerized catalyst (b-11) did not stick to the reactor or the stirring blade, and the prepolymerized catalyst (b-11) had a favorable shape.

Polymerization

To a 2-liter autoclave thoroughly purged with nitrogen were introduced 500 g of propylene and 300 ml of hydrogen, and the temperature was raised to 60° C. To the autoclave were then added 1.0 mmol of triisobutylaluminum and 0.0005 mmol (in terms of zirconium) of the prepolymerized catalyst (b-11), to perform polymerization at 70° C. for 1 hour.

106.7 g of a polymer was obtained, and the polymerization activity was 2,000 g/g-catalyst and 213 kg-polymer/mmol-Zr·hr. This polymer had a content of n-decane-soluble component of 1.37% by weight, MFR (230° C.) of 0.29 g/10 min, a melting point of 149° C. and a bulk density of 0.41 g/cm³. It was found that no polymer stuck to the wall of the polymerization reactor or the stirring blade.

Example 12

To a 2-liter autoclave thoroughly purged with nitrogen were introduced 400 g of propylene and 10 liters of ethylene, and the temperature was raised to 50° C. To the autoclave were then added 1.0 mmol of triisobutylaluminum and 0.0005 mmol (in terms of zirconium) of the prepolymerized catalyst (b-11), to perform polymerization at 60° C. for 1 hour.

123.4 g of a polymer was obtained, and the polymerization activity was 2,400 g/g-catalyst and 247 kg-polymer/mmol-Zr·hr. This polymer had a content of n-decane-soluble component of 0.6% by weight, MFR of 1.05 g/10 min, a melting point of 131° C. and a bulk density of 0.40 g/cm³. It was found that no polymer stuck to the wall of the polymerization reactor or the stirring blade.

Example 13

Preparation of prepolymerized catalyst

To a 200-ml reactor thoroughly purged with nitrogen were introduced 9 mmol (in terms of Al atom) of the solid component (c-1) as obtained above and 0.03 mmol (in terms of Zr atom) of rac-dimethylsilylenebis{1-(2-methyl-4,5-benzoindenyl)}zirconium dichloride dissolved in toluene, followed by stirring for 5 minutes. To the reactor was added 100 ml of n-hexane and was then added 1.5 mmol of triisobutylaluminum, followed by stirring for another 5 minutes. Thereafter, a propylene gas (1.6 l/hr) was passed through the reactor at 20° C. for 2 hours to perform prepolymerization of propylene. The supernatant was removed by decantation, and the remainder was washed three times with 150 ml of hexane and resuspended in n-decane. Thus, a prepolymerized catalyst (b-12) containing 3 g of polypropylene, 0.0091 mmol of zirconium and 5.01 mmol of aluminum per 1 g of the solid component (c-1) was obtained. In the above procedure, it was found that the prepolymerized catalyst (b-12) did not stick to the reactor or the stirring blade.

Polymerization

To a 2-liter autoclave thoroughly purged with nitrogen were introduced 400 g of propylene and 6 liters of ethylene, and the temperature was raised to 50° C. To the autoclave were then added 1.0 mmol of triisobutylaluminum and 0.0005 mmol (in terms of zirconium) of the prepolymerized catalyst (b-12), to perform polymerization at 60° C. for 1 hour.

133.5 g of a polymer was obtained, and the polymerization activity was 2,400 g/g-catalyst and 267 kg-polymer/mmol-Zr·hr. This polymer had a content of n-decane-soluble component of 0.6% by weight, MFR of 5.05 g/10 min, a melting point of 131° C. and a bulk density of 0.40 g/cm³. It was found that no polymer stuck to the wall of the polymerization reactor or the stirring blade.

Example 14

Preparation of prepolymerized catalyst

To a 200-ml reactor thoroughly purged with nitrogen were introduced 9 mmol (in terms of Al atom) of the solid component (c-1) as obtained in Example 11 and 0.03 mmol (in terms of Zr atom) of rac-dimethylsilylenebis{1-(2,7-dimethyl-4-isopropylindenyl)}zirconium dichloride dissolved in toluene, followed by stirring for 5 minutes. To the reactor wad added 100 ml of n-hexane and was then added 1.5 mmol of triisobutylaluminum, followed by stirring for another 5 minutes. Thereafter, a propylene gas (1.6 l/hr) was passed through the reactor at 20° C. for 2 hours to perform prepolymerization of propylene. The supernatant was removed by decantation, and the remainder was washed three times with 150 ml of hexane and resuspended in n-decane. Thus, a prepolymerized catalyst (b-13) containing 3 g of polypropylene, 0.0094 mmol of zirconium and 4.82 mmol of aluminum per 1 g of the solid component (c-1) was obtained. In the above procedure, it was found that the prepolymerized catalyst (b-13) did not stick to the reactor or the stirring blade.

Polymerization

To a 2-liter autoclave thoroughly purged with nitrogen were introduced 400 g of propylene and 6 liters of ethylene, and the temperature was raised to 50° C. To the autoclave were then added 1.0 mmol of triisobutylaluminum and 0.0005 mmol (in terms of zirconium) of the prepolymerized catalyst (b-13), to perform polymerization at 60° C. for 1 hour.

143 g of a polymer was obtained, and the polymerization activity was 2,700 g/g-catalyst and 286 kg-polymer/mmol-Zr·hr. This polymer had a content of n-decane-soluble component of 0.48% by weight, MFR of 2.0 g/10 min, a melting point of 129° C. and a bulk density of 0.42 g/cm³. It was found that no polymer stuck to the wall of the polymerization reactor or the stirring blade.

Example 15

Preparation of solid component

A solid component (c-2) containing 6.2 mmol of aluminum per 1 g of silica was prepared in the same manner as in Example 11 except that a toluene solution of methylaluminoxane having a CH₃/Al molar ratio of 1.57 (Al: 1.41 mol/liter) was used in place of the toluene solution of methylaluminoxane having a CH₃/Al molar ratio of 1.54.

Preparation of prepolymerized catalyst

A prepolymerized catalyst (b-14) was obtained in the same manner as in Example 11 except that the solid component (c-2) was used in place of the solid component (c-1). The prepolymerized catalyst (b-14) contained 3 g of polypropylene, 0.0116 mmol of zirconium and 4.65 mmol of aluminum per 1 g of the solid component (c-2).

Polymerization

Polymerization of propylene was carried out in the same manner as in Example 11 except that 0.001 mmol (in terms of zirconium) of the prepolymerized catalyst (b-14) was used in place of the prepolymerized catalyst (b-11).

160.2 g of a polymer was obtained, and the polymerization activity was 1,900 g/g-catalyst and 160.2 kg-polymer/mmol-Zr·hr. This polymer had a content of n-decane-soluble component of 0.55% by weight, MFR of 0.21 g/10 min, a melting point of 150° C. and a bulk density of 0.40 g/cm$^3$. It was found that no polymer stuck to the wall of the polymerization reactor or the stirring blade.

Example 16

Preparation of solid component

A solid component (c-3) containing 5.8 mmol of aluminum per 1 g of silica was prepared in the same manner as in Example 11 except that a toluene solution of methylaluminoxane having a CH$_3$/Al molar ratio of 1.69 (Al: 1.45 mol/liter) was used in place of the toluene solution of methylaluminoxane having a CH$_3$/Al molar ratio of 1.54.

Preparation of prepolymerized catalyst

A prepolymerized catalyst (b-15) was obtained in the same manner as in Example 11 except that the solid component (c-3) was used in place of the solid component (c-1). The prepolymerized catalyst (b-15) contained 3 g of polypropylene, 0.0124 mmol of zirconium and 4.85 mmol of aluminum per 1 g of the solid component (c-3).

Polymerization

Polymerization of propylene was carried out in the same manner as in Example 11 except that 0.001 mmol (in terms of zirconium) of the prepolymerized catalyst (b-15) was used in place of the prepolymerized catalyst (b-11).

175 g of a polymer was obtained, and the polymerization activity was 2,200 g/g-catalyst and 175 kg-polymer/mmol-Zr·hr. This polymer had a content of n-decane-soluble component of 0.58% by weight, MFR of 0.32 g/10 min, a melting point of 150° C. and a bulk density of 0.41 g/cm$^3$. It was found that no polymer stuck to the wall of the polymerization reactor or the stirring blade.

Comparative Example 3

Preparation of solid component

A solid component (c-4) containing 6.1 mmol of aluminum per 1 g of silica was prepared in the same manner as in Example 11 except that a toluene solution of methylaluminoxane having a CH$_3$/Al molar ratio of 2.12 was used in place of the toluene solution of methylaluminoxane having a CH$_3$/Al molar ratio of 1.54.

Preparation of prepolymerized catalyst

A prepolymerized catalyst (b-16) was obtained in the same manner as in Example 11 except that the solid component (c-4) was used in place of the solid component (c-1). The prepolymerized catalyst (b-16) contained 3 g of polypropylene, 0.0143 mmol of zirconium and 5.38 mmol of aluminum per 1 g of the solid component (c-4).

Polymerization

Polymerization of propylene was carried out in the same manner as in Example 11 except that 0.002 mmol (in terms of zirconium) of the prepolymerized catalyst (b-16) was used in place of the prepolymerized catalyst (b-11).

72 g of a polymer was obtained, and the polymerization activity was 520 g/g-catalyst and 36 kg-polymer/mmol-Zr·hr. This polymer had a content of n-decane-soluble component of 0.61% by weight, MFR of 0.19 g/10 min, a melting point of 148° C. and a bulk density of 0.35 g/cm$^3$. It was found that the polymer stuck to the wall of the polymerization reactor or the stirring blade.

Comparative Example 4

Polymerization

Copolymerization of propylene and ethylene was carried out in the same manner as in Example 12 except that the prepolymerized catalyst (b-16) was used in place of the prepolymerized catalyst (b-11).

104 g of the polymer was obtained, and the polymerization activity was 900 g/g-catalyst and 52 kg-polymer/mmol-Zr·hr. This polymer had a content of n-decane-soluble component of 5.94% by weight, MFR of 1.05 g/10 min, a melting point of 131° C. and a bulk density of 0.35 g/cm$^3$. It was found that the polymer stuck to the wall of the polymerization reactor or the stirring blade.

Comparative Example 5

Preparation of prepolymerized catalyst

A prepolymerized catalyst (b-17) was obtained in the same manner as in Example 13 except that the solid component (c-4) as prepared in Comparative Example 3 was used in place of the solid component (c-1). The prepolymerized catalyst (b-17) contained 3 g of polypropylene, 0.0109 mmol of zirconium and 4.08 mmol of aluminum per 1 g of the solid component (c-4).

Polymerization

Copolymerization of propylene and ethylene was carried out in the same manner as in Example 13 except that 0.001 mmol (in terms of zirconium) of the prepolymerized catalyst (b-17) was used in place of the prepolymerized catalyst (b-12).

73 g of a polymer was obtained, and the polymerization activity was 730 g/g-catalyst and 73 kg-polymer/mmol-Zr·hr. This polymer had a content of n-decane-soluble component of 4.5% by weight, MFR of 3.00 g/10 min, a melting point of 132° C. and a bulk density of 0.36 g/cm$^3$. It was found that the polymer stuck to the wall of the polymerization reactor or the stirring blade.

Comparative Example 6

Preparation of prepolymerized catalyst (b-18)

A prepolymerized catalyst (b-18) was obtained in the same manner as in Example 14 except that the solid component (c-4) prepared in Comparative Example 3 was used in place of the solid component (c-1). The prepolymerized catalyst (b-18) contained 3 g of polypropylene, 0.0102 mmol of zirconium and 4.25 mmol of aluminum per 1 g of the solid component (c-4).

Polymerization

Copolymerization of propylene and ethylene was carried out in the same manner as in Example 14 except that the prepolymerized catalyst (b-18) was used in place of the prepolymerized catalyst (b-13).

32.5 of a polymer was obtained, and the polymerization activity was 660 g/g-catalyst and 65 kg-polymer/mmol-Zr·hr. This polymer had a content of n-decane-soluble component of 4.2% by weight, MFR of 2.40 g/10 min, a melting point of 130° C. and a bulk density of 0.34 g/cm$^3$. It was found that the polymer stuck to the wall of the polymerization reactor or the stirring blade.

Example 17

Preparation of prepolymerized catalyst

To a 200-ml reactor thoroughly purged with nitrogen were introduced 9 mmol (in terms of Al atom) of the solid component (c-1) as obtained in Example 11 and 0.03 mmol (in terms of Zr atom) of rac-dimethylsilylenebis(2,4-dimethylcyclopentadienyl)zirconium dichloride dissolved in toluene, followed by stirring for 5 minutes. To the reactor wad added 100 ml of n-hexane and was then added 1.5 mmol of triisobutylaluminum, followed by stirring for another 5 minutes. Thereafter, a propylene gas (1.6 l/hr) was passed through the reactor at 20° C. for 2 hours to perform prepolymerization of propylene. The supernatant was removed by decantation, and the remainder was washed three times with 150 ml of hexane and resuspended in n-decane. Thus, a prepolymerized catalyst (b-19) containing 3 g of polypropylene, 0.0109 mmol of zirconium and 4.80 mmol of aluminum per 1 g of the solid component (c-1) was obtained. In the above procedure, it was found that the prepolymerized catalyst (b-19) did not stick to the reactor or the stirring blade.

Polymerization

To a 2-liter autoclave thoroughly purged with nitrogen were introduced 500 g of propylene and 6 liters of ethylene, and the temperature was raised to 50° C. To the autoclave were then added 1.0 mmol of triisobutylaluminum and 0.0020 mmol (in terms of zirconium) of the prepolymerized catalyst (b-19), to perform polymerization at 60° C. for 1 hour.

142 g of a polymer was obtained, and the polymerization activity was 770 g/g-catalyst and 71 kg-polymer/mmol-Zr·hr. This polymer had a content of n-decane-soluble component of 1.90% by weight, MFR of 51 g/10 min, a melting point of 135° C. and a bulk density of 0.40 g/cm³. It was found that no polymer stuck to the wall of the polymerization reactor or the stirring blade.

Comparative Example 7

Preparation of prepolymerized catalyst

A prepolymerized catalyst (b-20) was obtained in the same manner as in Example 17 except that the solid component (c-4) was used in place of the solid component (c-1). The prepolymerized catalyst (b-20) contained 3 g of polypropylene, 0.0110 mmol of zirconium and 4.86 mmol of aluminum per 1 g of the solid component (c-4).

Polymerization

Polymerization of propylene was carried out in the same manner as in Example 17 except that the prepolymerized catalyst (b-20) was used in place of the prepolymerized catalyst (b-19).

36 g of a polymer was obtained, and the polymerization activity was 198 g/g-catalyst and 18 kg-polymer/mmol-Zr·hr. This polymer had a content of n-decane-soluble component of 4.50% by weight, MFR of 65 g/10 min, a melting point of 153° C. and a bulk density of 0.35 g/cm³. It was found that the polymer stuck to the wall of the polymerization reactor or the stirring blade.

The results obtained in the above examples are set forth in Table 4.

TABLE 4

| | Prepoly-merized Catalyst | MAO Ch₃/Al (molar raio) | Polymer-ization Temp. (°C.) | Amount | | | Polymer-ization Activity | | MFR (g/10 min) | Bulk Density (g/cm³) | Melting Point (°C.) | Amount of n-Decane-Soluble Component (wt. %) | Sticking of Polymer to Reactor Wall |
|---|---|---|---|---|---|---|---|---|---|---|---|---|---|
| | | | | Propylene (g) | Ethylene (l) | Hydrogen (ml) | *1 | *2 | | | | | |
| Ex. 11 | b-11 | 1.54 | 70 | 500 | — | 300 | 2000 | 213 | 0.29 | 0.41 | 149 | 1.37 | not observed |
| Ex. 12 | b-11 | 1.54 | 60 | 400 | 10 | — | 2400 | 247 | 1.05 | 0.40 | 131 | 0.60 | not observed |
| Ex. 13 | b-12 | 1.54 | 60 | 400 | 6 | — | 2400 | 267 | 5.05 | 0.40 | 131 | 0.60 | not observed |
| Ex. 14 | b-13 | 1.54 | 60 | 400 | 6 | — | 2700 | 286 | 2.00 | 0.42 | 129 | 0.48 | not observed |
| Ex. 15 | b-14 | 1.57 | 70 | 500 | — | 300 | 1900 | 160 | 0.21 | 0.40 | 150 | 0.55 | not observed |
| Ex. 16 | b-15 | 1.69 | 70 | 500 | — | 300 | 2200 | 175 | 0.32 | 0.41 | 150 | 0.58 | not observed |
| Comp. Ex. 3 | b-16 | 2.12 | 70 | 500 | — | 300 | 520 | 36 | 0.19 | 0.35 | 148 | 6.1 | observed |
| Comp. Ex. 4 | b-16 | 2.12 | 60 | 400 | 10 | — | 900 | 52 | 1.05 | 0.35 | 131 | 5.94 | observed |
| Comp. Ex. 5 | b-17 | 2.12 | 60 | 400 | 6 | — | 730 | 73 | 3.00 | 0.36 | 132 | 4.50 | observed |
| Comp. Ex. 6 | b-18 | 2.12 | 60 | 400 | 6 | — | 660 | 65 | 2.40 | 0.34 | 130 | 4.20 | observed |
| Ex. 17 | b-19 | 1.54 | 60 | 500 | — | — | 770 | 71 | 51 | 0.40 | 153 | 1.90 | not observed |
| Comp. Ex. 7 | b-20 | 2.12 | 60 | 500 | — | — | 198 | 18 | 65 | 0.35 | 153 | 4.50 | observed |

*1: g/g catalyst
*2: kg/polymer/mmol-Zr · hr

What is claimed is:

1. An olefin polymerization solid catalyst comprising:
   a fine particle carrier having an adsorbed water content of less that 1.0% by weight and a surface hydroxyl group content of not less than 1.0% by weight
   (A) a transition metal compound of a Group IVB metal of the periodic table, containing a ligand having a cyclopentadienyl skeleton;
   (B) an organoaluminum oxy-compound having a molar ratio of alkyl groups to aluminum atoms of 1.3 to 2.1; and optionally
   (C) an organoaluminum compound;
   said transition metal compound (A), said organoaluminum oxy-compound (B) and said organoaluminum compound (C) being supported on the fine particle carrier; and
   said solid catalyst having a bulk density of not less than 0.3 g/cm³ and a fluidity index of not less than 45.

2. The catalyst of claim 1, wherein the fine particle carrier has a diameter of 10 to 300 μm.

3. The olefin polymerization catalyst as claimed in claim 1, wherein the organoaluminum oxy-compound (B) has been adjusted to have a molar ratio of alkyl groups to aluminum atoms of 1.7 to 2.1 by bringing an organoaluminum oxy-compound into contact with water or an inorganic compound having a surface hydroxyl group content of not less than 1.0% by weight and an adsorbed water content of not more than 0.1% by weight.

4. The olefin polymerization catalyst as claimed in claim 1, wherein the organoaluminum oxy-compound (B) has been adjusted to have a molar ratio of alkyl groups to aluminum atoms of 1.7 to 2.1 by bringing an organoaluminum oxy-compound having a molar ratio of alkyl groups to aluminum atoms (alkyl group/aluminum) of more than 2.1 into contact with water.

5. The olefin polymerization catalyst as claimed in claim 1, wherein the organoaluminum oxy-compound (B) has been adjusted to have a molar ratio of alkyl group to aluminum atoms of 1.7 to 2.1 by bringing an organoaluminum oxy-compound having a molar ratio of alkyl group to aluminum atom of less than 1.7 into contact with an inorganic compound having a surface hydroxy group content on not less than 1.0% by weight and an adsorbed water content of not more than 0.1% by weight.

6. The catalyst as claimed in claim 1, wherein the molar ratio of alkyl groups to aluminum atoms has been adjusted to 1.3 to 2.1 by a process selected from the group consisting of:
a process comprising bringing an organoaluminum oxy-compound into contact with water;
a process comprising bringing an organoaluminum oxy-compound into contact with an inorganic compound having a surface hydroxyl group content of not less than 1.0% by weight and an adsorbed water content of not more than 0.1% by weight; and
a process comprising temporarily evaporating a solvent from an organoaluminum oxy-compound and redissolving the resultant dried organoaluminum oxy-compound in a solvent.

7. A prepolymerized olefin polymerization catalyst which is obtained by prepolymerizing at least one α-olefin in the presence of a solid catalyst formed from:
a fine particle carrier having an adsorbed water content of less than 1.0% by weight and a surface hydroxyl group content of not less than 1.0% by weight;
(A) a transition metal compound of a Group IVB metal of the periodic table, containing a ligand having a cyclopentadienyl skeleton;
(B) an organoaluminum oxy-compound having a molar ratio of alkyl groups to aluminum atoms of 1.3 to 2.1; and optionally;
(C) an organoaluminum compound;
said transition metal compound (A), said organoaluminum oxy-compound (B), said organoaluminum compound (C) and said prepolymerized olefin being supported on the particle carrier, and
said prepolymerized catalyst having a bulk density of not less than 0.3 g/cm³ and a fluidity index of not less than 45.

8. The olefin polymerization catalyst as claimed in claim 7, wherein the organoaluminum oxy-compound (B) has a molar ratio of alkyl groups to aluminum atoms (alkyl of up to but excluding 1.3 to less than 1.7.

9. The olefin polymerization catalyst as claimed in claim 7, wherein the organoaluminum oxy-compound (B) has been adjusted to have a molar ratio of alkyl groups to aluminum atoms of 1.7 to 2.1 by bringing an organoaluminum oxy-compound into contact with water or an inorganic compound having a surface hydroxyl group content of not less than 1.0% by weight and an adsorbed water content of not more than 0.1% by weight.

10. The olefin polymerization catalyst as claimed in claim 7, wherein the organoaluminum oxy-compound (B) has been adjusted to have a molar ratio of alkyl groups to aluminum atoms of 1.7 to 2.1 by bringing an organoaluminum oxy-compound having a molar ratio of alkyl groups to aluminum atoms of more than 2.1 into contact with water.

11. The olefin polymerization catalyst as claimed in claim 7, wherein the organoaluminum oxy-compound (B) has been adjusted to have a molar ratio of alkyl groups to aluminum atoms of 1.7 to 2.1 by bringing an organoaluminum oxy-compound having a molar ratio of alkyl groups to aluminum atoms of less than 1.7 into contact with an inorganic compound having a surface hydroxyl group content of not less than 1.0% by weight and an adsorbed water content of not more than 0.1% by weight.

12. An olefin polymerization solid catalyst which is a solid catalyst formed from:
a fine particle carrier having an adsorbed water content of less than 1.0% by weight and a surface hydroxyl group content of not less than 1.0% by weight;
(A') at least one transition metal compound represented by the following formula (I);
(B') an organoaluminum oxy-compound having a molar ratio of alkyl groups to aluminum atoms of 1.3 to not more than 1.8; and optionally.
(C') an organoaluminum compound;
said transition metal compound (A'), said organoaluminum oxy-compound (B') and said organoaluminum compound (C') being supported on the fine particle carrier; and
said solid catalyst having a bulk density of not less than 0.3 g/cm³ and fluidity index of not less than 45;

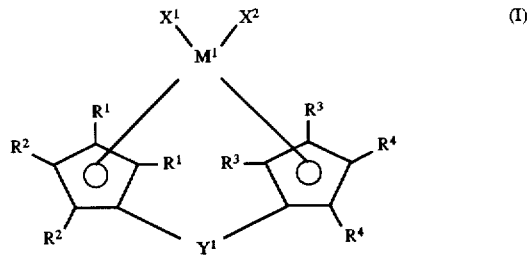

wherein M¹ is a transition metal atom of Groups IV–VIB of the periodic table.

R¹, R², R³ and R⁴ may be the same as or different from each other, and are each a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group, a phosphorus-containing group, a hydrogen atom or a halogen atom, and adjacent groups of said groups R¹, R², R³ and R⁴ may be bonded with each other to form a ring together with the carbon atoms of the cyclopentadienyl groups to which the carbon atoms to which the bonded groups are attached, X¹ and X² may be the same as or different from each other, and are each a hydrocarbon group, a halogenated hydrocarbon group, an oxygen-containing group, a sulfur-containing group, a silicon-containing group, a hydrogen atom or a halogen atom.

Y¹ is a divalent hydrocarbon group, a divalent halogenated hydrocarbon group, a divalent silicon-containing group, a divalent germanium-containing group, a divalent tin-containing group, —O—, —CO—, —S—, —SO—, —SO₂—, —Ge—, —Sn—, —NR⁵—, —P(R⁵)—, —P(O)(R⁵)—, —B(R⁵)— or —AlR⁵—, in which R⁵ is a hydrogen atom, a halogen atom, a hydrocarbon group, a halogenated hydrocarbon group or an alkoxy group.

13. The catalyst as claimed in claim 12, wherein the molar ratio of alkyl groups to aluminum atoms of the organoaluminum oxy-component (B) has been adjusted to 1.3 to not more than 1.8 by a process selected from the group consisting of:
- a process comprising bringing an organoaluminum oxy-compound into contact with water;
- a process comprising bringing an organoaluminum oxy-compound into contact with an inorganic compound having a surface hydroxyl group content of not less than 1.0% by weight and an adsorbed water content of not more than 0.1% by weight; and
- a process comprising temporarily evaporating a solvent from an organoaluminum oxy-compound and redissolving the resultant dried organoaluminum oxy-compound in a solvent.

14. The olefin polymerization catalyst as claimed in claim 12, wherein the transition metal compound represented by the formula (I) comprises at least one of the transition metal compounds represented by the following formulae (Ia), (Ib) or (Ic):

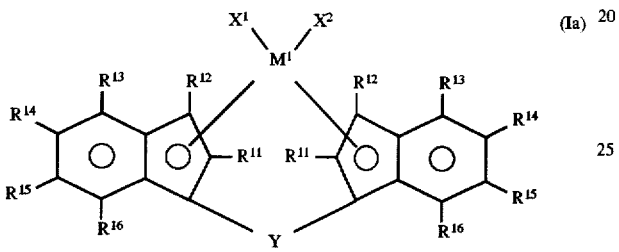

wherein $M^1$ is a transition metal atom of Group IVB of the periodic table, $R^{11}$ is a hydrocarbon group of 1 to 6 carbon atoms, $R^{12}$, $R^{14}$, $R^{15}$ and $R^{16}$ may be the same as or different from each other, and are each hydrogen, a halogen atom or a hydrocarbon group of 1 to 6 carbon atoms, $R^{13}$ is hydrogen or an aryl group of 6 to 16 carbon atoms which may be substituted with a halogen atom, a hydrocarbon group of 1 to 20 carbon atoms or an organosilyl group, $X^1$ and $X^2$ are each hydrogen, a halogen atom, a hydrocarbon group of 1 to 20 carbon atoms, a halogenated hydrocarbon group of 1 to 20 carbon atoms, an oxygen-containing group or a sulfur-containing group, Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO$_2$—, —NR$^{17}$—, —P(R$^{17}$)—, —P(O)(R$^{17}$)—, —BR$^{17}$— or —AlR$^{17}$— (wherein R$^{17}$ is hydrogen, a halogen atom, a hydrocarbon group of 1 to 20 carbon atoms or a halogenated hydrocarbon group of 1 to 20 carbon atoms);

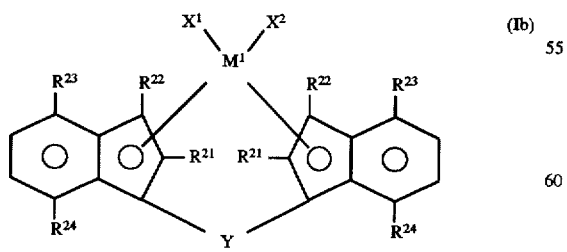

wherein $M^1$ is a transition metal atom of Group IVB of the periodic table, $R^{21}$ and $R^{22}$ are each hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group, $R^{23}$ and $R^{24}$ may be the same as or different from each other, and are each an alkyl group of 1 to 20 carbon atoms, $X^1$ and $X^2$ may be the same as or different from each other, and have the same meanings as defined in the formula (Ia), Y has the same meaning as defined in the formula (Ia);

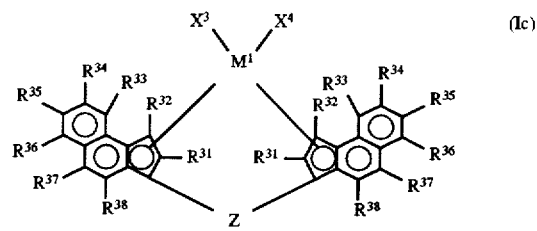

wherein $M^1$ is a transition metal atom of Group IVB of the periodic table, plural $R^{31}$ may be the same as or different from each other, and are each hydrogen, a halogen atom, an alkyl group of 1 to 10 carbon atoms, a halogenated alkyl group of 1 to 10 carbon atoms, an aryl group of 6 to 10 carbon atoms, —NR$^{30}$$_2$, —SR$^{30}$, —OSiR$^{30}$$_3$, —SiR$^{30}$$_3$ or —PR$^{30}$$_2$ (wherein R$^{30}$ is a halogen atom, an alkyl group of 1 to 10 carbon atoms or an aryl group of 6 to 10 carbon atoms), $R^{32}$ to $R^{38}$ are each the same as $R^{31}$, or at least two adjacent groups from among the groups represented by $R^{32}$ to $R^{38}$ may form an aromatic ring or an aliphatic ring together with atoms to which said two groups are bonded, $X^3$ and $X^4$ may be the same as or different from each other, and are each hydrogen, an alkyl group of 1 to 10 carbon atoms, an alkoxy group of 1 to 10 carbon atoms, an aryl group of 6 to 10 carbon atoms, an aryloxy group of 6 to 10 carbon atoms, an alkenyl group of 2 to 10 carbon atoms, an arylalkyl group of 7 to 40 carbon atoms, an alkylaryl group of 7 to 40 carbon atoms, an arylalkenyl group of 8 to 40 carbon atoms, an OH group or a halogen atom, Z is

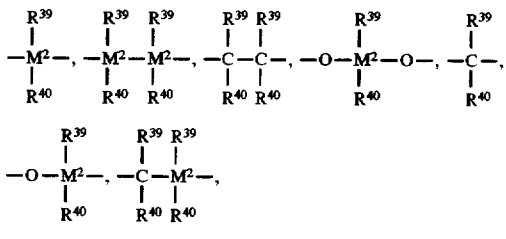

=BR$^{39}$, =AlR$^{39}$, —Ge—, —Sn—, —O—, —S—, =SO, =SO$_2$, =NR$^{39}$, =CO, =PR$^{39}$ or =P(O)R$^{39}$ (wherein R$^{39}$ and R$^{40}$ may be the same as or different from each other, and are each hydrogen, a halogen atom, an alkyl group of 1 to 10 carbon atoms, a fluoroalkyl group of 1 to 10 carbon atoms, an aryl group of 6 to 10 carbon atoms, a fluoroaryl group of 6 to 10 carbon atoms, an alkoxy group of 1 to 10 carbon atoms, an alkenyl group of 2 to 10 carbon atoms, an arylalkyl group of 7 to 40 carbon atoms, an arylalkenyl group of 8 to 40 carbon atoms or an alkylaryl group of 7 to 40 carbon atoms, or $R^{39}$ and $R^{40}$ may form a ring together with atoms to which $R^{39}$ and $R^{40}$ are bonded, and $M^2$ is silicon, germanium or tin).

15. An α-olefin prepolymerized solid polymerization catalyst comprising:
   a fine particle carrier having a diameter of 10 to 300 μm, an adsorbed water content of less than 1.0% by weight and a surface hydroxyl group content of 1.0 to 4.0% by weight;
   (A) a transition metal compound of having the formula (Io):

$$M^1 L_x \qquad (Io)$$

in which $M^1$ is selected from the group consisting of zirconium, titanium and hafnium and x is the valence of the transition metal;
   L is a ligand coordinated to the transition metal and at least two of the L are ligands having a cyclopentadienyl skeleton, L other than the ligands having a cyclopentadienyl skeleton are hydrocarbon groups of 1 to 12 carbon atoms, alkoxy groups or a silyl groups; and
   wherein the two ligands having the cyclopentadienyl skeleton may not be linked or may be linked through an alkylene group or a silylene group;
   (B) an organoaluminum oxy-compound having a molar ratio of alkyl groups to aluminum atoms of 1.4 to 2.1; and optionally
   (C) an organoaluminum compound;
   said transition metal compound (A), said organoaluminum oxy-compound (B) and said organoaluminum compound (C) being supported on the fine particle carrier; and
   said solid catalyst having a bulk density of 0.3 g/cm³ to 0.5 g/cm³ and a fluidity index of 45 to 70.

16. The α-olefin prepolymerized catalyst of claim 15 wherein the organoaluminum oxy-compound has a molar ratio of alkyl groups to aluminum atoms of 1.54 to 2.03.

17. The α-olefin prepolymerized catalyst of claim 15 wherein said catalyst has a bulk density of 0.4 g/cm³ to 0.5 g/cm³ and a fluidity index of 50 to 70.

18. The prepolymerized catalyst of claim 15, wherein the transition metal catalyst is a member selected from the group consisting of:
   bis(1,3-n-butylmethylcyclopentadienyl)zirconium dichloride
   bis(1,3-n-propylmethylcyclopentadienyl)zirconium dichloride
   bis(1,3-dimethylcyclopentadienyl)zirconium dichloride
   rac-dimethylsilylenebis(1-(2-methyl-4-phenylindenyl))zirconium dichloride
   rac-dimethylsilylenebis(1-(2-methyl-4,5-benzoindenyl))zirconium dichloride
   rac-dimethylsilylenebis(1-(2,7-dimethyl-4-isopropylindenyl))zirconium dichloride
   rac-dimethylsilylenebis(2,4-dimethyl-cyclopentadienyl)zirconium dichloride.

19. The α-olefin prepolymerized catalyst of claim 15, wherein the fine particle carrier has a diameter of 20 to 200 μm, an adsorbed water content of less than 0.5% by weight and a surface hydroxyl content of 1.5 to 4.0% by weight.

20. An α-olefin prepolymerized solid polymerization catalyst comprising:
   a fine particle carrier having a diameter of 10 to 300 μm, an adsorbed water content of less than 1.0% by weight and a surface hydroxyl group content of 1.0 to 4.0% by weight;
   (A) a transition metal compound of having the below formula (I);
   (B) an organoaluminum oxy-compound having a molar ratio of alkyl groups to aluminum atoms of 1.4 to 2.1; and optionally
   (C) an organoaluminum compound;
   said transition metal compound (A), said organoaluminum oxy-compound (B) and said organoaluminum compound (C) being supported on the fine particle carrier; and
   said solid catalyst having a bulk density of 0.3 g/cm³ to 0.5 g/cm³ and a fluidity index of 45 to 70; and

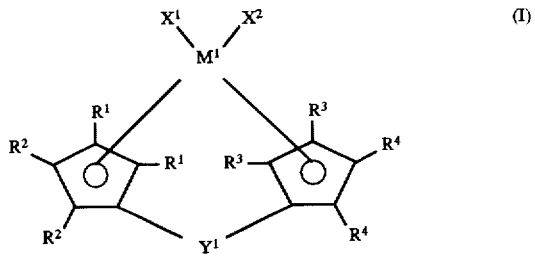

wherein $M^1$ is a transition metal atom selected from the group consisting of zirconium, titanium and hafnium;
   $R^1$, $R^2$, $R^3$ and $R^4$ may be the same as or different from each other, and are each a hydrocarbon group of 1 to 12 carbon atoms, a halogenated hydrocarbon group of 1 to 12 carbon atoms, a silicon-containing group, an oxygen-containing group, a hydrogen atom or a halogen atom, and adjacent groups of said groups $R^1$, $R^2$, $R^3$ and $R^4$ may be bonded with each other to form a ring together with the carbon atoms of the cyclopentadienyl groups to which the carbon atoms bonded groups are attached,
   $X^1$ and $X^2$ may be the same as or different from each other, and are each a hydrocarbon group, a halogenated hydrocarbon group, a hydrogen atom or a halogen atom,
   $Y^1$ is a divalent hydrocarbon group, a divalent halogenated hydrocarbon group, a divalent silicon-containing group, or a divalent germanium-containing group.

21. The α-olefin prepolymerized catalyst of claim 20 wherein the organoaluminum oxy-compound has a molar ratio of alkyl group to aluminum atom of 1.54 to 2.03.

22. The α-olefin prepolymerized catalyst of claim 20 wherein said catalyst has a bulk density of 0.4 g/cm³ to 0.5 g/cm³ and a fluidity index of 50 to 70.

23. The α-olefin prepolymerized catalyst of claim 20, wherein the fine particle carrier has a diameter of 20 to 200 μm, an adsorbed water content of less than 0.5% by weight and a surface hydroxyl content of 1.5 to 4.0% by weight.

* * * * *